(12) United States Patent
Yasui et al.

(10) Patent No.: US 7,331,317 B2
(45) Date of Patent: Feb. 19, 2008

(54) VALVE TIMING CONTROL SYSTEM AND CONTROL SYSTEM FOR AN INTERNAL COMBUSTION ENGINE

(75) Inventors: Yuji Yasui, Saitama-ken (JP); Akiyuki Yonekawa, Saitama-ken (JP)

(73) Assignee: Honda Motor Co., Ltd., Tokyo (JP)

( * ) Notice: Subject to any disclaimer, the term of this patent is extended or adjusted under 35 U.S.C. 154(b) by 327 days.

(21) Appl. No.: 10/855,566

(22) Filed: May 28, 2004

(65) Prior Publication Data
US 2004/0237917 A1   Dec. 2, 2004

(30) Foreign Application Priority Data
May 30, 2003 (JP) .............................. 2003/155947
Jun. 4, 2003 (JP) .............................. 2003-159176

(51) Int. Cl.
*F01L 1/34* (2006.01)

(52) U.S. Cl. ................ 123/90.15; 123/90.17; 123/347

(58) Field of Classification Search ............. 123/90.15, 123/90.16, 90.17, 90.18, 345, 346, 347, 348, 123/90.27, 90.31; 464/1, 2, 160
See application file for complete search history.

(56) References Cited

U.S. PATENT DOCUMENTS

| | | | | |
|---|---|---|---|---|
| 5,042,437 | A | * | 8/1991 | Sakuragi et al. ......... 123/90.16 |
| 5,080,055 | A | * | 1/1992 | Komatsu et al. ......... 123/90.17 |
| 5,497,737 | A | * | 3/1996 | Nakamura ............... 123/90.15 |
| 5,960,756 | A | * | 10/1999 | Miyachi et al. ......... 123/90.16 |
| 6,340,010 | B1 | * | 1/2002 | Hara et al. ............... 123/90.16 |
| 6,386,158 | B1 | * | 5/2002 | Takahashi ............... 123/90.15 |
| 6,615,129 | B2 | * | 9/2003 | Kabasin ..................... 701/110 |
| 7,073,493 | B2 | * | 7/2006 | Nakasaka et al. ........... 123/673 |

* cited by examiner

*Primary Examiner*—Ching Chang
(74) *Attorney, Agent, or Firm*—Arent Fox LLP

(57) ABSTRACT

A valve timing control system for an internal combustion engine, which is capable of accurately and delicately controlling an amount of intake air, and thereby maintaining excellent combustion state and reduced exhaust emissions. The valve timing control system variably controls the valve-closing timing of an intake valve with respect to valve-opening timing of the same as desired via a variable intake valve actuation assembly. The ECU of the engine determined a basic value of a target auxiliary intake cam phase according to the demanded drive torque of the engine. The ECU calculates a control input to the variable intake valve actuation assembly such that the cylinder intake air amount converges to a target intake air amount and at the same time the auxiliary intake cam phase is constrained to the basic value of the target auxiliary intake cam phase.

16 Claims, 45 Drawing Sheets

F I G. 1
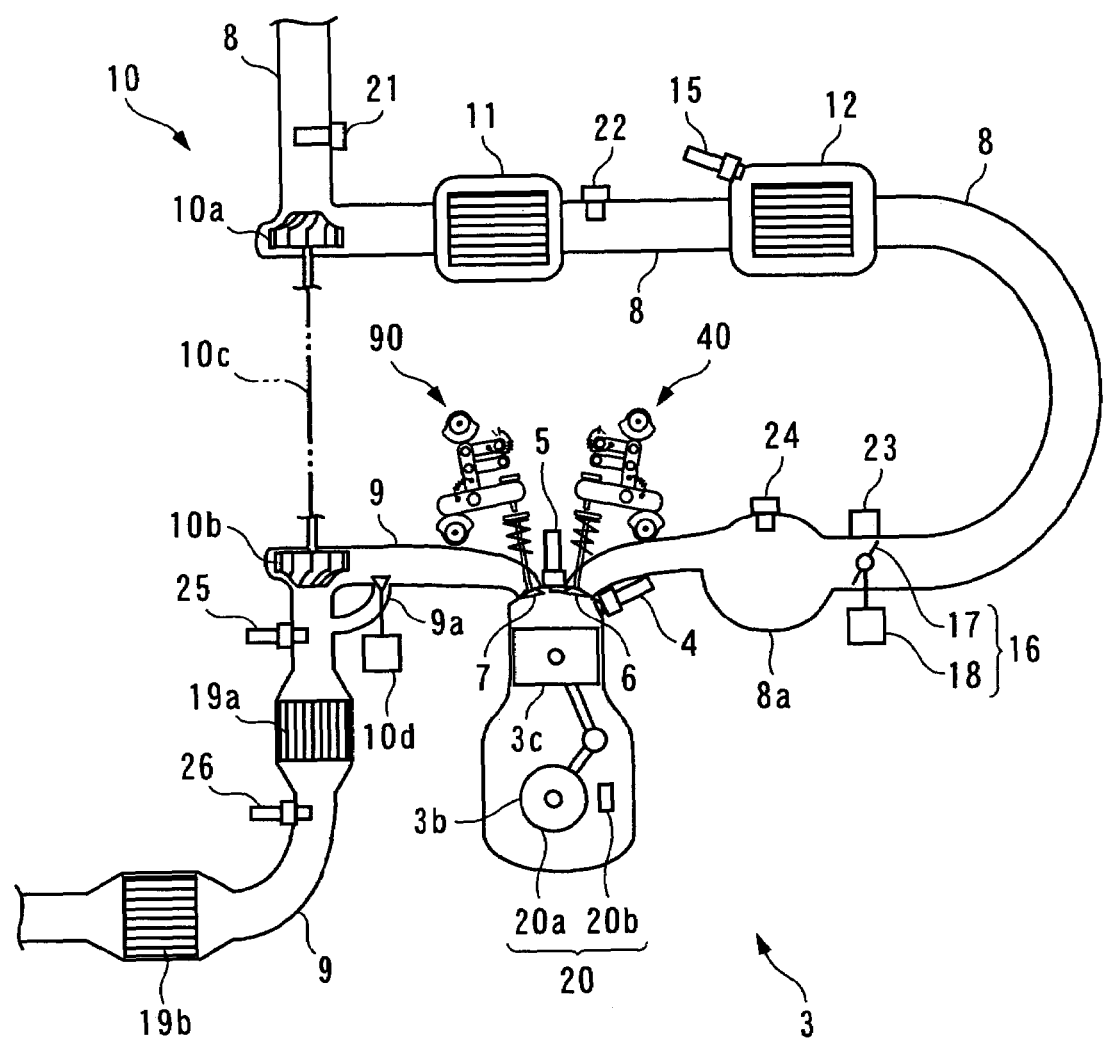

FIG. 24

$$Gcyl(n) = Gth(n) - \frac{VB \cdot [PBA(n) - PBA(n-1)]}{R \cdot TB} \quad \cdots (1)$$

$$Gcyl(n) = a1 \cdot Gcyl(n-1) + a2 \cdot Gcyl(n-2) + b1 \cdot \theta msi(n-d) \quad \cdots (2)$$

$$Gcyl(n+d-1) = a1 \cdot Gcyl(n+d-2) + a2 \cdot Gcyl(n+d-3) + b1 \cdot \theta msi(n-1) \quad \cdots (3)$$

$$A = \begin{bmatrix} a1 & a2 \\ 1 & 0 \end{bmatrix} \quad \cdots (4)$$

$$B = \begin{bmatrix} b1 \\ 0 \end{bmatrix} \quad \cdots (5)$$

$$\begin{aligned} Gcyl(n+d-1) = &\, \alpha 1 \cdot Gcyl(n) + \alpha 2 \cdot Gcyl(n-1) \\ &+ \beta 1 \cdot \theta msi(n-1) + \beta 2 \cdot \theta msi(n-2) \\ &+ \cdots + \beta d-1 \cdot \theta msi(n-d+1) \end{aligned} \quad \cdots (6)$$

$\alpha 1$ : FIRST-ROW FIRST-COLUMN ELEMENT OF $A^{d-1}$
$\alpha 2$ : FIRST-ROW SECOND-COLUMN ELEMENT OF $A^{d-1}$
$\beta j$ : FIRST-ROW ELEMENT OF $A^{j-1} B$ ($j = 0 \sim d-1$)

$$\begin{aligned} Pre\_Gcyl(n) = &\, \alpha 1 \cdot Gcyl(n) + \alpha 2 \cdot Gcyl(n-1) \\ &+ \beta 1 \cdot \theta msi(n-1) + \beta 2 \cdot \theta msi(n-2) \\ &+ \cdots + \beta d-1 \cdot \theta msi(n-d+1) + \gamma 1 \\ \fallingdotseq &\, Gcyl(n+d-1) \end{aligned} \quad \cdots (7)$$

FIG. 25

$$\theta s(n) = \theta s(n-1) + KPs(n) \cdot ide(n) \quad \cdots\cdots (8)$$

$$KPs(n) = \frac{Ps(n) \cdot \zeta s(n)}{1 + \zeta s(n)^T \cdot Ps(n) \cdot \zeta s(n)} \quad \cdots\cdots (9)$$

$$Ps(n+1) = \frac{1}{\lambda 1}\left[I - \frac{\lambda 2 \cdot Ps(n) \cdot \zeta s(n) \cdot \zeta s(n)^T}{\lambda 1 + \lambda 2 \cdot \zeta s(n)^T \cdot Ps(n) \cdot \zeta s(n)}\right] Ps(n)$$
$$\cdots\cdots (10)$$

I : UNIT MATRIX OF ORDER d+2
$\lambda 1, \lambda 2$ : WEIGHTING PARAMETER $$ide(n) = Pre\_Gcyl(n-d+1) - Gcyl(n)$$
$$= \theta s(n-1)^T \cdot \zeta s(n) - Gcyl(n) \quad \cdots\cdots (11)$$

$$\theta s(n)^T = [\alpha 1, \alpha 2, \beta 1, \beta 2, \cdots \beta d-1, \gamma 1] \quad \cdots\cdots (12)$$

$$\zeta s(n)^T = [Gcyl(n-d), Gcyl(n-d-1),$$
$$\quad \theta msi(n-d), \theta msi(n-d-1), \cdots, \theta msi(n-2d+2), 1]$$
$$\cdots\cdots (13)$$

FIG. 26

$$Gcyl(n+d) = \alpha1 \cdot Gcyl(n+1) + \alpha2 \cdot Gcyl(n)$$
$$+ \beta1 \cdot \theta msi(n) + \beta2 \cdot \theta msi(n-1)$$
$$+ \cdots + \beta d-1 \cdot \theta msi(n-d+2) + \gamma1 \quad \cdots (14)$$

$$Es(n) = Gcyl(n) - Gcyl\_cmd(n) \quad \cdots (15)$$

$$\sigma s(n) = Es(n) + Ss \cdot Es(n-1) \quad \cdots (16)$$

$$-1 < Ss < 0 \quad \cdots (17)$$

$$\theta msi\_cmd(n) = Uspas(n)$$
$$= Ueq(n) + Urch(n) + Uvt(n) \quad \cdots (18)$$

$$Ueq(n) = \frac{1}{\beta1} \{Pre\_Gcyl(n) + Ss \cdot Pre\_Gcyl(n-1)$$
$$- \alpha1 \cdot Pre\_Gcyl(n-d+1) - \alpha2 \cdot Gcyl(n)$$
$$- \beta2 \cdot \theta msi(n-1) - \cdots - \beta d-1 \cdot \theta msi(n-d+2) - \gamma1$$
$$+ Gcyl\_cmd(n+d) + (Ss-1) \cdot Gcyl\_cmd(n+d-1)$$
$$- Ss \cdot Gcyl\_cmd(n+d-2)\} \quad \cdots (19)$$

$$Urch(n) = \frac{-F}{\beta1} \cdot \sigma s(n+d-1) \quad \cdots (20)$$

F : REACHING LAW GAIN(0 < F < 2)

$$Uvt(n) = \theta msi\_base(n) \quad \cdots (21)$$

F I G. 2 7

$$\sigma s(n+d) = \sigma s(n+d-1) \quad \cdots (22)$$

$$Es(n+d) + Ss \cdot Es(n+d-1) = Es(n+d-1) + Ss \cdot Es(n+d-2)$$
$$\cdots (23)$$

$$\alpha 1 \cdot Gcyl(n+1) + \alpha 2 \cdot Gcyl(n) + \beta 1 \cdot \theta msi(n) + \beta 2 \cdot \theta msi(n-1)$$
$$+ \cdots + \beta d-1 \cdot \theta msi(n-d+2) + \gamma 1 - Gcyl\_cmd(n+d)$$
$$+ Ss \cdot Gcyl(n+d-1) - Ss \cdot Gcyl\_cmd(n+d-1)$$
$$= Gcyl(n+d-1) - Gcyl\_cmd(n+d-1)$$
$$+ Ss \cdot Gcyl(n+d-2) - Ss \cdot Gcyl\_cmd(n+d-2) \quad \cdots (24)$$

$$\theta msi(n) = \frac{1}{\beta 1} \{Gcyl(n+d-1) + Ss \cdot Gcyl(n+d-2)$$
$$- \alpha 1 \cdot Gcyl(n+1) - \alpha 2 \cdot Gcyl(n)$$
$$- \beta 2 \cdot \theta msi(n-1) - \cdots - \beta d-1 \cdot \theta msi(n-d+2) - \gamma 1$$
$$+ Gcyl\_cmd(n+d) + (Ss-1) \cdot Gcyl\_cmd(n+d-1)$$
$$- Ss \cdot Gcyl\_cmd(n+d-2)\} \quad \cdots (25)$$

FIG. 31

$$\theta msi(m) = a1' \cdot \theta msi(m-1) + a2' \cdot \theta msi(m-2) + b1' \cdot DUTY\_msi(m-dx)$$
$$\cdots\cdots (26)$$

$$A' = \begin{bmatrix} a1' & a2' \\ 1 & 0 \end{bmatrix} \qquad \cdots\cdots (27)$$

$$B' = \begin{bmatrix} b1' \\ 0 \end{bmatrix} \qquad \cdots\cdots (28)$$

$$Pre\_\theta msi(m) = \alpha 1' \cdot \theta msi(m) + \alpha 2' \cdot \theta msi(m-1)$$
$$+ \beta 1' \cdot DUTY\_msi(m-1) + \beta 2' \cdot DUTY\_msi(m-2)$$
$$+ \cdots + \beta dx - 1' \cdot DUTY\_msi(m-dx+1) + \gamma 1'$$
$$\fallingdotseq \theta msi(m+dx-1) \qquad \cdots\cdots (29)$$

$\alpha 1'$ : FIRST-ROW FIRST-COLUMN ELEMENT OF $A'^{dx-1}$
$\alpha 2'$ : FIRST-ROW SECOND-COLUMN ELEMENT OF $A'^{dx-1}$
$\beta j'$ : FIRST-ROW ELEMENT OF $A'^{j'-1} B'$ ($j' = 0 \sim dx-1$)

FIG. 32

$$\theta s'(m) = \theta s'(m-1) + KPs'(m) \cdot ide'(m) \quad \cdots\cdots (30)$$

$$KPs'(m) = \frac{Ps'(m) \cdot \zeta s'(m)}{1 + \zeta s'(m)^T \cdot Ps'(m) \cdot \zeta s'(m)} \quad \cdots\cdots (31)$$

$$Ps'(m+1) = \frac{1}{\lambda 1'} \left[ I' - \frac{\lambda 2' \cdot Ps'(m) \cdot \zeta s'(m) \cdot \zeta s'(m)^T}{\lambda 1' + \lambda 2' \cdot \zeta s'(m)^T \cdot Ps'(m) \cdot \zeta s'(m)} \right] Ps'(m)$$

$$\cdots\cdots (32)$$

I' : UNIT MATRIX OF ORDER dx+2
$\lambda 1'$, $\lambda 2'$ : WEIGHTING PARAMETER $$\begin{aligned} ide'(m) &= Pre\_\theta msi(m-dx+1) - \theta msi(m) \\ &= \theta s'(m-1)^T \cdot \zeta s'(m) - \theta msi(m) \end{aligned} \quad \cdots\cdots (33)$$

$$\theta s'(m)^T = [\alpha 1', \alpha 2', \beta 1', \beta 2', \cdots \beta dx-1', \gamma 1'] \quad \cdots\cdots (34)$$

$$\begin{aligned} \zeta s'(m)^T = [&\theta msi(m-dx), \theta msi(m-dx-1), \\ &DUTY\_msi(m-dx), DUTY\_msi(m-dx-1), \cdots \\ &\cdots, DUTY\_msi(m-2dx+2), 1] \end{aligned} \quad \cdots\cdots (35)$$

FIG. 33

$$Es'(m) = \theta msi(m) - \theta msi\_cmd(m) \quad \cdots\cdots (36)$$

$$\sigma s'(m) = Es'(m) + Ss' \cdot Es'(m-1) \quad \cdots\cdots (37)$$

$$-1 < Ss' < 0 \quad \cdots\cdots (38)$$

$$DUTY\_msi(m) = Uspas'(m) = Ueq'(m) + Urch'(m) \quad \cdots\cdots (39)$$

$$\begin{aligned}Ueq'(m) = \frac{1}{\beta 1'} \{ &Pre\_\theta msi(m) + Ss' \cdot Pre\_\theta msi(m-1) \\ &- \alpha 1' \cdot Pre\_\theta msi(m-dx+1) - \alpha 2' \cdot \theta msi(m) \\ &- \beta 2' \cdot DUTY\_msi(m-1) - \cdots - \beta dx-1' \cdot DUTY\_msi(m-dx+2) - \gamma 1' \\ &+ \theta msi\_cmd(m+dx) + (Ss'-1) \cdot \theta msi\_cmd(m+dx-1) \\ &- Ss' \cdot \theta msi\_cmd(m+dx-2) \} \quad \cdots\cdots (40)\end{aligned}$$

$$Urch'(n) = \frac{-F'}{\beta 1'} \cdot \sigma s'(m+dx-1) \quad \cdots\cdots (41)$$

F' : REACHING LAW GAIN (0 < F' < 2)

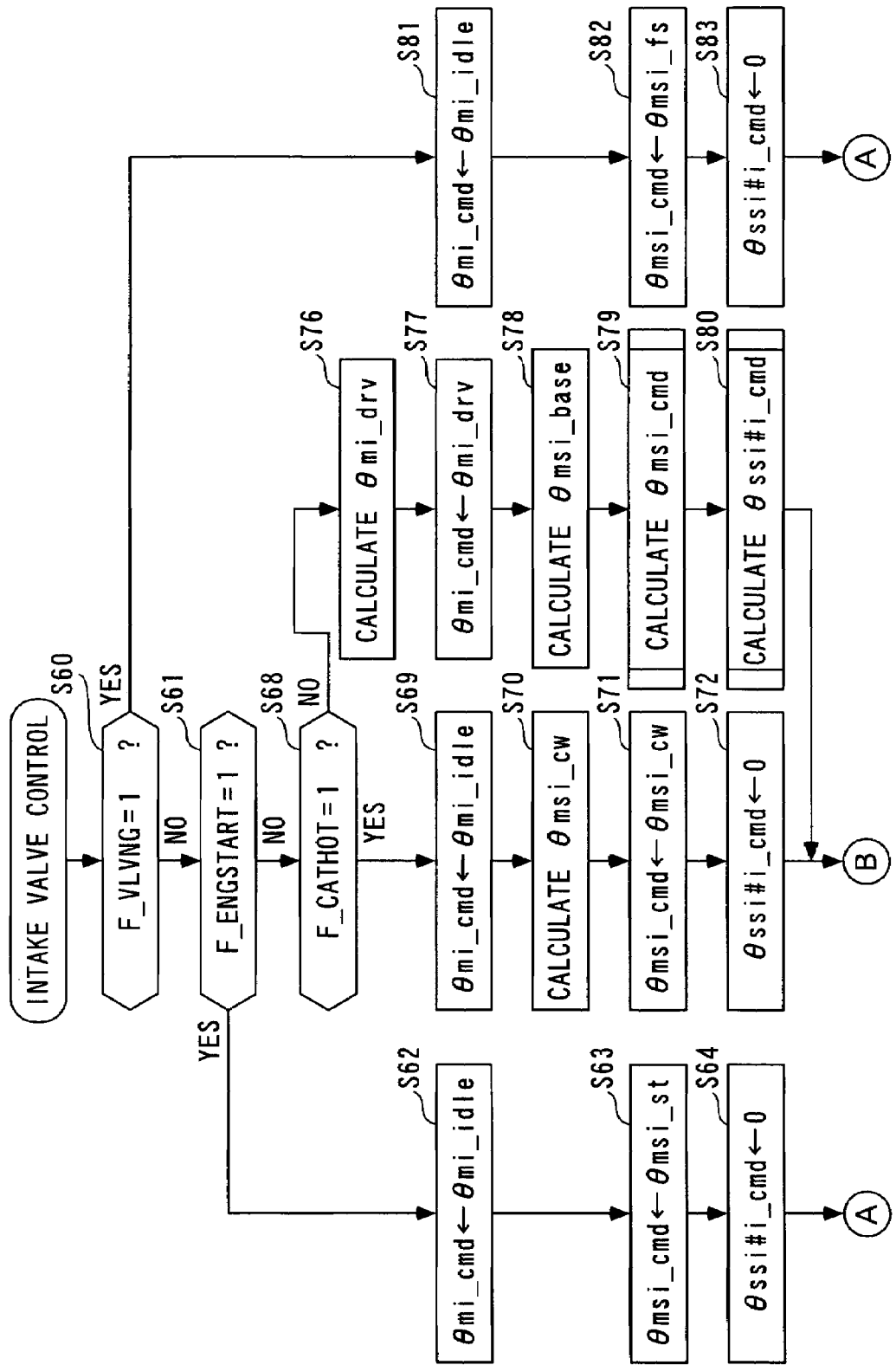

F I G. 4 5
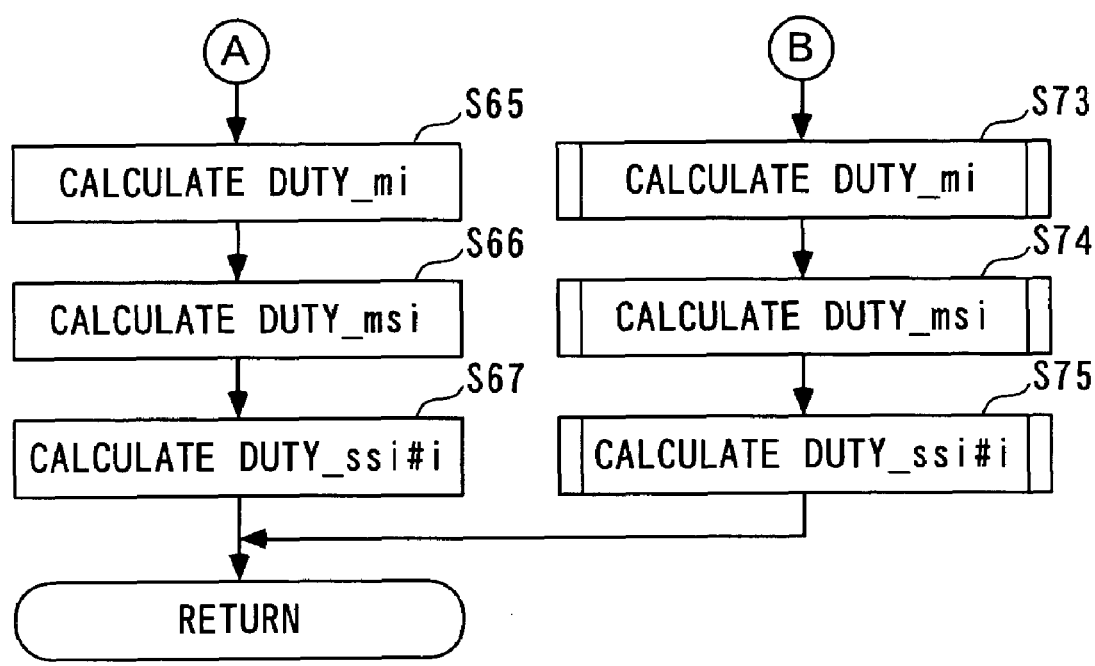

VALVE TIMING CONTROL SYSTEM AND CONTROL SYSTEM FOR AN INTERNAL COMBUSTION ENGINE

BACKGROUND OF THE INVENTION

1. Field of the Invention

The present invention relates to a valve timing control system for an internal combustion engine, for controlling valve timing of intake valves of the engine, and a control system for an internal combustion engine, for controlling boost pressure of intake air via a supercharging device and variably controlling valve-closing timing of intake valves with respect to valve-opening timing thereof as desired via a variable valve timing device.

2. Description of the Related Art

Conventionally, a valve timing control system for an internal combustion engine, for controlling valve timing of intake valves of the engine has been proposed e.g. in Japanese Laid-Open Utility Model Registration Publication (Kokoku) No. S56-9045 (pages 1 and 2, FIGS. 1 to 4). This engine includes a rocker arm for opening and closing each intake valve, and two cams, one for low load (low-load cam) and the other for high load (high-load cam), provided for the intake valve, and an actuator for switching the cam for actuating the rocker arm between the low-load cam and the high-load cam. The two cams are arranged adjacent to each other on a cam shaft, and have respective cam profiles configured such that the cam profile of the low-load cam provides the same valve-closing timing but more retarded valve-closing timing as compared with the cam profile of the high-load cam. Further, the rocker arm is provided on the rocker shaft in an axially slidable manner, and is actuated by the actuator such that it is slid between a position in which one end thereof is in abutment with the low-load cam and a position in which the same is in abutment with the high-load cam. In short, the actuator switches the cam for actuating the intake valve between the low-load cam and the high-load cam.

In this valve timing control system, through the control of the actuator, the cam for actuating the intake valve is switched to the low-load cam when the engine in a low-load region, and to the high-load cam when the same is in a high-load region, whereby the valve-closing timing of the intake valve is switched such that it is retarded when the engine is in the low-load region than when it is in the high-load region. The switching of the valve-closing timing is performed for the following reason: The amount of air to be drawn into the cylinder is smaller in the low-load region of the engine than in the high-load region of the same, and if the amount of intake air is reduced by reducing the degree of opening of a throttle valve, pumping loss occurs due to the lowering of pressure (increase in negative pressure) within the intake valve, resulting in degraded fuel economy. To avoid this inconvenience, the valve timing control system described above causes blow-back of intake air from within the cylinder by retarding the valve-closing timing of the intake valve in the low-load region than in the high-load region, whereby the amount of intake air drawn into the cylinder is reduced without reducing the degree of opening of the throttle valve.

Also, a valve timing control system for an internal combustion engine, for controlling valve timing of intake valves of the engine has been proposed in Japanese Laid-Open Patent Publication (Kokai) No. H07-269380 (pages 2 and 3, FIG. 7). This valve timing control system controls the phase of an intake cam for actuating each intake valve is controlled such that it is varied with respect to that of the crankshaft of the engine, whereby the intake valve has its valve-opening and valve-closing timing varied while holding a constant valve open time period.

According to the valve timing control system proposed in Japanese Laid-Open Utility Model Registration Publication (Kokoku) No. S56-9045, the cam for actuating the intake valve is merely switched between the low-load cam and the high-load cam, and hence, the valve-closing timing of the intake valve can only be switched between two types of timing determined by the respective cam profiles of the two cams. Therefore, this system is incapable of controlling the amount of intake air in an accurate and fine-grained manner, so that the amount of intake air may become short or excessive to make combustion unstable, degrade fuel economy, and increase exhaust emissions. If the valve timing of each intake valve is controlled by the valve timing control system proposed in Japanese Laid-Open Patent Publication (Kokai) No. H07-269380 in order to control the amount of intake air, the valve-opening and valve-closing timing of the intake valve are changed with the valve open time period of the intake held constant. This brings about a change in the valve overlap, which makes it impossible to provide control on the amount of intake air in a fine-grained manner, and at the same time degrades combustion performance of the engine and increase exhaust emissions due to changes in internal EGR.

Further, a control system for an internal combustion engine, for controlling boost pressure of intake air via a supercharging device has been conventionally proposed in Japanese Patent Publication (Kokoku) No. H03-37034 (pages 3 to 5, FIG. 3). This engine includes a turbocharger as the supercharging device and a knock sensor. In this turbocharger, as the degree of opening of a wastegate valve changes, the flow rate of exhaust gases to turbine blades is changed, whereby the boost pressure is changed. Further, the knock sensor is for detecting knocking in the engine, and delivers a pulse signal indicative of occurrence of knocking to the control system.

The control system counts the number of occurrences of knocking during one combustion cycle of the engine based on the pulse signal from the knock sensor, and sets a retard value for retarding ignition timing according to the number of occurrences of knocking during one combustion cycle and also a duty ratio of a drive signal to the wastegate valve according to the number of occurrences of knocking during four combustion cycles. More specifically, the retard value of ignition timing is set to a larger value, i.e. such that ignition timing is more retarded, as the number of occurrences of knocking during one combustion cycle is larger. Further, the duty ratio of the drive signal to the wastegate valve is set to a smaller value, i.e. such that the boost pressure becomes lower, as the number of occurrences of knocking during four combustion cycles is larger. Thus, when knocking occurs, the ignition timing is retarded and the boost pressure is lowered, whereby occurrence of knocking is suppressed.

According to the control system proposed in Japanese Patent Publication (Kokoku) No. H03-37034, when knocking occurs, ignition timing is retarded and at the same time boost pressure is lowered. This makes it possible to suppress occurrence of knocking in the high-load region of the engine, but due to execution of such control, combustion efficiency and engine output are both lowered, resulting in degraded drivability and lowered marketability.

SUMMARY OF THE INVENTION

It is a first object of the present invention to provide a valve timing control system, which is capable of controlling the amount of intake air in an accurate and fine-grained manner, and thereby maintaining excellent combustion performance and reduced exhaust emissions.

It is a second object of the present invention to provide a control system for an internal combustion engine, which is capable of improving both combustion efficiency and engine output while preventing occurrence of knocking in a high-load region, and thereby improving drivability and marketability.

To attain the above object, in a first aspect of the present invention, there is provided a valve timing control system for an internal combustion engine, for variably controlling valve-closing timing of an intake valve with respect to valve-opening timing thereof, via a variable valve timing device, the valve timing control system comprising:

load detecting means for detecting load on the engine;

valve-closing timing-determining means for determining the valve-closing timing of the intake valve according to the detected load on the engine; and control means for controlling the variable valve timing device according to the determined valve-closing timing of the intake valve.

With the arrangement of this valve timing control system for an internal combustion engine, the valve-closing timing-determining means determines the valve-closing timing of the intake valve according to the detected load on the engine, and the control means controls the variable valve timing device according to the determined valve-closing timing of the intake valve, whereby the amount of intake air drawn into the engine via the intake valve is controlled. Thus, the amount of intake air is controlled according to the load on the engine, and therefore it is possible to control the amount of intake air in a more accurate and fine-grained manner than the prior art, and thereby prevent the amount of intake air from becoming short or excessive. As a result, it is possible to maintain excellent combustion performance and reduced exhaust emissions.

Preferably, the valve-closing timing-determining means determines the valve-closing timing of the intake valve such that the valve-closing timing of the intake valve is retarded with respect to predetermined timing in which an expansion ratio becomes equal to a compression ratio in a combustion cycle of the engine, when the load on the engine is in a first predetermined load region, and determines the valve-closing timing of the intake valve such that the valve-closing timing of the intake valve is advanced with respect to the predetermined timing, when the load on the engine is in a second predetermined load region higher than the first predetermined load region.

With the arrangement of this preferred embodiment, when the load on the engine is in the first predetermined load region, the valve-closing timing of the intake valve is determined such that it is retarded with respect to the predetermined timing in which the expansion ratio becomes equal to the compression ratio in the combustion cycle of the engine (i.e. valve-closing timing of the Otto cycle operation), which makes it possible to operate the engine in a higher expansion ratio cycle in which the expansion ratio is larger than the compression ratio (i.e. Miller cycle). Therefore, by setting the first predetermined low-load region to a low-load region in which there arises a problem of pumping loss caused by reduction of the amount of intake air using the throttle valve, it becomes unnecessary to reduce the amount of intake air using the throttle valve, whereby the amount of intake air can be set to an appropriate value dependent on the low load on the engine while preventing pumping loss, whereby fuel economy can be improved. In addition, in general, when intake air temperature or engine temperature is low, if the valve-closing timing of the intake valve is set to advanced timing with respect to the predetermined timing, in a low-load region, there is a fear of occurrence of liquidation of fuel due to lowering of the cylinder internal temperature caused by adiabatic expansion of the mixture within the cylinder, making combustion of the engine unstable. In contrast, according to this valve timing control system, as described above, when the engine is in the first predetermined load region, the valve-closing timing of the intake valve is set to retarded timing with respect to the predetermined timing, and therefore by setting the first predetermined load region to the aforementioned low-load region in which liquidation of fuel can occur, it is possible to secure more excellent combustion performance than when the valve-closing timing is advanced with respect to the predetermined timing.

Further, in general, in a high-load region of the engine, if the valve-closing timing of the intake valve is set to the predetermined valve timing in which the expansion ratio becomes equal to the compression ratio, blow-back of fuel into the intake manifold can occur, causing increases in the amount of fuel remaining in the intake manifold and the amount of fuel adhering to the inner wall of the intake manifold, which degrades the accuracy of controls, including an air-fuel ratio control and a torque control, particularly in a transient operating condition of the engine. More specifically, deviation of the air-fuel ratio of the mixture to the rich side can cause an unnecessary increase in output torque and an increase in the amount of unburned HC in exhaust gases. In addition, adhering of the blown-back fuel to devices of the intake system, such as the intake valves, in a carbonized state, can shorten the service lives of the devices. These problems become conspicuous or more serious when the valve-closing timing of the intake valve is set to retarded timing with respect to the predetermined timing, in a high-load region of the engine, since the amount of fuel blown-back into the intake manifold is increased. An excessively enriched mixture can cause misfiring of the engine, for example. In contrast, according to the present valve timing control system, when the engine is in the second predetermined load region higher than the first predetermined load region, the valve-closing timing of the intake valve is determined such that it is advanced with respect to the predetermined valve timing. Therefore, by setting the second predetermined load region to the aforementioned high-load region in which the above problem of fuel blow-back can occur, it is possible to prevent fuel from being blown-back into the intake manifold in such a high-load region. As a result, it is possible to improve the accuracy of the air-fuel ratio control and the torque control, and particularly markedly improve the control accuracy in the transient operation condition of the engine. This makes it possible not only to reduce exhaust emissions and improve drivability, but also prolong the service life of the devices of the intake system.

Preferably, the variable valve timing device is formed by a hydraulically-driven variable valve timing device which is driven by supply of oil pressure, and the control means controls the oil pressure supplied to the hydraulically-driven variable valve timing device.

With the arrangement of this preferred embodiment, the variable valve timing device is by a hydraulically-driven variable valve timing device which is driven by supply of oil pressure, and therefore, compared, for example, with a case of using the variable valve timing device which actuates the valve element of an intake valve by the electromagnetic force of a solenoid, it is possible to reliably open and close the intake valve in a higher load range of the engine, and hence reduce power consumption, and operating noise of the intake valve.

Preferably, the variable valve timing device is configured to be capable of changing an amount of valve lift of the intake valve as desired.

With the arrangement of this preferred embodiment, the variable valve timing device is capable of changing the amount of the valve lift of the intake valve as desired, and therefore, by controlling the amount of the valve lift to a smaller value, the velocity at which the intake air flows into the combustion chamber can be increased to increase the flow of the mixture within the cylinder, thereby enhance combustion efficiency.

Preferably, the variable valve timing device is configured to be capable of changing an amount of valve lift of the intake valve as desired, and the valve timing control system further comprises valve lift amount-determining means for determining the amount of valve lift of the intake valve such that the amount of valve lift of the intake valve is smaller when the load on the engine is in a third predetermined range lower than a predetermined load than when the load on the engine is not lower than the predetermined load, the valve-closing timing-determining means determining the valve-closing timing of the intake valve such that the valve-closing timing of the intake valve is advanced with respect to predetermined timing in which an expansion ratio becomes equal to a compression ratio in a combustion cycle of the engine, when the load on the engine is within the third predetermined load region, and the control means controlling the variable valve timing device according to the determined valve-closing timing and the determined amount of valve lift of the intake valve.

As described above, when intake air temperature or engine temperature is low, if the valve-closing timing of the intake valve is set to advanced timing with respect to the predetermined timing in which the expansion ratio becomes equal to the compression ratio in the combustion cycle of the engine, in a low-load region, there is a fear of occurrence of liquidation of fuel due to lowering of the cylinder internal temperature caused by adiabatic expansion of the mixture within the cylinder, making combustion of the engine unstable. In contrast, with the arrangement of this preferred embodiment, when the load on the engine is in the third predetermined load region lower than the predetermined load, the amount of valve lift of the intake valve is set to a smaller value than when the load on the engine is the predetermined load, so that the velocity at which the intake air flows into the combustion chamber is increased to increase the flow of the mixture within the cylinder, which contributes to increased combustion speed. As a result, by setting the third predetermined load region to such a low-load region, it is possible to prevent liquidation of fuel, even in the low-load region, thereby ensuring stable combustion performance of the engine.

Preferably, the variable intake valve timing device comprises an intake rocker arm for actuating the intake valve by pivotal motion thereof to open and close the intake valve, a movable pivot for pivotally supporting the intake rocker arm, a first intake camshaft and a second intake camshaft that rotate at a same rotational speed, a variable intake cam phase mechanism for varying a relative phase between the first intake camshaft and the second intake camshaft, a first intake cam provided on the first intake camshaft, for rotation along with rotation of the first intake camshaft, thereby causing the intake rocker arm to pivotally move about the pivot, and a second intake cam provided on the second intake camshaft, for rotation along with rotation of the second intake camshaft, thereby moving the pivot around which the intake rocker arm is pivotally moved.

With the arrangement of this preferred embodiment, in the variable intake valve timing device, the first intake cam rotates in accordance with rotation of the first intake camshaft, thereby causing the intake rocker arm to rotate about the pivot, which actuates the intake valve to open and close the same. In the meanwhile, the second intake cam rotates in accordance with rotation of the second intake camshaft, thereby moving the pivot about which the intake rocker arm is pivotally moved, which makes it possible to change the amount of valve lift of the intake valve as desired. Further, since the variable intake cam phase mechanism changes the relative phase between the first and second intake camshafts, it is possible to change both the valve-closing timing and the amount of valve lift of the intake valve as desired. That is, by using two intake cams and two intake camshafts, and the variable intake cam phase mechanism, it is possible to realize a variable intake valve timing device which can change the valve-closing timing and the amount of valve lift of the intake valve as desired.

To attain the above second object, in a second aspect of the present invention, there is provided a control system for an internal combustion engine, for controlling boost pressure of intake air via a supercharging device provided in an intake passage, and variably controlling valve-closing timing of an intake valve with respect to valve-opening timing of the intake valve via a variable valve timing device, the control system comprising:

load-detecting means for detecting load on the engine;

target boost pressure-setting means for setting a target boost pressure as a target of boost pressure control, according to the detected load on the engine;

supercharging control means for controlling the supercharging device according to the set target boost pressure;

target valve-closing timing-setting means for setting target valve-closing timing as a target of valve-closing timing control of the intake valve, such that when the detected load on the engine is in a predetermined high-load region higher than a predetermined load, the target valve-closing timing is set to such timing as makes the expansion ratio closer to the compression ratio in the combustion cycle, when the expansion ratio is higher than the compression ratio and as the detected load on the engine is higher; and valve timing control means for controlling the variable valve timing device according to the set target valve-closing timing.

With the arrangement of this control system for an internal combustion engine, the supercharging device is controlled according to the target boost pressure as a target of boost pressure control, and at the same time, the variable valve timing device is controlled according to the target valve-closing timing as a target of valve-closing timing control of the intake valve. In doing this, when the detected load on the engine is in a predetermined high-load region higher than a predetermined load, the target valve-closing timing is set to such timing as makes the expansion ratio closer to the compression ratio in the combustion cycle, when the expansion ratio is higher than the compression ratio and as the detected load on the engine is higher. In other words, in the predetermined high-load region, control is provided such that as the load on the engine is higher, the effective compression volume is increased. Therefore, even when the load on the engine is high, it is possible to suppress the increase in the boost pressure used for ensuring the demanded engine output, whereby it is possible to suppress increase in intake air temperature. Therefore, in the predetermined high-load region, it is possible to expand a limit of ignition timing beyond which knocking starts to occur, without retarding ignition timing, and improve both of combustion efficiency and engine output. As a result, it is possible to improve drivability and marketability.

Preferably, the target valve-closing timing-setting means sets the valve-closing timing of the intake valve to advanced timing with respect to predetermined timing in which an expansion ratio becomes equal to a compression ratio in a combustion cycle of the engine, when the load on the engine is within the predetermined high-load region.

In general, there are two techniques for realizing a so-called high expansion ratio cycle operation in which the expansion ratio exceeds the compression ratio in the combustion cycle: retarded valve-closing technique that retards the valve-closing timing of intake valves with respect to valve timing of so-called Otto-cycle (hereinafter referred to as "the Otto valve-closing timing"), and advanced valve-closing technique that advances the same with respect to the Otto valve-closing timing. In this case, in the former (retarded valve-closing) technique, blow-back of fuel into the intake manifold can occur, causing increases in the amount of fuel remaining in the intake manifold and the amount of fuel adhering to the inner wall of the intake manifold, which degrades the accuracy of controls, including an air-fuel ratio control and a torque control, particularly in a transient operating condition of the engine. More specifically, deviation of the air-fuel ratio of the mixture to the rich side can cause an unnecessary increase in output torque and an increase in the amount of unburned HC in exhaust gases. In addition, adhering of the blown-back fuel to devices of the intake system, such as the intake valves, in a carbonized state, can shorten the service lives of the devices. These problems become conspicuous or more serious in a high-load region of the engine. In contrast, according to the present valve timing control system, when the engine is in the predetermined high-load region, the valve-closing timing of the intake valve is determined such that it is advanced with respect to the predetermined valve timing in which the expansion ratio becomes equal to the compression ratio in the combustion cycle of the engine (i.e. the Otto valve-closing timing). In other words, the high expansion ratio cycle operation is realized by the latter (advanced valve-closing) technique, and therefore, the problems caused by the former technique are not brought about. As a result, compared with the former (retarded valve-closing technique), it is possible to improve the accuracy of the air-fuel ratio control and the torque control in the high-load region of the engine, and particularly markedly improve the control accuracy in the transient operation condition of the engine. This makes it possible not only to reduce exhaust emissions and improve drivability, but also prolong the service lives of the devices of the intake system.

Preferably, the target valve-closing timing-setting means sets the valve-closing timing of the intake valve to timing in which an expansion ratio is larger than a combustion ratio in a combustion cycle of the engine, when the load on the engine is a predetermined low-load region lower than the predetermined high-load region.

With the arrangement of this preferred embodiment, when the load on the engine is in the predetermined low-load region lower than the predetermined high-load region, the valve-closing timing of the intake valve is set to timing in which the expansion ratio is larger than the combustion ratio in the combustion cycle of the engine, whereby the engine is operated in the high expansion ratio cycle. This makes it unnecessary to reduce the amount of intake air using the throttle valve, and therefore it is possible to set the amount of intake air to an appropriate value dependent on the low load on the engine while preventing pumping loss, and thereby improve fuel economy.

Preferably, the target valve-closing timing-setting means sets the valve-closing timing of the intake valve to retarded timing with respect to predetermined timing in which the expansion ratio becomes equal to the combustion ratio in the combustion cycle of the engine.

As described above, to realize the high expansion ratio cycle operation, the two techniques are conventionally employed: the retarded valve-closing technique for retarding the valve-closing timing of intake valves with respect to the Otto valve-closing timing, and the advanced valve-closing technique for advancing the same with respect to the Otto valve-closing timing. In the case of the latter technique, when intake temperature or engine temperature is low, there is a fear of occurrence of liquidation of fuel due to lowering of the cylinder internal temperature caused by adiabatic expansion of the mixture within the cylinder, making combustion of the engine unstable. In contrast, with the arrangement of the preferred embodiment, the high expansion ratio cycle operation is realized by setting the valve-closing timing of the intake valves to retarded timing with respect to the Otto valve-closing timing, which makes it possible to prevent the above-described problem of liquidation of fuel, in the predetermined low-load region, thereby ensuring stable combustion performance of the engine.

Preferably, the target boost pressure-setting means sets the target boost pressure to a smaller value as the load on the engine is higher, when the load on the engine is within the predetermined high-load region.

With the arrangement of this preferred embodiment, when the load on the engine is within the predetermined high-load region, the target boost pressure is set to a smaller value as the load on the engine is higher. Therefore, as the load on the engine is higher, the degree of rise in intake air temperature can be reduced. Therefore, by setting this high-load region to such a load region in which knocking is liable to occur, it is possible to further expand the limit of ignition timing beyond which knocking starts to occur, without retarding ignition timing.

Preferably, the variable valve timing device is formed by a hydraulically-driven variable valve timing device which is driven by supply of oil pressure, and the valve timing control means controls the oil pressure supplied to the hydraulically-driven variable valve timing device.

With the arrangement of this preferred embodiment, the variable valve timing device is formed by a hydraulically-driven variable valve timing device which is driven by supply of oil pressure, and therefore, compared, for example, with a case of using the variable valve timing device which actuates the valve element of an intake valve by the electromagnetic force of a solenoid, it is possible to reliably open and close the intake valve in a higher load region of the engine, and reduce power consumption and operating noise of the intake valve.

Preferably, the variable valve timing device is configured to be capable of changing an amount of valve lift of the intake valve as desired.

With the arrangement of this preferred embodiment, the variable valve timing device is configured to be capable of changing the amount of the valve lift of the intake valve as desired, and therefore, by controlling the amount of the valve lift to a smaller value, the velocity at which the intake air flows into the combustion chamber can be increased to increase the flow of the mixture within the cylinder, thereby enhance combustion efficiency.

Preferably, the variable intake valve timing device comprises an intake rocker arm for actuating the intake valve by pivotal motion thereof to open and close the intake valve, a movable pivot for pivotally supporting the intake rocker arm, a first intake camshaft and a second intake camshaft that rotate at a same rotational speed, a variable intake cam phase mechanism for varying a relative phase between the first intake camshaft and the second intake camshaft, a first intake cam provided on the first intake camshaft, for rotation along with rotation of the first intake camshaft, thereby causing the intake rocker arm to pivotally move about the pivot, and a second intake cam provided on the second intake camshaft, for rotation along with rotation of the second intake camshaft, thereby moving the pivot around which the intake rocker arm is pivotally moved.

With the arrangement of this preferred embodiment, in the variable intake valve timing device, the first intake cam rotates in accordance with rotation of the first intake camshaft, thereby causing the intake rocker arm to rotate about the pivot, which actuates the intake valve to open and close the same. In the meanwhile, the second intake cam rotates in accordance with rotation of the second intake camshaft, thereby moving the pivot about which the intake rocker arm is pivotally moved, which makes it possible to change the amount of valve lift of the intake valve as desired. Further, since the variable intake cam phase mechanism changes the relative phase between the first and second intake camshafts, it is possible to change both the valve-closing timing and the amount of valve lift of the intake valve as desired. That is, by using two intake cams and two intake camshafts, and the variable intake cam phase mechanism, it is possible to realize a variable intake valve timing device which can change the valve-closing timing and the amount of valve lift of the intake valve as desired.

Preferably, the engine includes a first fuel injection valve for injecting fuel to supply the fuel into a cylinder, and an intake air cooling device disposed in the intake passage at a location downstream of the supercharging device, for cooling intake air from the supercharging device, and the intake air cooling device includes lipophilic film plates having formed on surfaces thereof lipophilic films having affinity to fuel, and a second fuel injection valve for injecting fuel toward the lipophilic film plates to thereby supply the fuel to the cylinder.

With the arrangement of the preferred embodiment, fuel is injected from the first fuel injection valve and also injected from the second fuel injection valve of the intake air cooling device toward the lipophilic film plates. Since the lipophilic film plates have formed on surfaces thereof lipophilic films having affinity to fuel, fuel is formed into thin films on the lipophilic films, and then evaporated by the heat of intake air the temperature of which has been raised by supercharging operation of the supercharging device to form a mixture of air and fuel, and at the same time, the intake air is cooled by being deprived of heat of evaporation used for evaporation of the fuel. Thus, as the mixture is formed, the intake air-cooling effect can be obtained, whereby the limit of ignition timing beyond which knocking starts to occur can be further expanded without retarding ignition timing.

Preferably, the control system further comprise fuel injection ratio-setting means for setting a first fuel injection ratio of an amount of fuel to be injected by the first fuel injection valve to an amount of fuel to be supplied to the cylinder and a second fuel injection ratio of an amount of fuel to be injected by the second fuel injection valve to the amount of fuel to be supplied to the cylinder, according to the load on the engine, such that the second fuel injection ratio is larger as the load on the engine is higher.

In general, as the load on the engine is higher, the boost pressure is set to a higher value, which increase the degree of rise in the intake air temperature. In contrast, with the arrangement of this preferred embodiment, the second fuel injection ratio to be supplied from the second fuel injection valve is set to a larger value as the load on the engine is increased, and therefore, it is possible to more effectively and more appropriately obtain the intake air-cooling effects by the intake air-cooling device in dependence on the degree of rise in the intake air temperature.

The above and other objects, features, and advantages of the present invention will become more apparent from the following detailed description taken in conjunction with the accompanying drawings.

BRIEF DESCRIPTION OF THE DRAWINGS

FIG. 1 is a diagram schematically showing the arrangement of an internal combustion engine to which is applied a control system (valve timing control system/control system) according to an embodiment of the present invention;

FIG. 24 is a diagram showing respective groups of mathematical expressions with which a cylinder intake air amount Gcyl is calculated, and mathematical expressions of a prediction algorithm of a state predictor of a first SPAS controller;

FIG. 25 is a diagram showing mathematical expressions of an identification algorithm of an onboard identifier of the first SPAS controller;

FIG. 26 is a diagram showing mathematical expressions of a sliding mode control algorithm of a sliding mode controller of the first SPAS controller;

FIG. 27 is a diagram showing mathematical expressions useful for explaining a method of deriving an equation (19) in FIG. 26;

FIG. 31 is a diagram showing mathematical expressions of a prediction algorithm of a state predictor of the second SPAS controller;

FIG. 32 is a diagram showing mathematical expressions of an identification algorithm of an onboard identifier of the second SPAS controller;

FIG. 33 is a diagram showing mathematical expressions of a sliding mode control algorithm of a sliding mode controller of the second SPAS controller;

FIG. 44 is a flowchart showing a subroutine for carrying out an intake valve control process;

FIG. 45 is a continuation of the FIG. 44 flowchart;

DETAILED DESCRIPTION OF THE PREFERRED EMBODIMENTS

Figure 2:
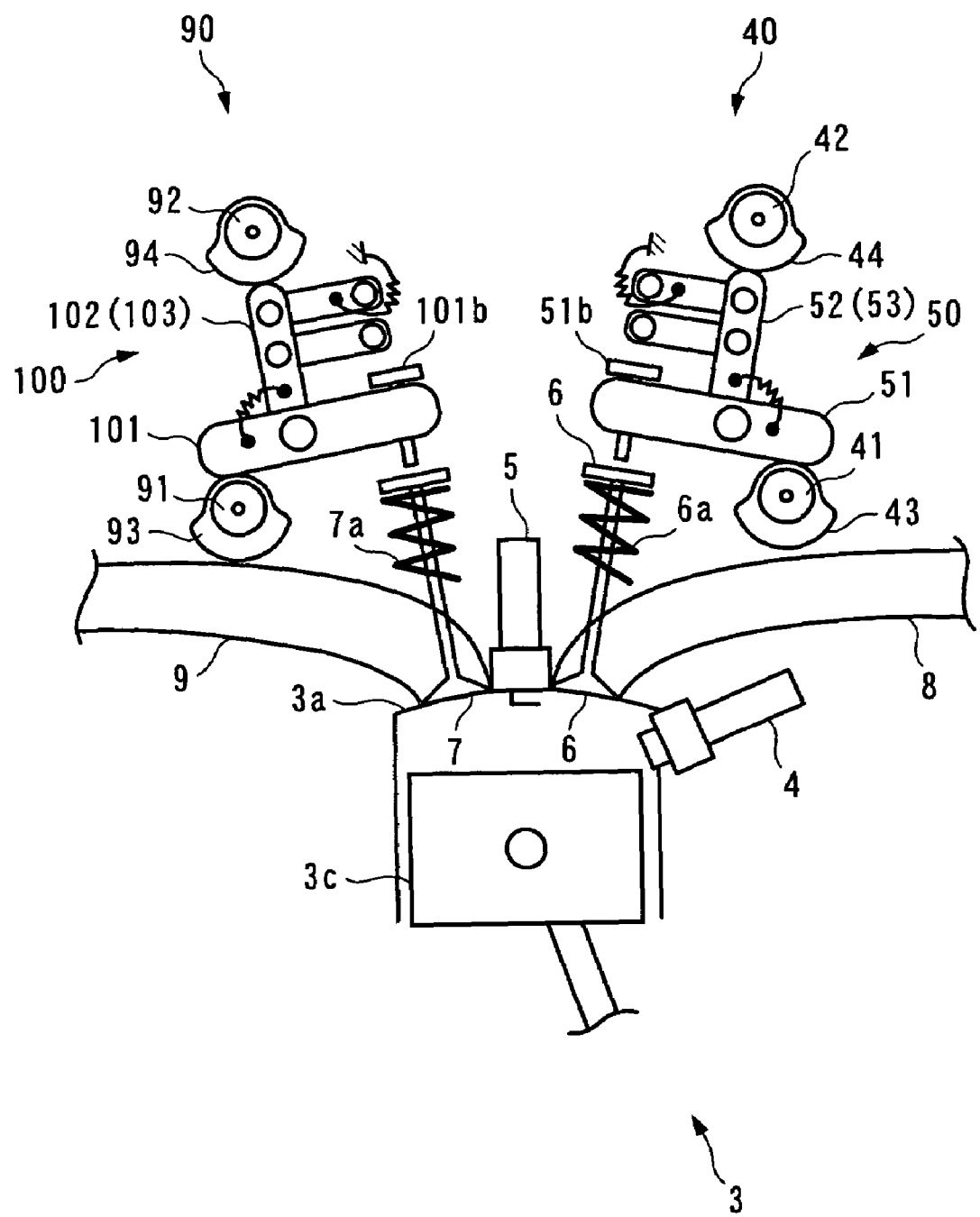
FIG. 2 is a diagram schematically showing the arrangement of a variable intake valve actuation assembly and a variable exhaust valve actuation assembly, for the engine.
Figure 3:
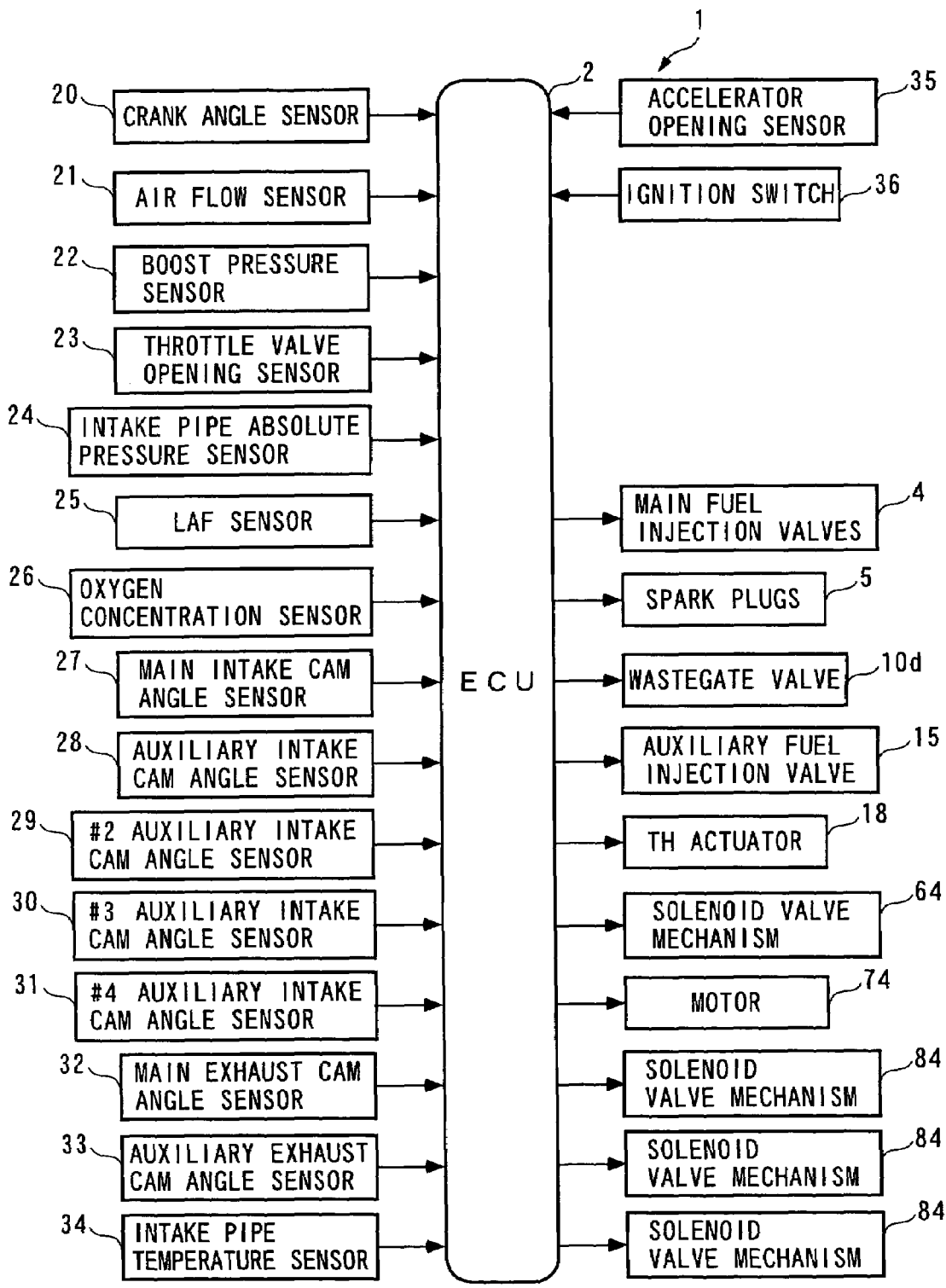
FIG. 3 is a block diagram schematically showing the arrangement of the control system.

The invention will now be described in detail with reference to the drawings showing a preferred embodiment thereof. Referring first to FIGS. 1 and 2, there is schematically shown the arrangement of an internal combustion engine 3 (hereinafter simply referred to as "the engine 3") to which is applied a valve timing control system/control system 1 for an internal combustion engine (hereinafter referred to "the control system 1"), according to the present embodiment. FIG. 3 schematically shows the arrangement of the control system 1. As shown in FIG. 3, the control system 1 includes an ECU 2. The ECU 2 carries out control processes, as described hereinafter, including a process for control of valve timing of intake valves 6 and a boost pressure control process, based on operating conditions of the engine 3.

Figure 5:
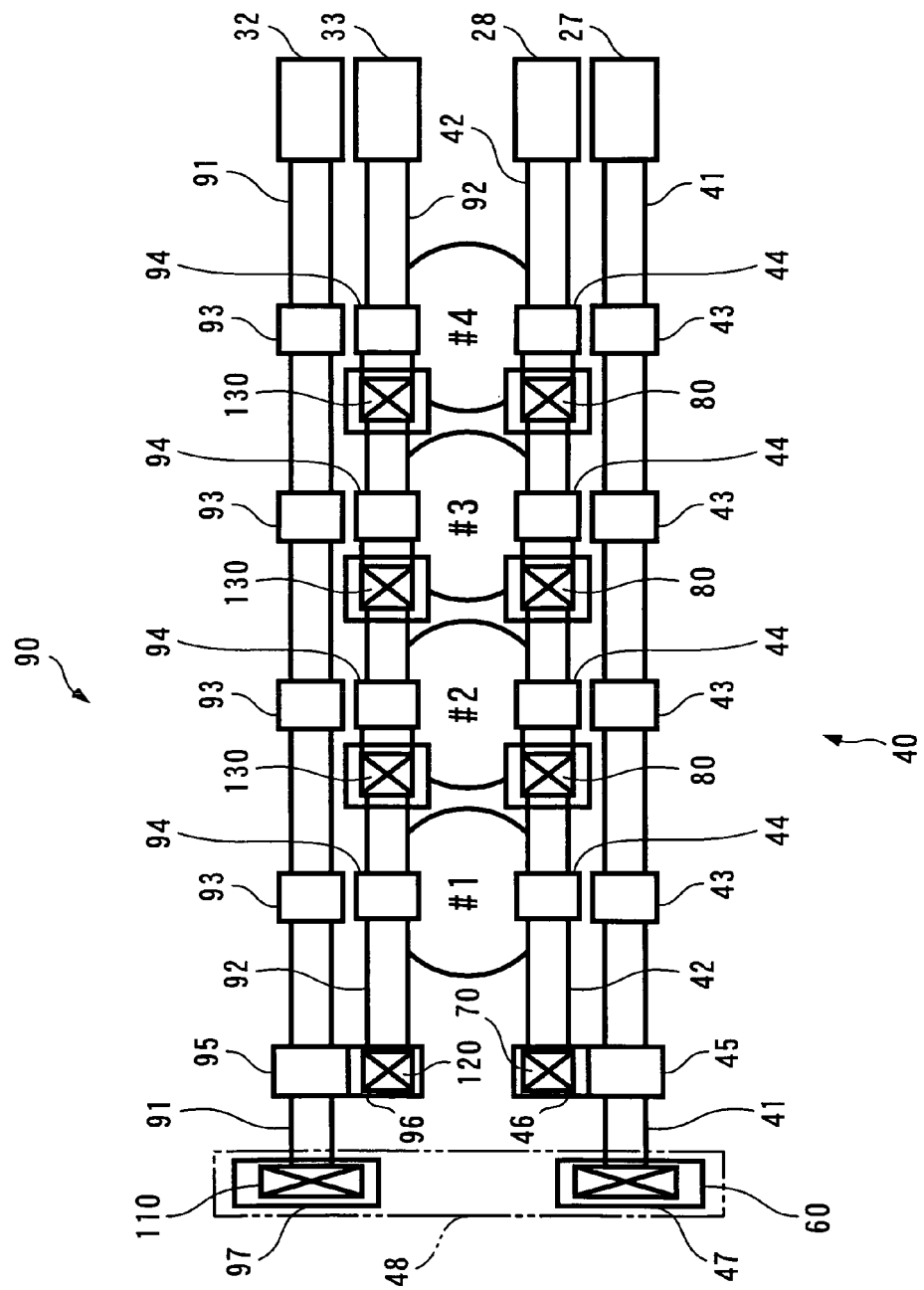
FIG. 5 is a diagram schematically showing the arrangement of the variable intake valve actuation assembly and the variable exhaust valve actuation assembly, in plan view.

The engine 3 is an inline four-cylinder gasoline engine installed on an automotive vehicle, not shown, and has first to fourth cylinders #1 to #4 (see FIG. 5). Further, the engine 3 includes main fuel injection valves 4 (only one of which is shown)(first fuel injection valve) and spark plugs 5 (only one of which is shown), provided for the respective cylinders #1 to #4. The main fuel injection valves 4 and the spark plugs 5 are all mounted through respective cylinder heads 3a. Each main fuel injection valve 4 is electrically connected to the ECU 2, and controlled in respect of a fuel injection amount and fuel injection timing thereof, by a control input from the ECU 2, for direct injection of fuel into the combustion chamber of the associated cylinder.

Further, each spark plug 5 is also electrically connected to the ECU 2. When the spark plug 5 has a high voltage applied thereto based on a signal from the ECU 2 in timing corresponding to ignition timing, the spark plug 5 causes a spark discharge, thereby burning a mixture within the combustion chamber.

Further, the engine 3 includes, on a cylinder-by-cylinder basis, an intake valve 6 and an exhaust valve 7 that open and close an intake port and an exhaust port, respectively, a variable intake valve actuation assembly 40 that actuates the intake valve 6 to open and close the same and at the same time changes the valve timing and the amount of the valve lift of the intake valve 6, and a variable exhaust valve actuation assembly 90 that actuates the exhaust valve 7 to open and close the same and at the same time changes the valve timing and the amount of the valve lift of the exhaust valve 7. Details of the variable intake valve actuation assembly 40 and the variable exhaust valve actuation assembly 90 will be described hereinafter. Further, the intake valve 6 and the exhaust valve 7 are urged in the valve-closing directions by valve springs 6a and 7a, respectively.

A magnet rotor 20a is mounted on a crankshaft 3b of the engine 3. The magnet rotor 20a constitutes a crank angle sensor 20 (load detecting means) together with an MRE (magnetic resistance element) pickup 20b. The crank angle sensor 20 delivers a CRK signal and a TDC signal, which are both pulse signals, to the ECU 2 in accordance with rotation of the crankshaft 3b.

Each pulse of the CRK signal is generated whenever the crankshaft 3b rotates through a predetermined angle (e.g. 30 degrees). The ECU 2 determines the rotational speed NE of the engine 3 (hereinafter referred to as "the engine speed NE") based on the CRK signal. The TDC signal indicates that each piston 3c in the associated cylinder is in a predetermined crank angle position immediately before the TDC position at the start of the intake stroke, and each pulse of the TDC signal is generated whenever the crankshaft 3b rotates through a predetermined angle (180 degrees in the example of the present embodiment).

In an intake pipe 8 (intake passage) of the engine 3, there are arranged a turbocharger device 10, an intercooler 11, a fuel evaporation cooling device 12, a throttle valve mechanism 16, and so forth, from upstream to downstream in the mentioned order at respective locations of the intake pipe 8.

The turbocharger device 10 (supercharging device) is comprised of a compressor blade 10a housed in a compressor housing provided in an intermediate portion of the intake pipe 8, a turbine blade 10b housed in a turbine housing provided in an intermediate portion of an exhaust pipe 9, a shaft 10c integrally formed with the two blades 10a and 10b for connection thereof, and a wastegate valve 10d.

In the turbocharger device 10, when the turbine blade 10b is driven for rotation by exhaust gases flowing through the exhaust pipe 9, the compressor blade 10a integrally formed with the turbine blade 10b is also rotated, whereby intake air within the intake pipe 8 is pressurized, that is, supercharging operation is performed.

Further, the wastegate valve 10d is provided for opening and closing a bypass exhaust passage 9a that bypasses the turbine blade 10b disposed across the exhaust pipe 9, and implemented by a solenoid control valve connected to the ECU 2 (see FIG. 3). The wastegate valve 10d is changed in the degree of opening thereof by a control input Dut_wg from the ECU 2 to thereby change the flow rate of exhaust gases flowing through the bypass exhaust passage 9a, in other words, the flow rate of exhaust gases for driving the turbine blade 10b. Thus, the boost pressure Pc of intake air created by the turbocharger device 10 is controlled.

Further, there is provided an air flow sensor 21 in the intake pipe 8 at a location upstream of the compressor blade 10a. The air flow sensor 21 is formed by a hot-wire air flow meter, for detecting an amount Gth of intake air (hereinafter referred to as "the TH passing intake air amount Gth") flowing through a throttle valve 17, referred to hereinafter, and delivers a signal indicative of the sensed TH passing intake air amount Gth to the ECU 2.

The intercooler 11 is of a water cooling type. When intake air passes through the intercooler 11, the intercooler 11 cools the intake air whose temperature has been raised by the supercharging operation (pressurizing operation) by the turbocharger device 10.

Further, disposed between the intercooler 11 and the fuel evaporation cooling device 12 in the intake pipe 8 is a boost pressure sensor 22 which is formed e.g. by a semiconductor pressure sensor. The boost pressure sensor 22 detects the pressure of intake air within the intake pipe 8, pressurized by the turbocharger device 10, that is, the boost pressure Pc (absolute pressure), and delivers a signal indicative of the sensed boost pressure Pc to the ECU 2.

Figure 4:
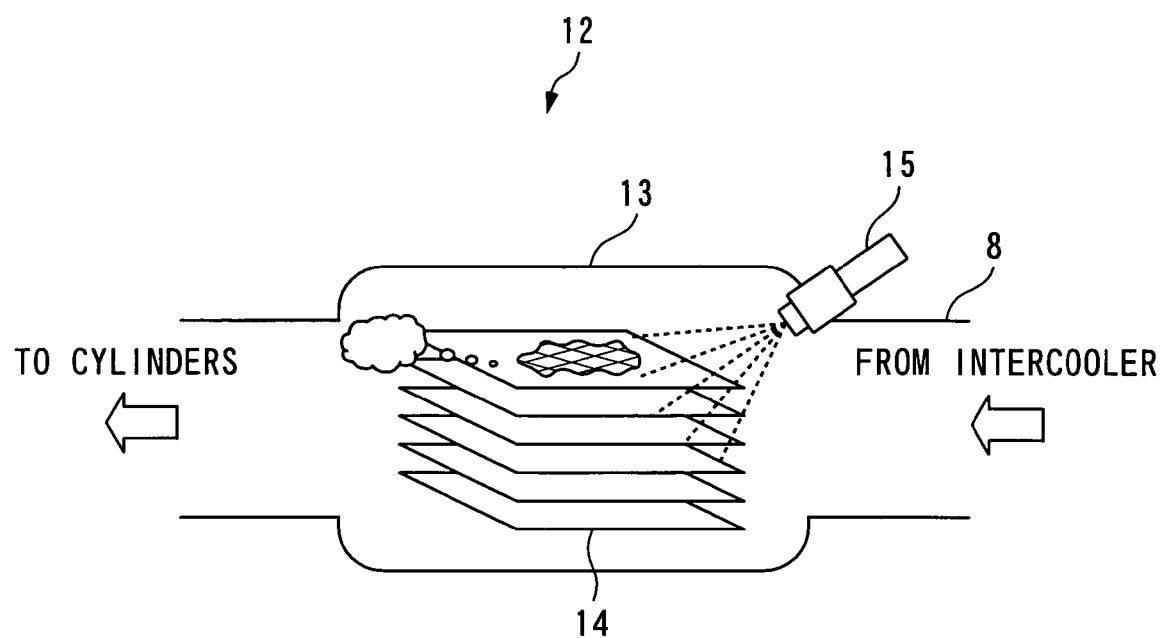
FIG. 4 is a diagram schematically showing the arrangement of a fuel evaporation cooling device.

The fuel evaporation cooling device 12 (intake air cooling device) evaporates fuel to generate a mixture, and lowers the temperature of intake air through evaporation of the fuel. As shown in FIG. 4, the fuel evaporation cooling device 12 is comprised of a housing 13 provided at an intermediate portion of the intake pipe 8, a large number of lipophilic film plates 14 (only six of which are shown) housed in the housing 13 such that they are parallel to and spaced from each other by a predetermined distance, and an auxiliary fuel injection valve 15 (second fuel injection valve).

The auxiliary fuel injection valve 15 is connected to the ECU 2, and controlled in respect of a fuel injection amount and fuel injection timing thereof by a control input from the ECU 2, to thereby inject fuel toward the large number of lipophilic film plates 14. It should be noted that as described hereinafter, a total fuel injection amount TOUT of fuel to be injected from both of the auxiliary fuel injection valve 15 and the main fuel injection valve 4 is determined based on the operating conditions of the engine 3, and the ratio of an amount of fuel to be injected from the main fuel injection valve 4 (main fuel injection ratio Rt_Pre, referred to hereinafter) to the total fuel injection amount TOUT, and the ratio of an amount of fuel to be injected from the auxiliary fuel injection valve 15 to the same are determined based on the operating conditions of the engine 3. Further, lipophilic films having a fuel affinity are formed on the surfaces of the lipophilic film plates 14.

With the above arrangement of the fuel evaporation cooling device 12, fuel injected from the auxiliary fuel injection valve 15 is formed into thin films on the surfaces of the lipophilic film plates 14 by lipophilicity thereof, and then evaporated by the heat of intake air. As a result, a mixture of air and fuel is generated, and the intake air is cooled by being deprived of heat of evaporation used for evaporation of the fuel. A cooling effect provided by the fuel evaporation cooling device 12 makes it possible to enhance charging efficiency and expand a limit of operation of the engine 3 within which knocking does not occur. For example, in a high-load operating condition of the engine 3, a limit of ignition timing beyond which knocking starts to occur can be expanded in an advancing direction by a predetermined crank angle (e.g. 2 degrees), thereby making it possible to increase combustion efficiency.

The throttle valve mechanism 16 includes the throttle valve 17, and a TH actuator 18 for opening and closing the throttle valve 17. The throttle valve 17 is pivotally arranged across an intermediate portion of the intake pipe 8 such that the throttle valve 17 is pivotally moved to change the degree of opening thereof, thereby changing the TH passing intake air amount Gth. The TH actuator 18 is implemented by a combination of a motor, not shown, connected to the ECU 2, and a gear mechanism, not shown, and controlled by a control input DUTY_th, described hereinafter, from the ECU 2 to thereby change the degree of opening of the throttle valve 17.

The throttle valve 17 has two springs (neither of which is shown) mounted thereto for urging the throttle valve 17 in the valve-opening direction and the valve-closing direction, respectively. When the control input DUTY_th is not inputted to the TH actuator 18, the throttle valve 17 is held at a predetermined initial valve opening degree TH_def by the urging forces of the above two springs. The initial valve opening degree TH_def is set to a value (e.g. 7 degrees) which corresponds to an almost fully-closed state, but at the same time ensures the amount of intake air required for starting the engine 3.

In the vicinity of the throttle valve 17 disposed in the intake pipe 8, there is provided a throttle valve opening sensor 23 implemented e.g. by a potentiometer. The throttle valve opening sensor 23 detects the degree of actual opening (hereinafter referred to as "the throttle valve opening") TH of the throttle valve 17, and delivers an electric signal indicative of the detected throttle valve opening TH to the ECU 2.

A portion of the intake pipe 8 downstream of the throttle valve 17 forms a surge tank 8a into which is inserted an intake pipe absolute pressure sensor 24. The intake pipe absolute pressure sensor 24 is implemented e.g. by a semiconductor pressure sensor, and detects an absolute pressure PBA in the intake pipe 8 (hereinafter referred to as "the intake pipe absolute pressure PBA"), to deliver a signal indicative of the sensed intake pipe absolute pressure PBA to the ECU 2.

On the other hand, in the exhaust pipe 9, there are arranged first and second catalytic converters 19a and 19b from upstream to downstream in the mentioned order at respective locations downstream of the turbine blade 10b. The catalytic converters 19a and 19b eliminate NOx, HC, and CO from exhaust gases.

An oxygen concentration sensor (hereinafter referred to as "the O2 sensor") 26 is inserted into the exhaust pipe 9 between the first and second catalytic converters 19a and 19b. The O2 sensor 26 is comprised of a zirconia layer and platinum electrodes, and detects the concentration of oxygen contained in exhaust gases downstream of the first catalytic converter 19a, to deliver a signal indicative of the detected oxygen concentration to the ECU 2.

Further, a LAF sensor 25 is inserted into the exhaust pipe 9 at a location between the turbine blade 10b and the first catalytic converter 19a. The LAF sensor 25 is implemented by combining a sensor similar to the O2 sensor 26 and a detection circuit, such as a linearizer, and detects the concentration of oxygen contained in exhaust gases linearly over a wide range of the air-fuel ratio ranging from a rich region to a lean region, thereby delivering a detection signal proportional to the detected oxygen concentration to the ECU 2. The ECU 2 carries out the air-fuel ratio control in response to the outputs from the LAF sensor 25 and the O2 sensor 26.

Figure 6:
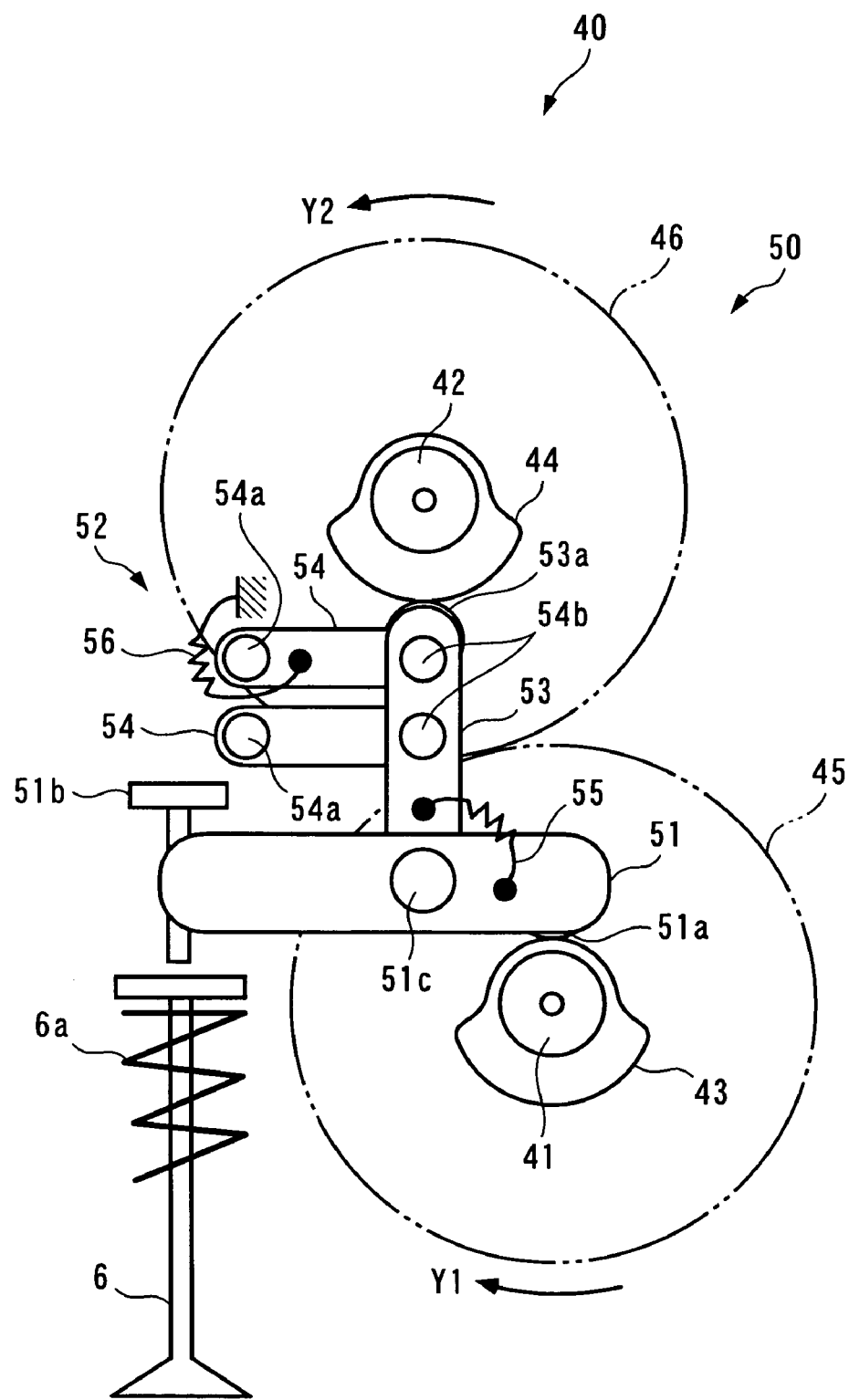
FIG. 6 is a diagram schematically showing the arrangement of an intake valve-actuating mechanism of the variable intake valve actuation assembly.

Next, a description will be given of the variable intake valve actuation assembly 40 (variable valve timing device) mentioned above. Referring to FIGS. 2, 5, and 6, the variable intake valve actuation assembly 40 is comprised of a main intake camshaft 41 and an auxiliary intake camshaft 42 (first and second camshafts), for actuating the intake valves 6, intake valve-actuating mechanisms 50 (only one of which is shown) provided for the respective cylinders, for opening and closing the intake valves 6 in accordance with the rotation of the main and auxiliary intake camshafts 41 and 42, a variable main intake cam phase mechanism 60, a variable auxiliary intake cam phase mechanism 70 (variable intake cam phase mechanism), and three variable inter-intake cam phase mechanisms 80.

The main intake camshaft 41 is rotatably mounted through the cylinder heads 3a such that it extends in the direction of arrangement of the cylinders. The main intake camshaft 41 (first intake camshaft) includes main intake cams 43 (first intake cam) provided for the respective cylinders, a sprocket 47 provided at one end of the main intake camshaft 41, a main gear 45 disposed between the main intake cam 43 for the first cylinder #1 and the sprocket 47. The main intake cams 43, the main gear 45, and the sprocket 47 are all coaxially mounted on the main intake camshaft 41 for rotation in unison with the main intake camshaft 41. The sprocket 47 is connected to the crankshaft 3b by a timing chain 48, whereby the main intake camshaft 41 is rotated clockwise as viewed in FIG. 6 (in a direction indicated by an arrow "Y1") through 360 degrees as the crankshaft 3b rotates through 720 degrees.

Further, the variable main intake cam phase mechanism 60 is provided at the one end of the main intake camshaft 41 where the sprocket 47 is mounted. The variable main intake cam phase mechanism 60 continuously advances or retards the relative phase of the main intake camshaft 41 with respect to the sprocket 47, that is, the relative phase θmi of the main intake camshaft 41 (hereinafter referred to as "the main intake cam phase θmi") with respect to the crankshaft 3b. This operation of the variable main intake cam phase mechanism 60 will be described in detail hereinafter.

Furthermore, a main intake cam angle sensor 27 is disposed at the other end of the main intake camshaft 41, opposite to the end where the sprocket 47 is mounted. Similarly to the crank angle sensor 20, the main intake cam angle sensor 27 is implemented by a magnet rotor and an MRE pickup (neither of which is shown), and delivers a main intake cam signal, which is a pulse signal, to the ECU 2 along with rotation of the main intake camshaft 41. Each pulse of the main intake cam signal is generated whenever the main intake camshaft 41 rotates through a predetermined cam angle (e.g. one degree), and the ECU 2 calculates (detects) the main intake cam phase θmi based on the main intake cam signal and the CRK signal.

Similarly to the main intake camshaft 41, the auxiliary intake camshaft 42 (second intake camshaft) as well is rotatably supported by the cylinder heads 3a of the cylinders, and extends parallel to the main intake camshaft 41. The auxiliary intake camshaft 42 has auxiliary intake cams 44 (second intake cam) mounted thereon for the respective cylinders, and an auxiliary gear 46 mounted thereon which has the same number of gear teeth as the number of gear teeth of the main gear 45 and the same diameter as the diameter of the main gear 45. The auxiliary gear 46 is coaxially mounted on the auxiliary intake camshaft 42, for rotation in unison therewith.

Both the main gear 45 and the auxiliary gear 46 are urged by respective urging springs, not shown, such that they are always in mesh with each other, and configured such that backlash of the meshing teeth of the main and auxiliary gears 45 and 46 is prevented from occurring by a backlash-compensating mechanism, not shown. Due to the meshing of teeth of the gears 45 and 46, the auxiliary intake camshaft 42 is rotated counterclockwise as viewed in FIG. 6 (in a direction indicated by an arrow "Y2") at the same rotational speed as that of the main intake camshaft 41, along with the rotation thereof.

Also, the variable auxiliary intake cam phase mechanism 70 (variable intake cam phase mechanism) is provided at an end of the auxiliary intake camshaft 42 toward the timing chain 48. The variable auxiliary intake cam phase mechanism 70 continuously changes the relative phase of the auxiliary intake camshaft 42 with respect to the main intake camshaft 41, in other words, the relative phase θmsi of the auxiliary intake cam 44 for the first cylinder #1 with respect to the main intake cam 43 for the same (hereinafter referred to as "the auxiliary intake cam phase θmsi"). Details of the variable auxiliary intake cam phase mechanism 70 will be described hereinafter.

Further, an auxiliary intake cam angle sensor 28 is provided at the other end of the auxiliary intake camshaft 42, opposite to the end where the variable auxiliary intake cam phase mechanism 70 is provided. Similarly to the main intake cam angle sensor 27, the auxiliary intake cam angle sensor 28 as well is implemented by a magnet rotor and an MRE pickup (neither of which is shown), and delivers an auxiliary intake cam signal, which is a pulse signal, to the ECU 2 along with rotation of the auxiliary intake camshaft 42. Each pulse of the auxiliary intake cam signal is generated whenever the auxiliary intake camshaft 42 rotates through a predetermined cam angle (e.g. one degree), and the ECU 2 calculates the auxiliary intake cam phase θmsi based on the auxiliary intake cam signal, the main intake cam signal, and the CRK signal.

Out of the four auxiliary intake cams 44, the auxiliary intake cam 44 for the first cylinder #1 is coaxially mounted on the auxiliary intake camshaft 42, for rotation in unison therewith, while the other auxiliary intake cams 44 for the second to fourth cylinders #2 to #4 are connected to the auxiliary intake camshaft 42 via the variable inter-intake cam phase mechanisms 80, respectively. The variable inter-intake cam phase mechanisms 80 continuously changes the respective relative phases θssi#i of the auxiliary intake cams 44 for the second to fourth cylinders #2 to #4 with respect to the auxiliary intake cam 44 for the first cylinder #1 (hereinafter referred to as "the inter-intake cam phases θssi#i"), independently of each other, which will be described in detail hereinafter. It should be noted that the symbol #i used in the inter-intake cam phases θssi#i represents a cylinder number, and is set such that #i represents any of #2 to #4. The same applies to portions of the following descriptions using the symbol #i.

Furthermore, three #2 to #4 auxiliary intake cam angle sensors 29 to 31 are electrically connected to the ECU 2 (see FIG. 3). The respective #2 to #4 auxiliary intake cam angle sensors 29 to 31 deliver #2 to #4 auxiliary intake cam signals, which are pulse signals, to the ECU 2 along with rotation of the auxiliary intake cams 44 for the second to fourth cylinders #2 to #4. Each pulse of the auxiliary intake cam signals is generated whenever each of the auxiliary intake cams 44 for the second to fourth cylinders #2 to #4 rotates through a predetermined cam angle (e.g. one degree), and the ECU 2 calculates the inter-intake cam phases θssi#i based on the #2 to #4 auxiliary intake cam signals, the auxiliary intake cam signal, the main intake cam signal, and the CRK signal.

Each intake valve-actuating mechanism 50 is comprised of the associated main and auxiliary intake cams 43 and 44, an intake rocker arm 51 for opening and closing the associated intake valve 6, and a link mechanism 52 supporting the intake rocker arm 51. The cam profiles of the main and auxiliary intake cams 43 and 44 will be described hereinafter.

The link mechanism 52 is of a four-joint link type, and is comprised of a first link 53 extending substantially parallel to the intake valve 6, upper and lower second links 54 and 54 arranged parallel to each other, a bias spring 55, and a return spring 56. The first link 53 has a central portion of the intake rocker arm 51 pivotally mounted to a lower end thereof by a pin 51c, and a rotatable roller 53a provided at an upper end thereof.

The intake rocker arm 51 has a rotatable roller 51a provided at an end thereof toward the main intake cam 43, and an adjusting bolt 51b mounted to an end thereof toward the intake valve 6. Valve clearance between the lower end of the adjusting bolt 51b and the upper end of the intake valve 6 is set to a predetermined value, referred to hereinafter. Further, the bias spring 55 has one end thereof fixed to the intake rocker arm 51, and the other end thereof fixed to the first link 53. The intake rocker arm 51 is urged by the urging force of the bias spring 55 in the clockwise direction as viewed in FIG. 6, whereby the intake rocker arm 51 is always in abutment with the main intake cam 43 via the roller 51a.

With the arrangement described above, when the main intake cam 43 rotates clockwise as viewed in FIG. 6, the roller 51a rolls on the cam surface of the main intake cam 43, whereby the intake rocker arm 51 is pivotally moved clockwise or counterclockwise about the pin 51c as a pivot according to the cam profile of the main intake cam 43. The pivotal motion of the intake rocker arm 51 causes the adjusting bolt 51b to vertically reciprocate to open and close the intake valve 6.

Further, each of the upper and lower second links 54 and 54 has one end thereof pivotally connected to the associated cylinder head 3a via a pin 54a, and the other end thereof pivotally connected to a predetermined portion of the first link 53 via a pin 54b. Furthermore, the return spring 56 has one end thereof fixed to the upper second link 54, and the other end thereof fixed to the associated cylinder head 3a. The upper second link 54 is urged in the counterclockwise direction as viewed in FIG. 6 by the urging force of the return spring 56, whereby the first link 53 is always in abutment with the associated auxiliary intake cam 44 via the roller 53a.

With the arrangement described above, when the auxiliary intake cam 44 rotates counterclockwise as viewed in FIG. 6, the roller 53a rolls on the cam surface of the auxiliary intake cam 44, whereby the first link 53 is vertically moved according to the cam profile of the auxiliary intake cam 44. As a result, the pin 51c as the pivot about which the intake rocker arm 51 is pivotally moved is vertically moved between a lowermost position (position shown in FIG. 6) and an uppermost position (position shown in FIG. 15) thereof. This changes the position of the adjusting bolt 51b which is actuated for reciprocating motion by the intake rocker arm 51 when the intake rocker arm 51 is pivotally moved as described hereinabove.

Further, the cam nose of the main intake cam 43 is made higher than that of the auxiliary intake cam 44, and a ratio between the height of the cam nose of the main intake cam 43 and the height of the cam nose of the auxiliary intake cam 44 is set to a value equal to a ratio between the distance from the adjusting bolt 51b to the center of the roller 51a and the distance from the adjusting bolt 51b to the center of the pin 51c. In other words, the ratio between the heights of the two cam noses is set such that when the intake rocker arm 51 is actuated by the main and auxiliary intake cams 43 and 44, the amount of vertical movement of the adjusting bolt 51b caused by the cam nose of the main intake cam 43 and the amount of vertical movement of the adjusting bolt 51b caused by the cam nose of the auxiliary intake cam 44 become equal to each other.

Figure 7:
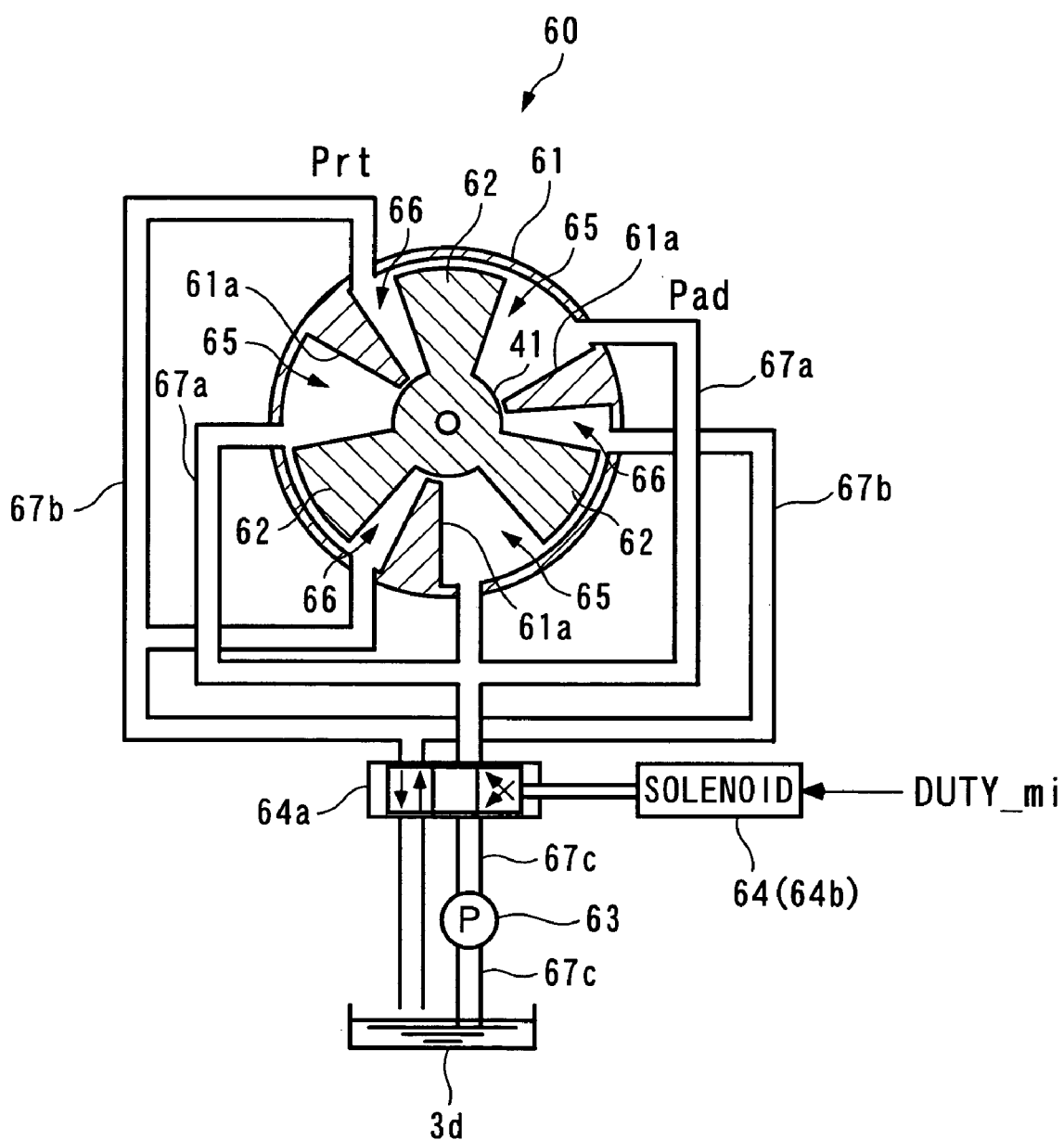
FIG. 7 is a diagram schematically showing the arrangement of a variable main intake cam phase mechanism.

Next, a description will be given of the aforementioned variable main intake cam phase mechanism 60. Referring to FIG. 7, the variable main intake cam phase mechanism 60 includes a housing 61, a three-bladed vane 62, an oil pressure pump 63, and a solenoid valve mechanism 64.

The housing 61 is integrally formed with the sprocket 47 described above, and divided by three partition walls 61a formed at equal intervals. The vane 62 is coaxially mounted on the end of the main intake camshaft 41 where the sprocket 47 is mounted, such that the vane 62 radially extends outward from the main intake camshaft 41, and rotatably housed in the housing 61. Further, the housing 61 has three advance chambers 65 and three retard chambers 66 each formed between one of the partition walls 61a and one the three blades of the vane 62.

The oil pressure pump 63 is a mechanical one connected to the crankshaft 3b. As the crankshaft 3b rotates, the oil pressure pump 63 draws lubricating oil stored in an oil pan 3d of the engine 3 via a lower part of an oil passage 67c, for pressurization, and supplies the pressurized oil to the solenoid valve mechanism 64 via the remaining part of the oil passage 67c.

The solenoid valve mechanism 64 is formed by combining a spool valve mechanism 64a and a solenoid 64b, and connected to the advance chambers 65 and retard chambers 66 via an advance oil passage 67a and a retard oil passage 67b such that oil pressure supplied from the oil pressure pump 63 is outputted to the advance chambers 65 and retard chambers 66 as advance oil pressure Pad and retard oil pressure Prt. The solenoid 64b of the solenoid valve mechanism 64 is electrically connected to the ECU 2, and is responsive to a control input DUTY_mi from the ECU 2, for moving a spool valve element of the spool valve mechanism 64a within a predetermined range of motion according to the control input DUTY_mi to thereby change both the advance oil pressure Pad and the retard oil pressure Prt.

In the variable main intake cam phase mechanism 60 constructed as above, during operation of the oil pressure pump 63, the solenoid valve mechanism 64 is operated according to the control input DUTY_mi, to supply the advance oil pressure Pad to the advance chambers 65 and the retard oil pressure Prt to the retard chambers 66, whereby the relative phase between the vane 62 and the housing 64 is changed toward an advanced side (i.e. advanced) or changed toward a retarded side (i.e. retarded). As a result, the main intake cam phase θmi described above is continuously advanced or retarded within a predetermined range (e.g. within a range of cam angles from 45 to 60 degrees). It should be noted that the variable main intake cam phase mechanism 60 includes a lock mechanism, not shown, which locks operation of the variable main intake cam phase mechanism 60 when oil pressure supplied from the oil pressure pump 63 is low. More specifically, the variable main intake cam phase mechanism 60 is inhibited from changing the main intake cam phase θmi, whereby the main intake cam phase θmi is locked to a value suitable for idling or starting of the engine 3.

Figure 8:
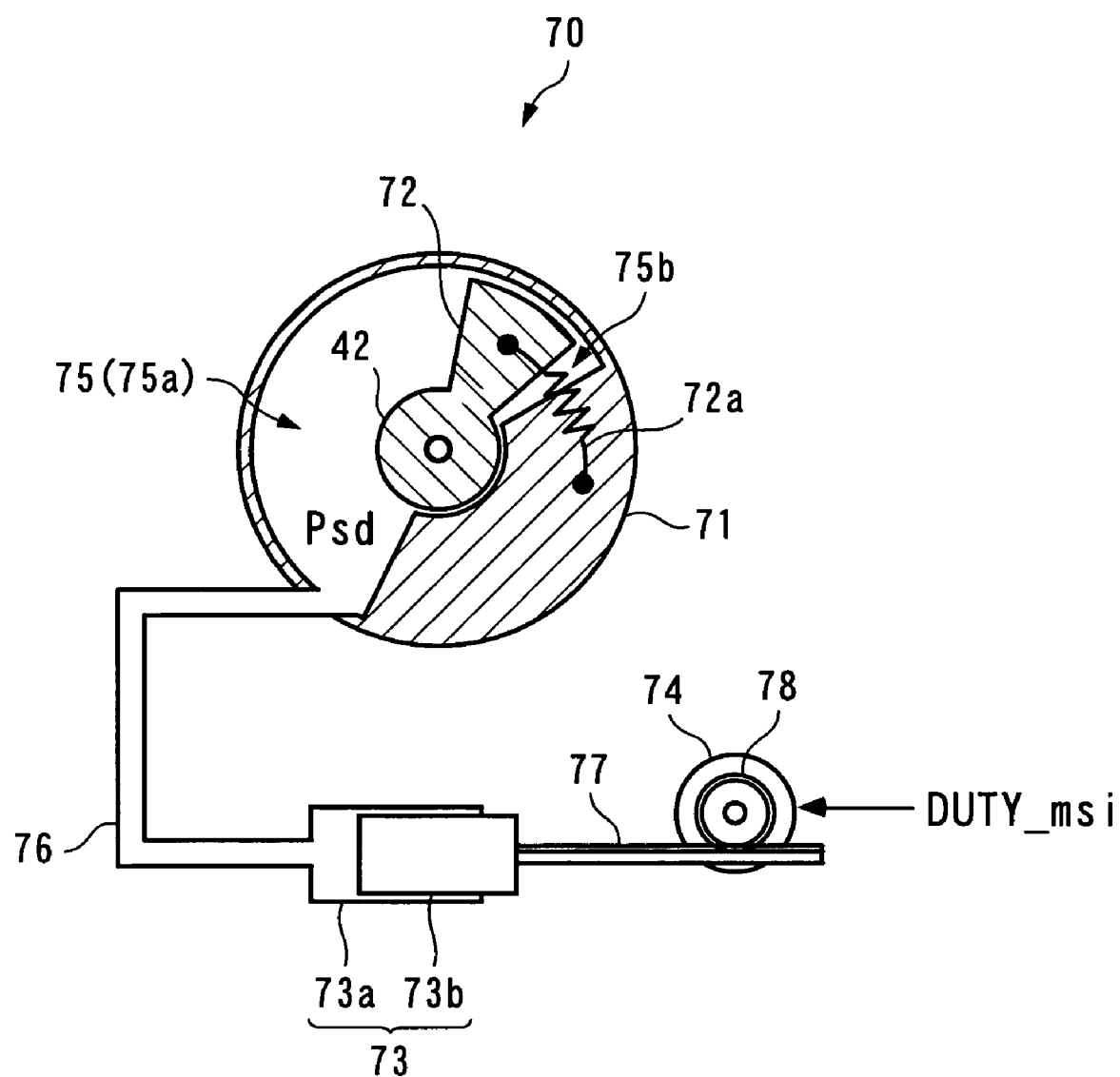
FIG. 8 is a diagram schematically showing the arrangement of a variable auxiliary intake cam phase mechanism.

Next, a description will be given of the aforementioned variable auxiliary intake cam phase mechanism 70. Referring to FIG. 8, the variable auxiliary intake cam phase mechanism 70 is comprised of a housing 71, a one-bladed vane 72, an oil pressure piston mechanism 73, and a motor 74.

The housing 71 is integrally formed with the gear 46 of the auxiliary intake camshaft 42, and has a vane chamber 75 defined therein which has a sectoral shape in cross section. The vane 72 is coaxially mounted on the end of the auxiliary intake camshaft 42 toward the timing chain 48 such that it extends outward from the auxiliary intake camshaft 42, and rotatably accommodated in the vane chamber 75. The vane 72 divides the vane chamber 75 into first and second vane chambers 75a and 75b.

Further, one end of a return spring 72a is fixed to the vane 72, and the other end thereof is fixed to the housing 71. The vane 72 is urged by the return spring 72a in the counterclockwise direction as viewed in FIG. 8, i.e. in the direction of reducing the volume of the first vane chamber 75a.

On the other hand, the oil pressure piston mechanism 73 includes a cylinder 73a, and a piston 73b. The inner space of the cylinder 73a communicates with the first vane chamber 75a via an oil passage 76. The inner space of the cylinder 73a, the oil passage 76, and the first vane chamber 75a are filled with working oil. Further, the second vane chamber 75b communicates with the atmosphere.

The piston 73b has a rack 77 joined thereto. A pinion 78 in mesh with the rack 77 is coaxially mounted on the drive shaft of the motor 74. The motor 74 is electrically connected to the ECU 2, and responsive to a control input DUTY_msi from the ECU 2, for driving the pinion 78 for rotation, whereby the piston 73b is slid within the cylinder 73a via the rack 77. This changes oil pressure Psd within the first vane chamber 75a, and the vane 72 is rotated clockwise or counterclockwise depending on the balance between the oil pressure Psd changed as above and the urging force of the return spring 72a. As a result, the auxiliary intake cam phase θmsi is continuously advanced or retarded within a predetermined range (e.g. within a range of cam angles from 0 to 180 degrees, referred to hereinafter).

As described above, the variable auxiliary intake cam phase mechanism 70 changes the auxiliary intake cam phase θmsi using the oil pressure piston mechanism 73 and the motor 74 in place of the oil pressure pump 63 and the solenoid valve mechanism 64 which are used for the variable main intake cam phase mechanism 60 described above. This is because the variable auxiliary intake cam phase mechanism 70 is required to be higher in responsiveness than the variable main intake cam phase mechanism 60, since the variable auxiliary intake cam phase mechanism 70 is used for adjustment of the amount of intake air drawn into each cylinder. Therefore, when the variable auxiliary intake cam phase mechanism 70 need not be high in responsiveness (e.g. when required to perform only one of the retarded-closing control and advanced-closing control of the intake valve 6, for control of the valve timing of the intake valve 6, described hereinafter), the oil pressure pump 63 and solenoid valve mechanism 64 may be employed in place of the oil pressure piston mechanism 73 and the motor 74, similarly to the variable main intake cam phase mechanism 60.

Figure 9:
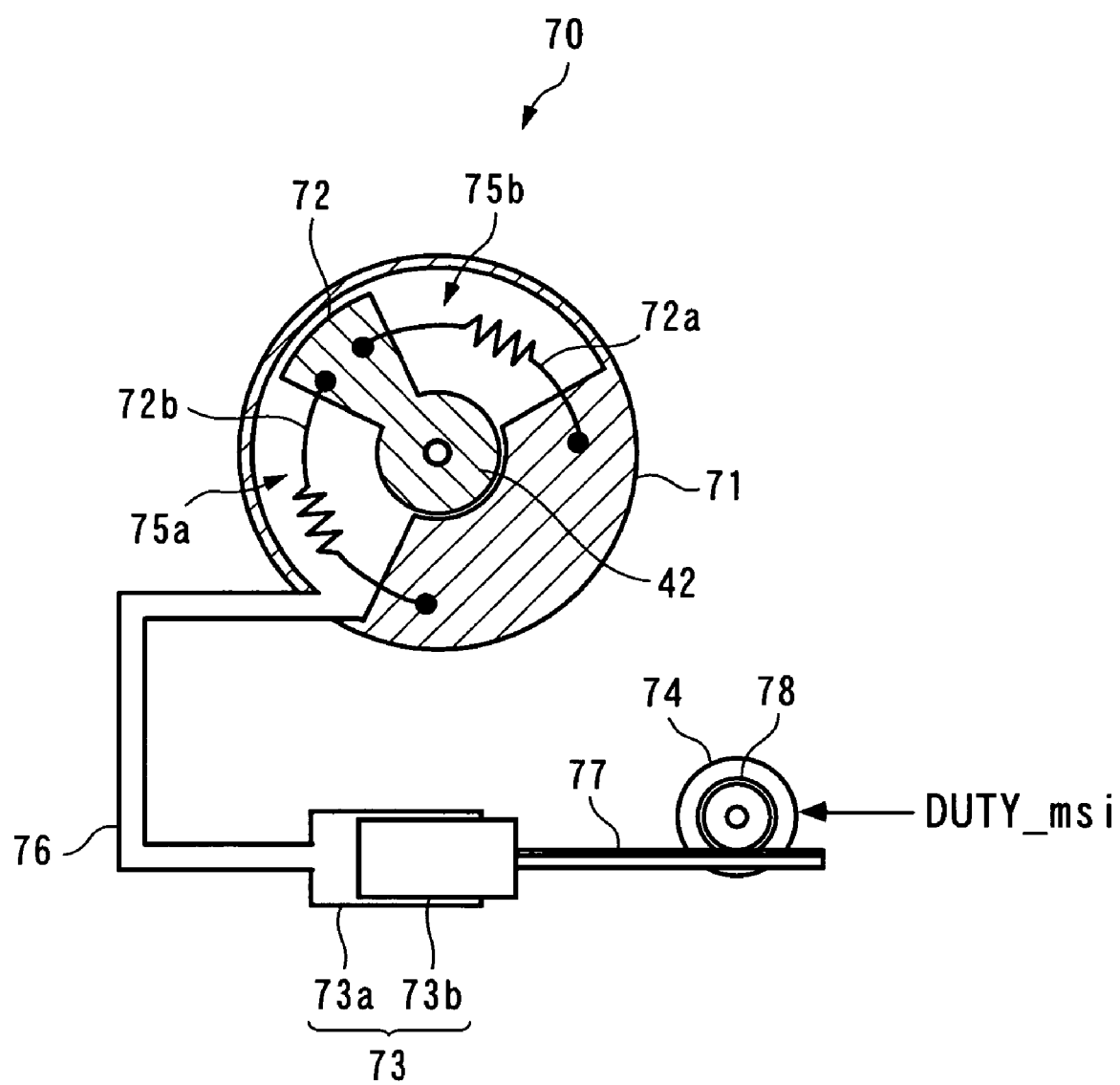
FIG. 9 is a diagram schematically showing the arrangement of a variation of the variable auxiliary intake cam phase mechanism.

It should be noted that as shown in FIG. 9, the variable auxiliary intake cam phase mechanism 70 may be provided with a return spring 72b for urging the vane 72 in the clockwise direction as viewed in FIG. 9, with an urging force set to the same value as that of the return spring 72a, and a neutral position, shown in FIG. 9, of the vane 72 may be set to a position corresponding to a value of the auxiliary intake cam phase θmsi to which the auxiliary intake cam phase θmsi is most frequently controlled. With this configuration of the variable auxiliary intake cam phase mechanism 70, a time period over which the vane 72 is held at its neutral position can be made longer during operation of the variable auxiliary intake cam phase mechanism 70, whereby it is possible to secure a longer time during which the motor 74 is not in operation, thereby making it possible to reduce electrical power consumption.

Figure 10:
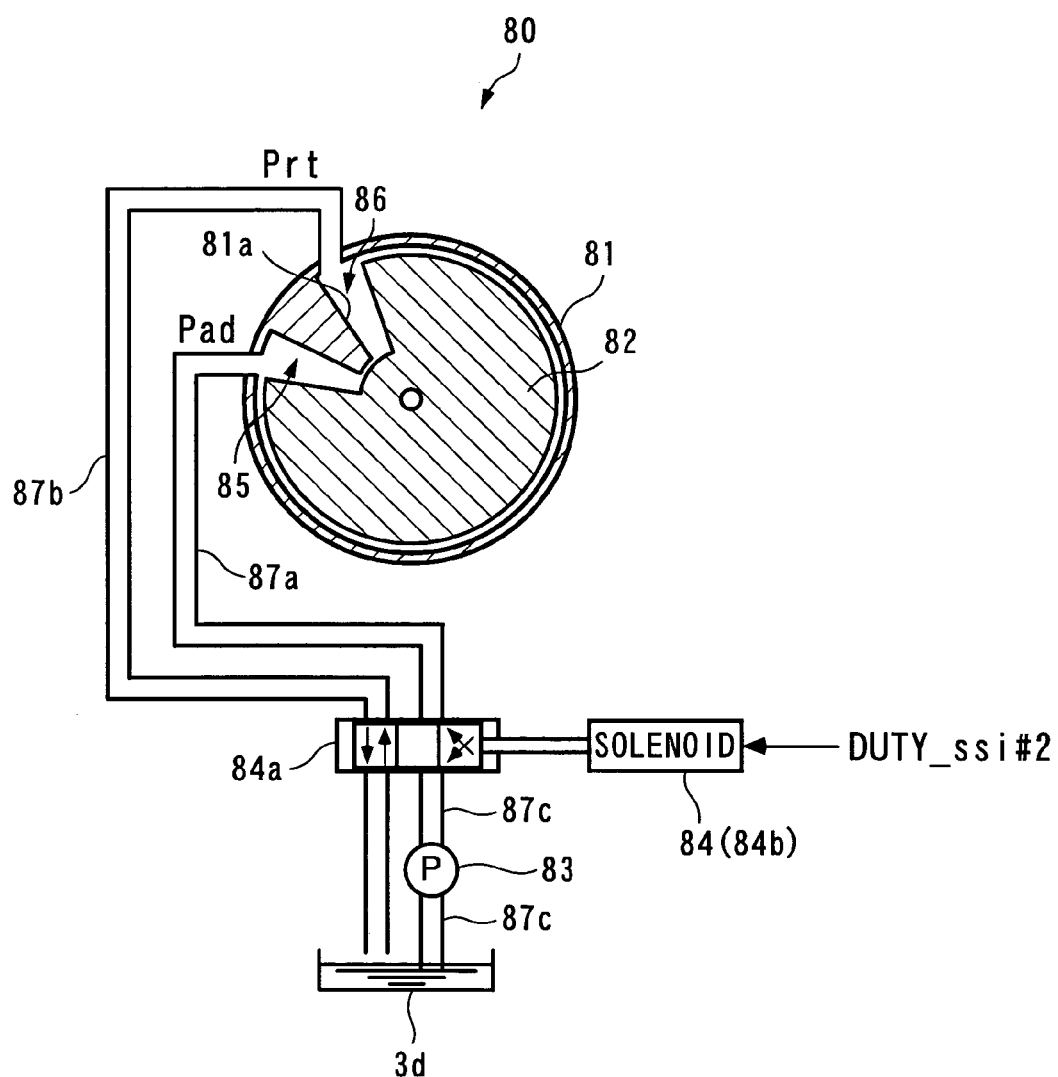
FIG. 10 is a diagram schematically showing the arrangement of a variable inter-intake cam phase mechanism.

Next, a description will be given of the aforementioned variable inter-intake cam phase mechanisms 80. Since the three variable inter-intake cam phase mechanisms 80 have the same construction, hereinafter, a variable inter-intake cam phase mechanism 80 for changing an inter-intake cam phase θssi#2 of the auxiliary intake cam 44 for the second cylinder #2 will be described by way of example. The variable inter-intake cam phase mechanism 80 is used for adjusting a steady-state variation in intake air amount between the cylinders, and not required to have high responsiveness. Therefore, this mechanism 80 is configured substantially similarly to the variable main intake cam phase mechanism 60 described above. More specifically, as shown in FIG. 10, the variable inter-intake cam phase mechanism 80 is comprised of a housing 81, a vane 82, an oil pressure pump 83, and a solenoid valve mechanism 84.

The housing 81 is integrally formed with the auxiliary intake cam 44 for the second cylinder #2, and provided with one partition wall 81a. The vane 82 is coaxially mounted on an intermediate portion of the auxiliary intake camshaft 42, and rotatably housed in the housing 81. Further, the housing 81 has an advance chamber 85 and a retard chamber 86 formed between the partition wall 81a and opposite inner walls of the vane 82.

Similarly to the aforementioned oil pressure pump 63, the oil pressure pump 83 is a mechanical one connected to the crankshaft 3b. As the crankshaft 3b rotates, the oil pressure pump 83 draws lubricating oil stored in the oil pan 3d of the engine 3 via a lower part of an oil passage 87c, for pressurization, and supplies the pressurized oil to the solenoid valve mechanism 84 via the remaining part of the oil passage 87c.

Similarly to the solenoid valve mechanism 64 described above, the solenoid valve mechanism 84 is formed by combining a spool valve mechanism 84a and a solenoid 84b, and connected to the advance chamber 85 and the retard chamber 86 via an advance oil passage 87a and a retard oil passage 87b such that oil pressure supplied from the oil pressure pump 83 is outputted to the advance chamber 85 and the retard chamber 86 as advance oil pressure Pad and retard oil pressure Prt. The solenoid 84b of the solenoid valve mechanism 84 is electrically connected to the ECU 2, and is responsive to a control input DUTY_ssi#2 from the ECU 2, for moving a spool valve element of the spool valve mechanism 84a within a predetermined range of motion according to the control input DUTY_ssi#2 to thereby change both the advance oil pressure Pad and the retard oil pressure Prt.

In the above variable inter-intake cam phase mechanism 80, during operation of the oil pressure pump 83, the solenoid valve mechanism 84 is operated according to the control input DUTY_ssi#2, to supply the advance oil pressure Pad and the retard oil pressure Prt to the advance chamber 85 and the retard chamber 86, respectively, whereby the relative phase between the vane 82 and the housing 84 is advanced or retarded. As a result, the aforementioned inter-intake cam phase θssi#2 is continuously advanced or retarded within a predetermined range (e.g. within a range of cam angles from 0 to 30 degrees). It should be noted that the variable inter-intake cam phase mechanism 80 is provided with a lock mechanism, not shown, which locks operation of the variable inter-intake cam phase mechanism 80 when oil pressure supplied from the oil pressure pump 83 is low. More specifically, the variable inter-intake cam phase mechanism 80 is inhibited from changing the inter-intake cam phase θssi#2, whereby the inter-intake cam phase θssi#2 is locked to a target control value (value of 0, referred to hereinafter) at this time point.

When it is required to control the internal EGR amount and the intake air amount of each cylinder with high responsiveness and high accuracy, as in a compression ignition internal combustion engine, the variable inter-intake cam phase mechanism 80 may be configured similarly to the variable auxiliary intake cam phase mechanism 70.

Figure 11:
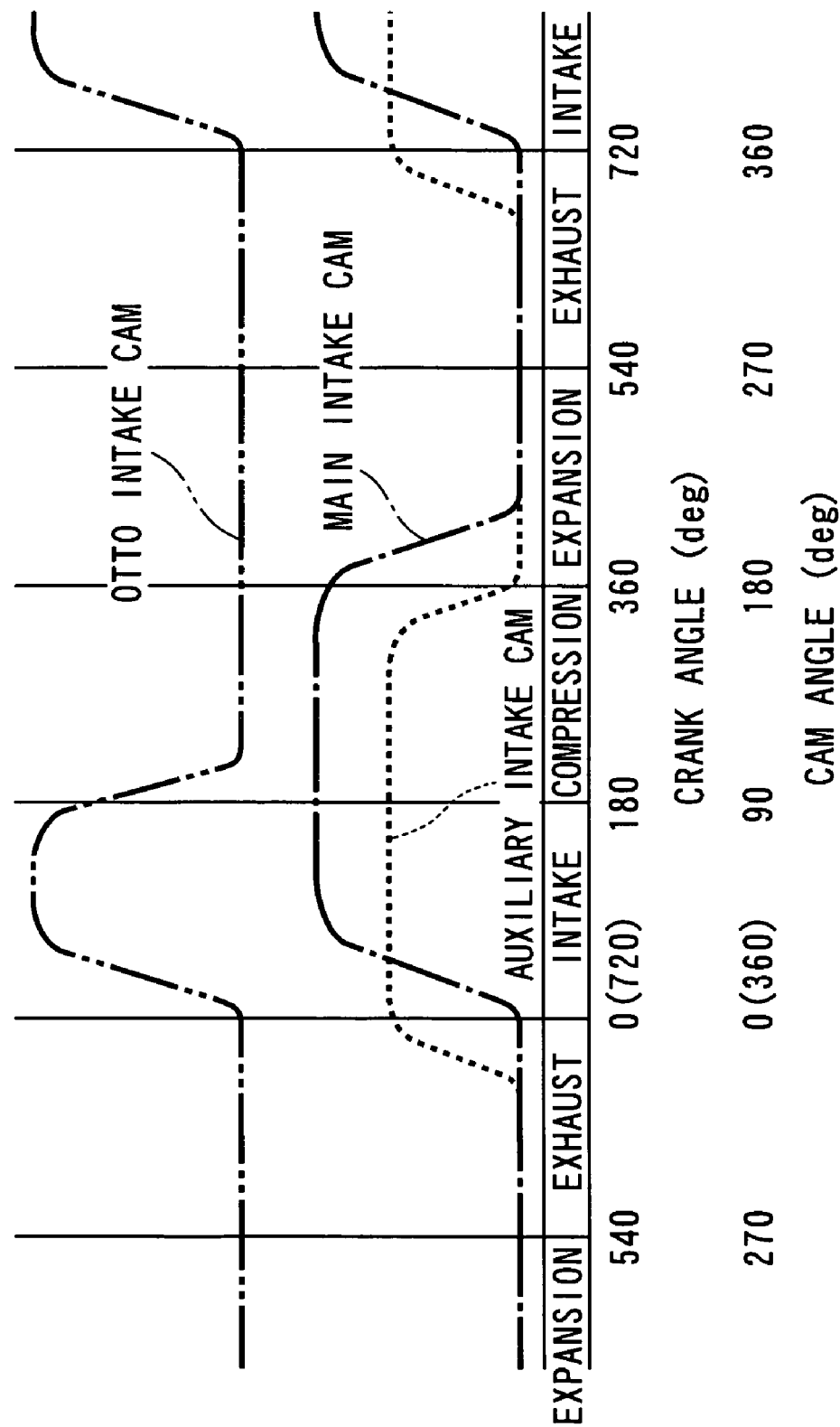
FIG. 11 is a diagram useful in explaining cam profiles of a main intake cam and an auxiliary intake cam.

Next, a description will be given of operation of the variable intake valve actuation assembly 40 constructed as above. In the following description, the main and auxiliary intake cams 43 and 44 are described by taking the main and auxiliary intake cams 43 and 44 for the first cylinder #1 as examples. FIG. 11 is a diagram useful in explaining the cam profiles of the main and auxiliary intake cams 43 and 44, which shows an operating state of the variable intake valve actuation assembly 40 in which the auxiliary intake cam phase θmsi is set to 0 degrees by the variable auxiliary intake cam phase mechanism 70, that is, in which there is no cam phase difference between the auxiliary intake cam 44 and the main intake cam 43.

A curve indicated by a one-dot chain line in FIG. 11 represents the amount and timing of movement of a contact point where the main intake cam 43 and the intake rocker arm 51 are in contact with each other, occurring during rotation of the main intake cam 43, i.e. the amount and timing of movement of the roller 51a, while a curve indicated by a broken line in FIG. 11 represents the amount and timing of movement of the first link 53, i.e. the pin 51c, occurring during rotation of the auxiliary intake cam 44. The same applies to FIGS. 12A to 16, referred to hereinafter.

Further, a curve indicated by a two-dot chain line in FIG. 11 represents, for comparison, the amount and timing of movement of the adjusting bolt 51b actuated by an intake cam (hereinafter referred to as "the Otto intake cam") of a general engine of the Otto cycle type (Otto engine) i.e. an engine operated such that an expansion ratio and a compression ratio become equal to each other. A curve obtained by incorporating a valve clearance-related factor into the curve corresponds to a valve lift curve of an intake valve actuated by the Otto intake cam. Therefore, in the following description, this curve is referred to as "the valve lift curve" of the Otto intake cam, as required.

As shown in FIG. 11, the main intake cam 43 is configured as a so-called retarded-closing cam which, in comparison with the case of the intake valve 6 being actuated by the Otto intake cam, opens the intake valve 6 in the same lift start timing or valve-opening timing, and closes the intake valve 6 in later lift termination timing or valve-closing timing during the compression stroke. Further, the main intake cam 43 has a cam profile configured such that the maximum valve lift is continued over a predetermined range (corresponding to a cam angle of e.g. 150 degrees). In the following description, states in which the intake valve 6 is closed in later timing and in earlier timing than by the Otto intake cam are referred to as "the retarded closing" and "the advanced closing" of the intake valve 6, respectively.

Further, the auxiliary intake cam 44 has a cam profile configured such that the valve-opening timing thereof is made earlier than that of the main intake cam 43, and the maximum valve lift is continued over the above predetermined range (corresponding to a cam angle of e.g. 150 degrees).

Figure 12A:
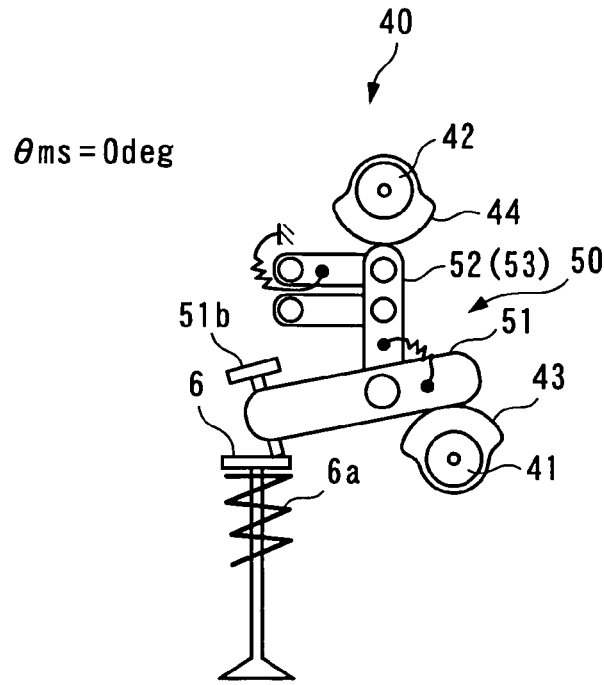
FIG. 12A is a diagram showing an operating state of the intake valve-actuating mechanism in which an auxiliary intake cam phase $\theta msi$ is set to 0 degrees.
Figure 12B:
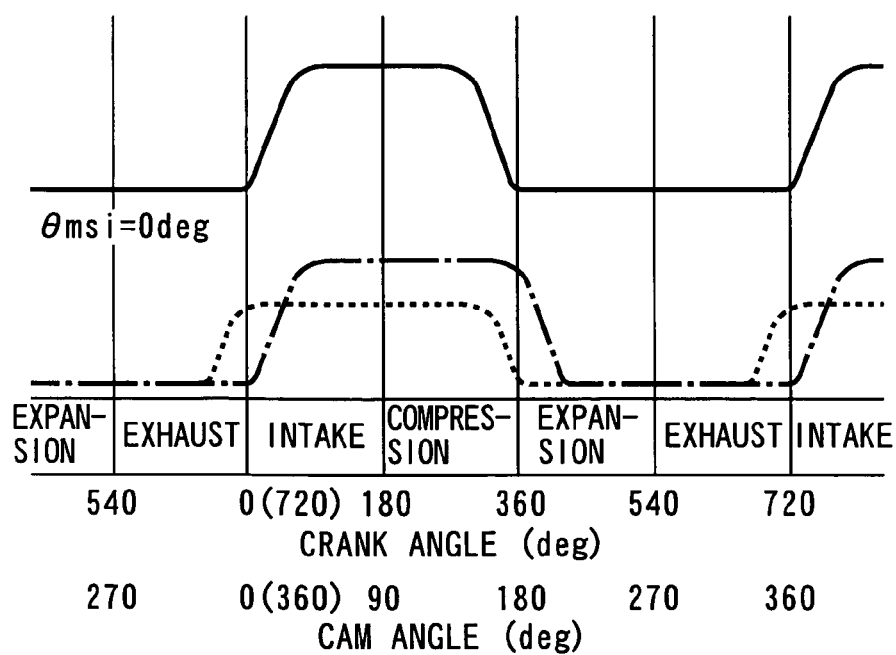
FIG. 12B is a diagram showing a valve lift curve and the like of an intake valve, which is useful in explaining operation of the intake valve when the auxiliary intake cam phase $\theta msi$ is set to 0 degrees.

Next, operation of the intake valve-actuating mechanism 50 performed when the intake valve 6 is actually actuated by the main and auxiliary intake cams 43 and 44 having the above cam profiles will be described with reference to FIG. 12A to FIG. 16. FIGS. 12A and 12B show an example of the operation of the intake valve-actuating mechanism 50 in which the auxiliary intake cam phase θmsi is set to 0 degrees. In FIG. 12B, a curve indicated by a solid line shows the actual amount and timing of movement of the adjusting bolt 51b, and a curve obtained by incorporating a valve clearance-related factor corresponds to a valve lift curve indicative of the actual amount and timing of the valve lift of the intake valve 6. Therefore, in the following description, the curve indicated by the solid line is referred to as the valve lift curve of the intake valve 6, as required, and the amount and timing of movement of the adjusting bolt 51b are referred to as the valve lift amount and the valve timing of the intake valve 6, respectively. The same also applies to FIGS. 13A to 16, referred to hereinafter.

As shown in FIG. 12A, when the auxiliary intake cam phase θmsi is set to 0 degrees, the auxiliary intake cam 44 is held in abutment with the first link 53 at a high portion of the cam nose thereof, during a time period over which the main intake cam 43 is in abutment with the intake rocker arm 51 at a high portion of the cam nose thereof. This means that during valve-opening operation by the main intake cam 43, the pivot of the pivotal motion of the intake rocker arm 51 is held at a lowermost position thereof. As a result, as shown in FIG. 12B, in the valve lift amount and the valve timing of the intake valve 6, the valve-opening timing is the same but the valve-closing timing is retarded, in comparison with the case of the intake valve 6 being actuated by the Otto intake cam. This is a state where the intake valve 6 is actuated by the retarded-closing cam.

FIG. 13A to FIG. 15B show examples of the operation of the intake valve-actuating mechanism 50 performed when the auxiliary intake cam phase θmsi is set to 90 degrees, 120 degrees, and 180 degrees, respectively, by the variable auxiliary intake cam phase mechanism 70. In other words, these figures show examples of the operation of the intake valve-actuating mechanism 50 when the phase of the auxiliary intake camshaft 42 is advanced by respective cam angles of 90 degrees, 120 degrees, and 180 degrees with respect to the main intake camshaft 41. Further, FIG. 16 shows an example of the operation of the intake valve-actuating mechanism 50 performed when the auxiliary intake cam phase θmsi is changed from 120 degrees to 180 degrees.

Figure 13A:
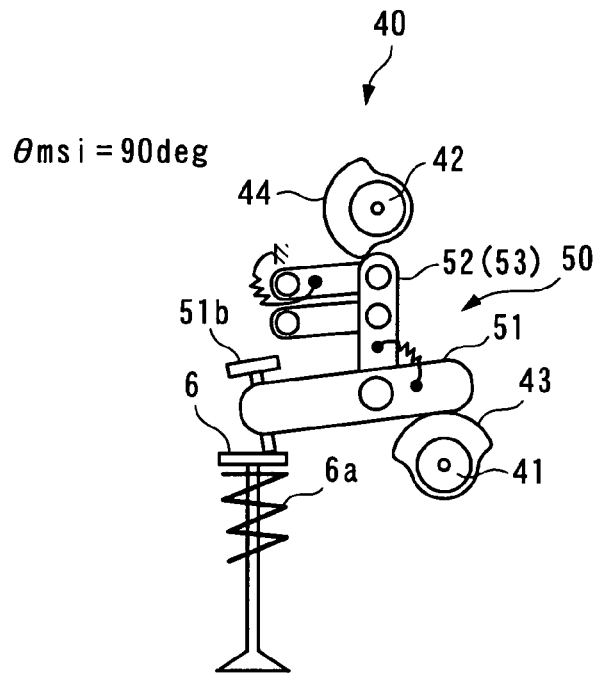
FIG. 13A is a diagram showing an operating state of the intake valve-actuating mechanism in which the auxiliary intake cam phase $\theta msi$ is set to 90 degrees.
Figure 13B:
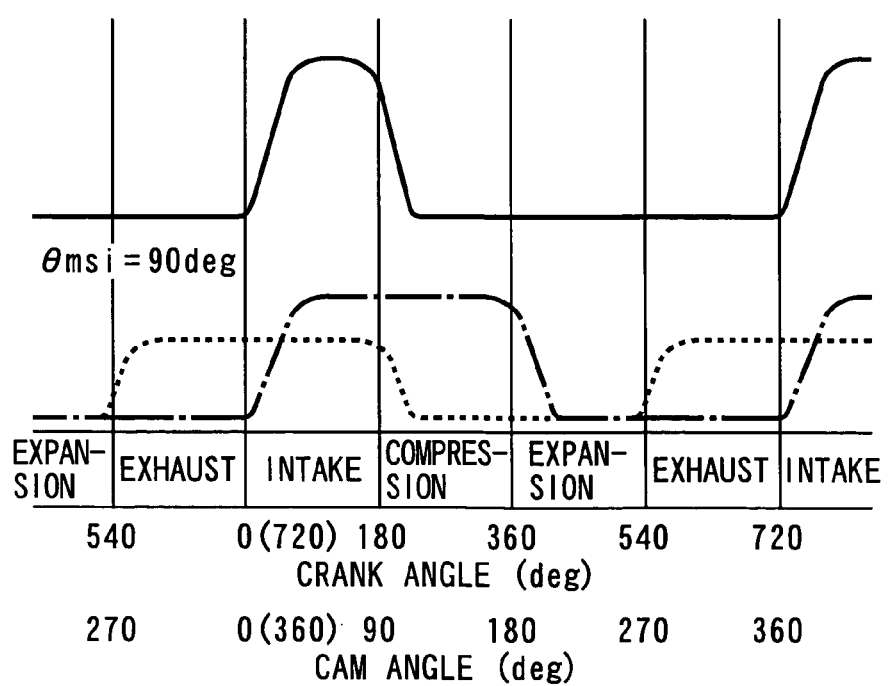
FIG. 13B is a diagram showing a valve lift curve and the like of the intake valve, which is useful in explaining operation of the intake valve when the auxiliary intake cam phase θmsi is set to 90 degrees.

Referring to FIG. 13A, when the auxiliary intake cam phase θmsi is set to 90 degrees (value equal to θmsiott, referred to hereinafter), the auxiliary intake cam 44 is held in abutment with the first link 53 not at the high portion, but at a low portion, of the cam nose thereof, during the second half of the time period over which the main intake cam 43 is in abutment with the intake rocker arm 51 at the high portion of the cam nose thereof. As a result, as shown in FIG. 13B, the valve-closing timing of the intake valve 6, i.e. termination timing of the valve-opening operation performed by the main intake cam 43 is made earlier than when the auxiliary intake cam phase θmsi is set to 0 degrees, whereby the valve timing of the intake valve 6 becomes the same as that of an intake valve actuated by the Otto intake cam.

Figure 14A:
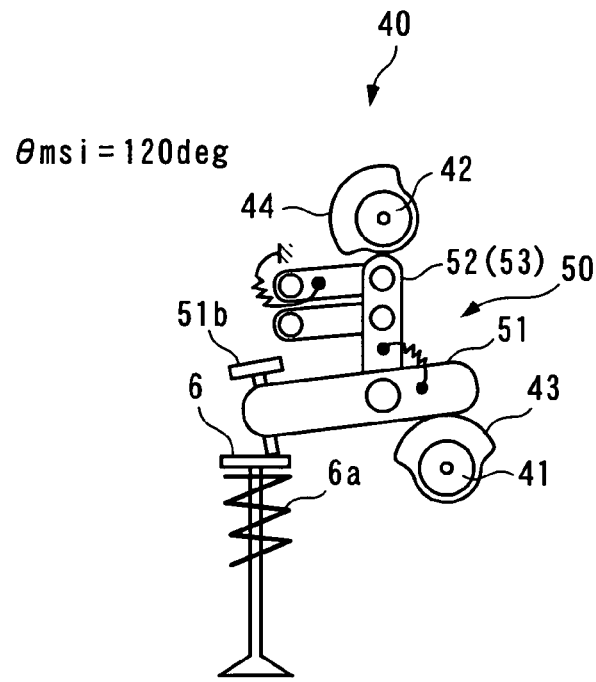
FIG. 14A is a diagram showing an operating state of the intake valve-actuating mechanism in which the auxiliary intake cam phase θmsi is set to 120 degrees.
Figure 14B:
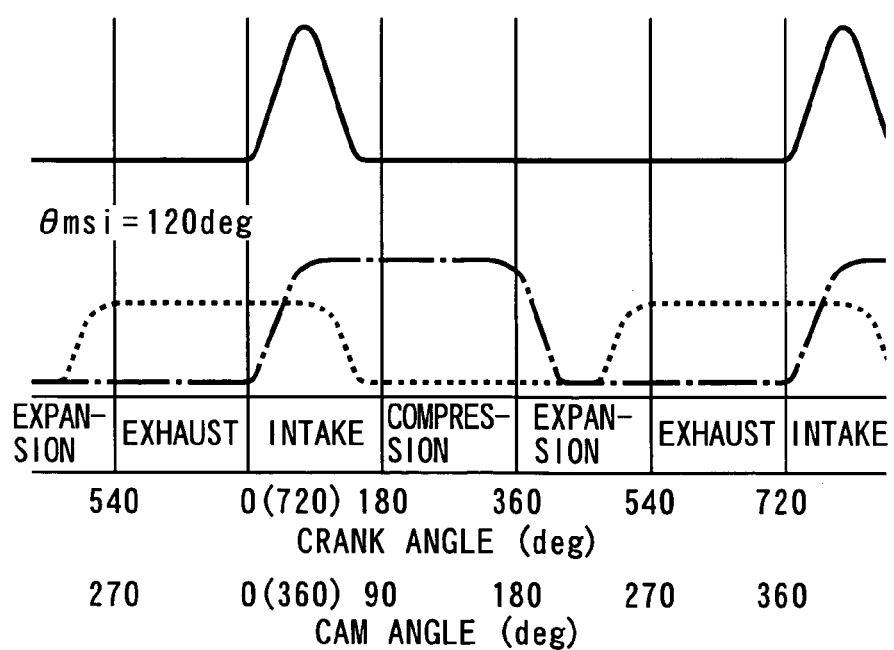
FIG. 14B is a diagram showing a valve lift curve and the like of the intake valve, which is useful in explaining operation of the intake valve when the auxiliary intake cam phase θmsi is set to 120 degrees.

Further, when the auxiliary intake cam phase θmsi is larger than 90 degrees, e.g. when the auxiliary intake cam phase θmsi is set to 120 degrees, as shown in FIG. 14A, during the time period over which the main intake cam 43 is in abutment with the intake rocker arm 51 at the high portion of the cam nose thereof, the time period over which the auxiliary intake cam 44 is in abutment with the first link 53 at the high portion of the cam nose thereof is made shorter than when the auxiliary intake cam phase θmsi is set to 90 degrees, which is described above. As a result, as shown in FIG. 14B, the valve-closing timing of the intake valve 6 is made still earlier than when the auxiliary intake cam phase θmsi is set to 90 degrees, and in comparison with the case of the intake valve being actuated by the Otto intake cam, the valve-opening timing is the same, but the valve-closing timing is made earlier. This is a state of the intake valve 6 being actuated by an advanced-closing cam.

Figure 16:
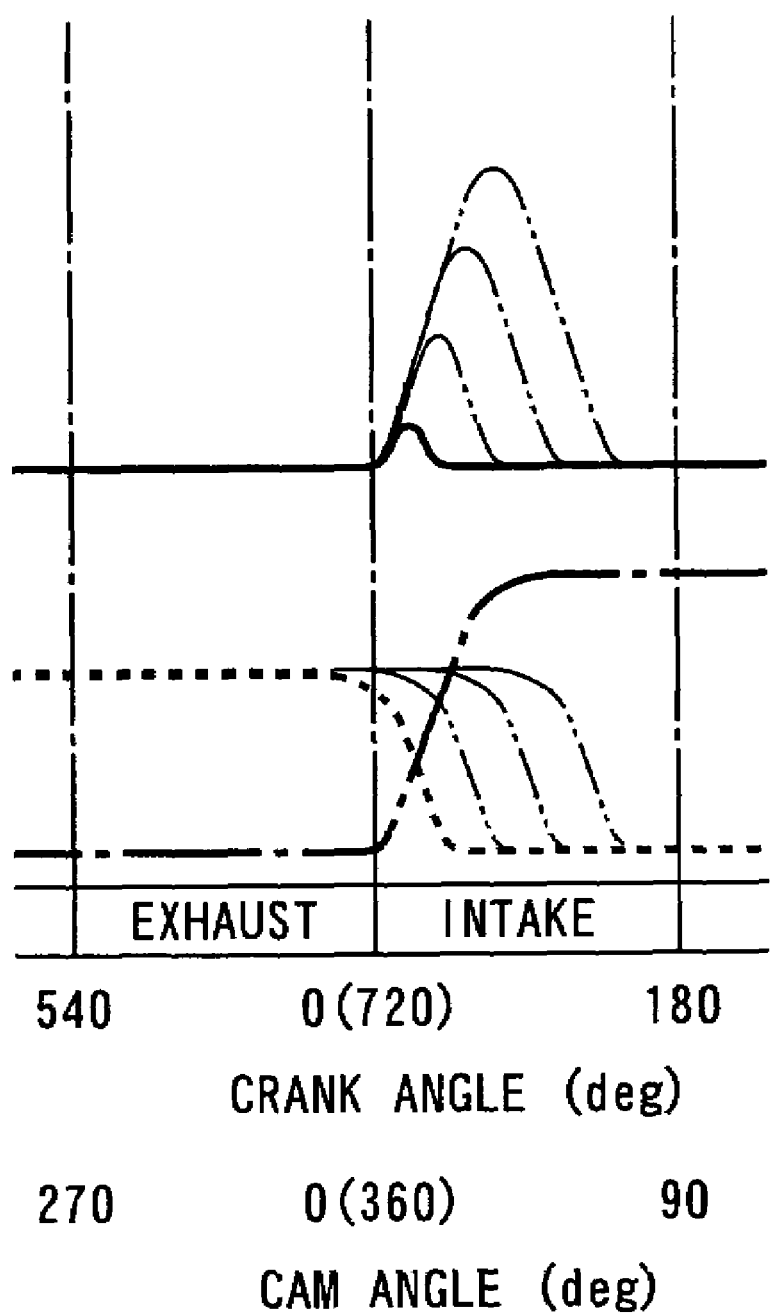
FIG. 16 is a diagram showing changes in the amount of the valve lift and the valve timing of the intake valve, which is useful in explaining operation of the intake valve when the auxiliary intake cam phase θmsi is changed from 120 degrees to 180 degrees.

Further, as shown in FIG. 16, when the auxiliary intake cam phase θmsi is changed from the above-mentioned 120 degrees to 180 degrees, during the time period over which the main intake cam 43 is in abutment with the intake rocker arm 51 at the high portion of the cam nose thereof, the time period over which the auxiliary intake cam 44 is held in abutment with the first link 53 at the high portion of the cam nose thereof is progressively reduced. As a consequence, the valve-closing timing of the intake valve 6 is progressively made earlier, and the valve lift amount of the intake valve 6 is progressively reduced from its maximum value. As described above, when the auxiliary intake cam phase θmsi is set by the variable auxiliary intake cam phase mechanism 70 such that the valve lift amount of the intake valve 6 is progressively reduced from its maximum value, it is possible to increase the flow velocity of intake air flowing into the combustion chamber to increase the flow of the mixture within the first cylinder #1, thereby making it possible to enhance combustion efficiency.

Figure 15A:
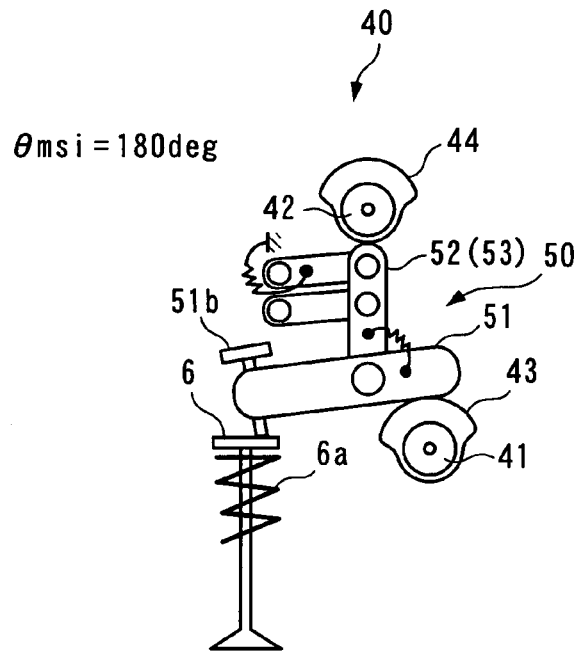
FIG. 15A is a diagram showing an operating state of the intake valve-actuating mechanism in which the auxiliary intake cam phase θmsi is set to 180 degrees.
Figure 15B:
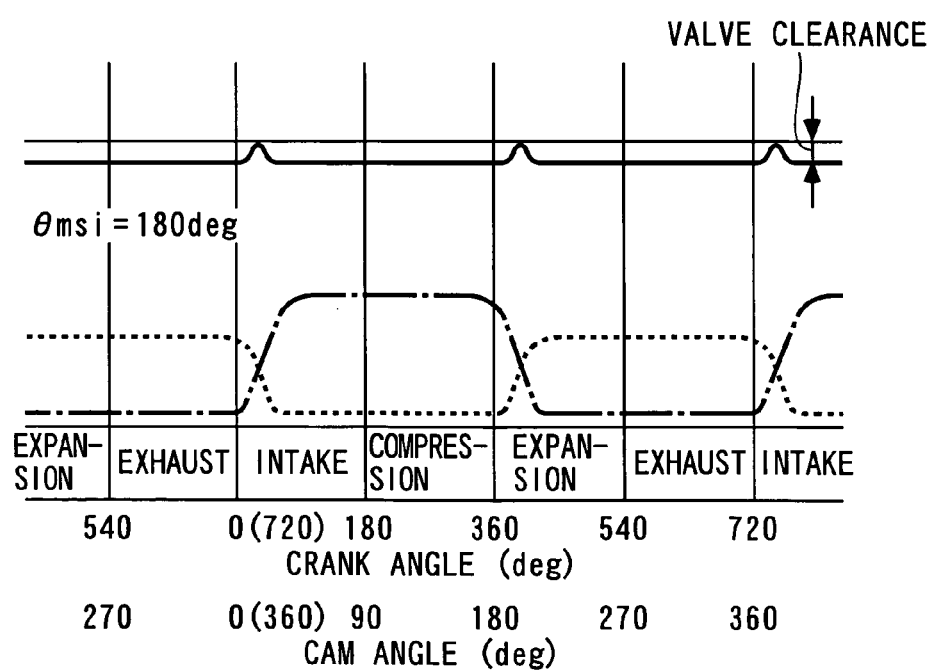
FIG. 15B is a diagram showing a valve lift curve and the like of the intake valve, which is useful in explaining operation of the intake valve when the auxiliary intake cam phase θmsi is set to 180 degrees.

Finally, when the auxiliary intake cam phase θmsi becomes equal to 180 degrees, as shown in FIG. 15A, during the time period over which the main intake cam 43 is in abutment with the intake rocker arm 51 at the high portion of the cam nose thereof, the auxiliary intake cam 44 is held in abutment with the first link 53 at the low portion of the cam nose thereof. Consequently, as shown in FIG. 15B, the amount of movement of the adjusting bolt 51b is made very small, and the maximum value thereof is made slightly smaller than the valve clearance. As a result, when the auxiliary intake cam phase θmsi is equal to 180 degrees, the intake valve 6 is inhibited from being actuated by the adjusting bolt 51b, whereby the intake valve 6 is held in a closed state.

Although the variable intake valve actuation assembly 40 described above is configured such that the valve lift curve of the intake valve 6 becomes the same as that of an intake valve actuated by the Otto intake cam when the auxiliary intake cam phase θmsi is equal to 90 degrees, the value of the auxiliary intake cam phase θmsi which causes the valve lift amount to become the same as that of an intake valve actuated by the Otto intake cam can be changed as required by changing the cam profiles of the main and auxiliary intake cams 43 and 44.

Next, a description will be given of the variable exhaust valve actuation assembly 90, which is configured substantially similarly to the variable intake valve actuation assembly 40 described above, and comprised of a main exhaust camshaft 91 and an auxiliary exhaust camshaft 92, for driving the exhaust valves 7, exhaust valve-actuating mechanisms 100 (only one of which is shown in FIG. 2) provided for the respective cylinders, for opening and closing the associated exhaust valves 7 in accordance with rotation of the main and auxiliary exhaust camshafts 91 and 92, a variable main exhaust cam phase mechanism 110, a variable auxiliary exhaust cam phase mechanism 120, and three variable inter-exhaust cam phase mechanisms 130.

The main exhaust camshaft 91 includes main exhaust cams 93 provided for the respective cylinders, a main gear 95 integrally mounted thereon, and a sprocket 97 provided at one end thereof. Similarly to the sprocket 47 of the main intake camshaft 41, the sprocket 97 is connected to the crankshaft 3b via the timing chain 48, whereby the main exhaust camshaft 91 is rotated through 360 degrees as the crankshaft 3b rotates through 720 degrees.

The variable main exhaust cam phase mechanism 110 continuously advances or retards the relative phase of the main exhaust camshaft 91 with respect to the sprocket 97, that is, the relative phase θme of the main exhaust camshaft 91 with respect to the crankshaft 3b (hereinafter referred to as "the main exhaust cam phase θme"). The variable main exhaust cam phase mechanism 110 is constructed similarly to the variable main intake cam phase mechanism 60, described above, and hence detailed description thereof is omitted.

Further, a main exhaust cam angle sensor 32 is disposed at the other end of the main exhaust camshaft 91, opposite to the one end where the sprocket 97 is mounted. Similarly to the main intake cam angle sensor 27, the main exhaust cam angle sensor 32 is implemented by a combination of a magnet rotor and an MRE pickup (neither of which is shown), and delivers a main exhaust cam signal, which is a pulse signal, to the ECU 2 along with rotation of the main exhaust camshaft 91. Each pulse of the main exhaust cam signal is generated whenever the main exhaust camshaft 91 rotates through a predetermined cam angle (e.g. one degree), and the ECU 2 calculates the main exhaust cam phase θme based on the main exhaust cam signal and the CRK signal.

On the other hand, the auxiliary exhaust camshaft 92 has auxiliary exhaust cams 94 mounted thereon for the respective cylinders, and an auxiliary gear 96 having the same number of gear teeth as that of gear teeth of the main gear 95. Similarly to the main and auxiliary gears 45 and 46 described above, the main and auxiliary gears 95 and 96 are both urged by urging springs, not shown, such that they are always in mesh with each other, and configured such that backlash of the meshing teeth of the main and auxiliary gears 95 and 96 is prevented from occurring by a backlash-compensating mechanism, not shown. The gears 95 and 96 are in mesh with each other, whereby as the main exhaust camshaft 91 rotates, the auxiliary exhaust camshaft 92 is rotated at the same rotational speed as that of the main exhaust camshaft 91 in a direction opposite to the direction of rotation thereof The variable auxiliary exhaust cam phase mechanism 120 continuously changes the relative phase of the auxiliary exhaust camshaft 92 with respect to the gear 96, in other words, the relative phase θmse of the auxiliary exhaust camshaft 92 with respect to the main exhaust camshaft 91 (hereinafter referred to as "the auxiliary exhaust cam phase θmse"). The variable auxiliary exhaust cam phase mechanism 120 is constructed similarly to the aforementioned variable auxiliary intake cam phase mechanism 70, and hence detailed description thereof is omitted.

An auxiliary exhaust cam angle sensor 33 is provided at an end of the auxiliary exhaust camshaft 92, opposite to an end thereof where the variable auxiliary exhaust cam phase mechanism 120 is provided. Similarly to the main exhaust cam angle sensor 32, the auxiliary exhaust cam angle sensor 33 is implemented by a combination of a magnet rotor and an MRE pickup (neither of which is shown), and delivers an auxiliary exhaust cam signal, which is a pulse signal, to the ECU 2 along with rotation of the auxiliary exhaust camshaft 92. Each pulse of the auxiliary exhaust cam signal is generated whenever the auxiliary exhaust camshaft 92 rotates through a predetermined cam angle (e.g. one degree). The ECU 2 calculates the auxiliary exhaust cam phase θmse based on the auxiliary exhaust cam signal, the main exhaust cam signal, and the CRK signal.

Out of the four auxiliary exhaust cams 94, the auxiliary exhaust cam 94 for the first cylinder #1 is coaxially mounted on the auxiliary exhaust camshaft 92, for rotation in unison with the auxiliary exhaust camshaft 92, while the other auxiliary exhaust cams 94 for the second to fourth cylinders #2 to #4 are connected to the auxiliary exhaust camshaft 92 via the associated variable inter-exhaust cam phase mechanisms 130, respectively. The variable inter-exhaust cam phase mechanisms 130 continuously change the relative phases (hereinafter referred to as "the inter-exhaust cam phases") θsse#2 to θsse#4 of the auxiliary exhaust cams 94 for the second to fourth cylinders #2 to #4, respectively, with respect to the auxiliary exhaust cam 94 for the first cylinder #1, independently of each other. The variable inter-exhaust cam phase mechanisms 130 are constructed similarly to the variable inter-intake cam phase mechanisms 80, and hence detailed description thereof is omitted.

Each exhaust valve-actuating mechanism 100 is constructed similarly to the intake valve-actuating mechanism 50, and comprised of the associated main and auxiliary exhaust cams 93 and 94, an exhaust rocker arm 101 for opening and closing the associated exhaust valve 7, and a link mechanism 102 supporting the exhaust rocker arm 101.

The main and auxiliary exhaust cams 93 and 94 have the same cam profiles as those of the main and auxiliary intake cams 43 and 44, respectively. Further, since the exhaust rocker arm 101 and the link mechanism 102 are constructed similarly to the intake rocker arm 51 and the link mechanism 52, respectively, detailed description thereof is omitted, but the exhaust rocker arm 101 has an adjusting bolt 101b similar to the adjusting bolt 51b, mounted at an end thereof opposite to an end where the main exhaust cam 93 is mounted, and is pivotally supported by a first link 103.

Figure 17:
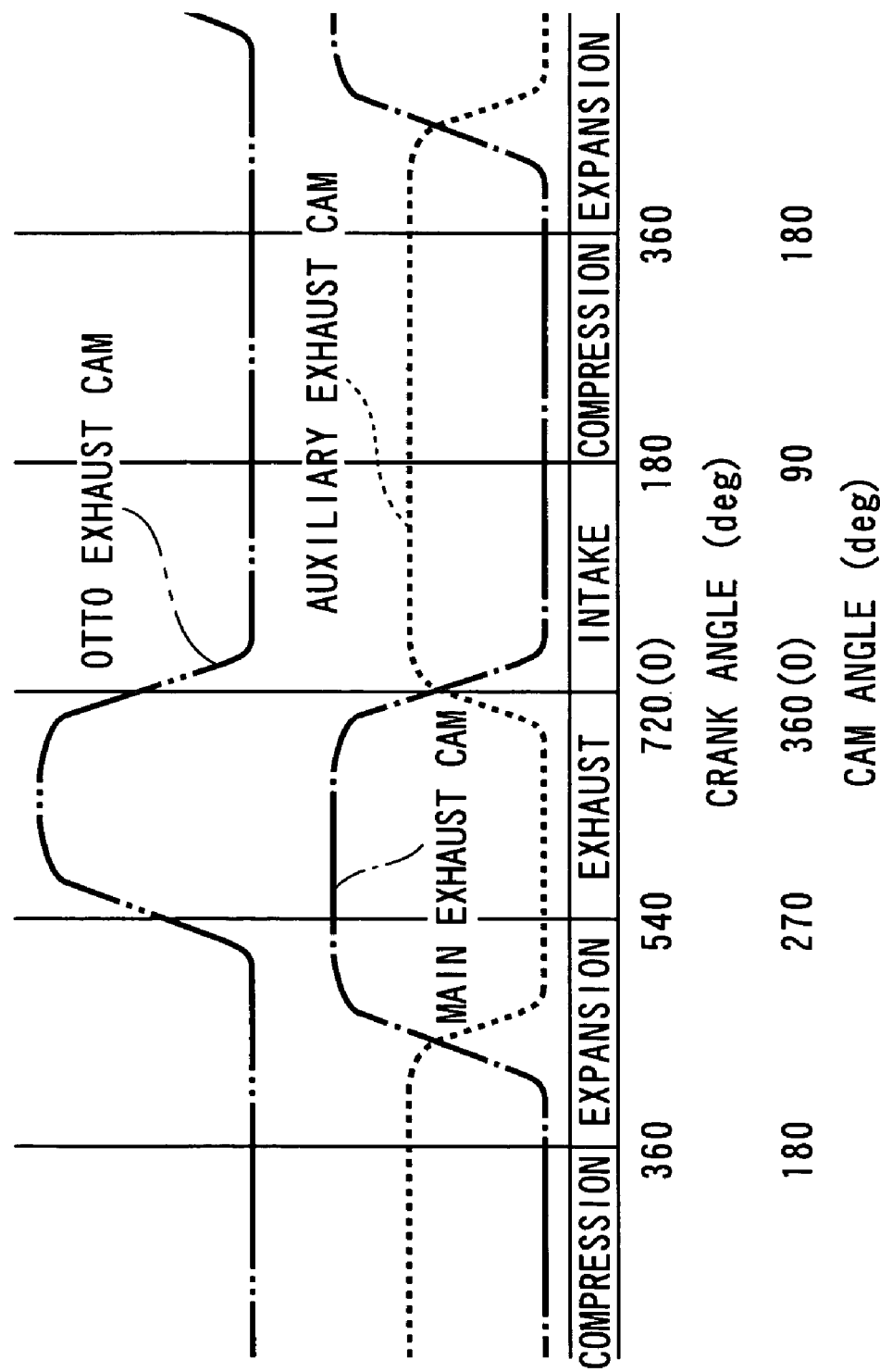
FIG. 17 is a diagram useful in explaining cam profiles of a main exhaust cam and an auxiliary exhaust cam.

Next, a description will be given of operation of the variable exhaust valve actuation assembly 90 constructed as above. In the following description, the main and auxiliary exhaust cams 93 and 94 are described by taking the main and auxiliary exhaust cams 93 and 94 for the first cylinder #1 as examples. FIG. 17 is a diagram useful in explaining the cam profiles of the main and auxiliary exhaust cams 93 and 94, which shows an example of the operation of the variable exhaust valve actuation assembly 90 performed when the auxiliary exhaust cam phase θmse is set to 0 degrees by the variable auxiliary exhaust cam phase mechanism 120.

A curve indicated by a one-dot chain line in FIG. 17 represents the amount and timing of movement of a contact point where the main exhaust cam 93 and the exhaust rocker arm 101 are in contact with each other, occurring during rotation of the main exhaust cam 93, while a curve indicated by a broken line in FIG. 17 represents the amount and timing of movement of the first link 103, occurring during rotation of the auxiliary exhaust cam 94. The same applies to FIGS. 18 to 21, referred to hereinafter.

Further, a curve indicated by a two-dot chain line in FIG. 17 represents, for comparison, the amount and timing of movement of the adjusting bolt 101b actuated by an exhaust cam (hereinafter referred to as "the Otto exhaust cam") of the general engine of the Otto cycle type (Otto engine). A curve obtained by incorporating a valve clearance-related factor into the curve corresponds to a valve lift curve of an exhaust valve actuated by the Otto exhaust cam. Therefore, in the following description, this curve is referred to as "the valve lift curve" of the Otto exhaust cam, as required.

As shown in FIG. 17, the main exhaust cam 93 is configured as a so-called advanced-opening cam, which in comparison with the Otto exhaust cam, close the exhaust valve 7 in the same valve-closing timing, and opens the same in earlier timing during the expansion stroke. Further, the main exhaust cam 93 has a cam profile configured such that the maximum valve lift is continued over a predetermined range (corresponding to a cam angle of e.g. 90 degrees).

Further, compared with the main exhaust cam 93, the auxiliary exhaust cam 94 has a cam profile configured such that the exhaust valve 7 is made open for a longer time period and the maximum valve lift is continued over a predetermined longer range (corresponding to a cam angle of e.g. 150 degrees).

Figure 18:
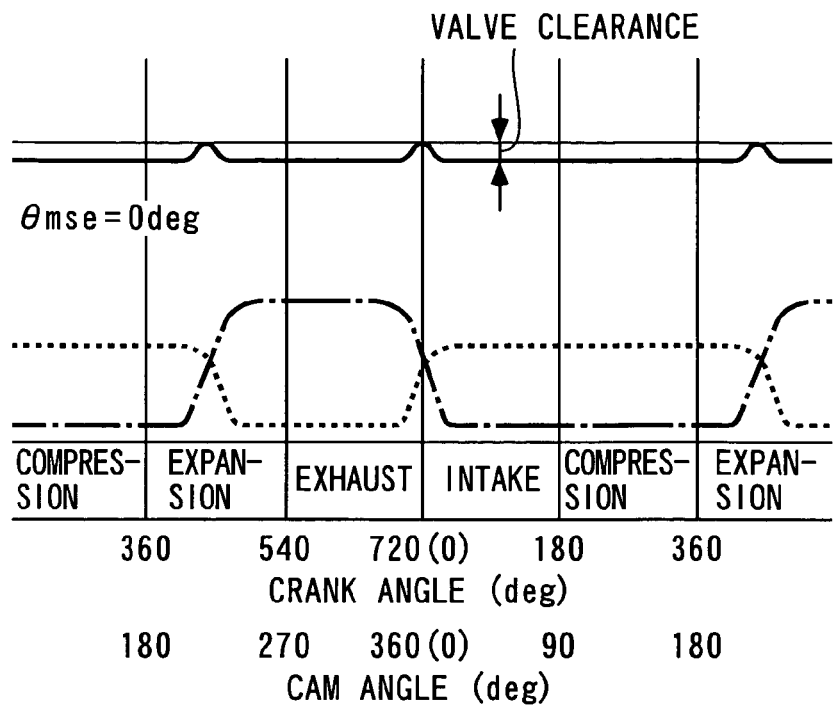
FIG. 18 is a diagram showing a valve lift curve and the like of an exhaust valve, which is useful in explaining operation of the exhaust valve when an auxiliary exhaust cam phase θmse is equal to 0 degrees.

Next, operation of the exhaust valve-actuating mechanism 100 performed when the exhaust valve 7 is actually actuated by the main and auxiliary exhaust cams 93 and 94 having the above cam profiles will be described with reference to FIGS. 18 to 21. FIG. 18 shows an example of the operation of the exhaust valve-actuating mechanism 100 in which the auxiliary exhaust cam phase θmse is set to 0 degrees. It should be noted that a curve indicated by a solid line in FIG. 18 shows the actual amount and timing of movement of the adjusting bolt 101b and, as described above, substantially corresponds to the valve lift curve of the exhaust valve 7. Therefore, in the following description, the curve indicated by the solid line is referred to as the valve lift curve of the exhaust valve 7 as required, and the actual amount and timing of movement of the adjusting bolt 101b are referred to as the valve lift amount and the valve timing of the exhaust valve 7, respectively. The same applies to FIGS. 19 to 21, referred to hereinafter.

As described hereinbefore, when the auxiliary exhaust cam phase θmse is equal to 0 degrees, the main intake cam phase θmsi is equal to 180 degrees, and therefore, the auxiliary exhaust cam 94 is held in abutment with the first link 103 at a low portion of a cam nose thereof, during a time period over which the main exhaust cam 93 is in abutment with the exhaust rocker arm 101 at a high portion of a cam nose thereof. As a result, as shown in FIG. 18, the amount of movement of the adjusting bolt 101b is made very small, and the maximum value thereof is made slightly smaller than the valve clearance. Therefore, when the auxiliary exhaust cam phase θmse is equal to 0 degrees, the exhaust valve 7 is inhibited from being actuated by the adjusting bolt 10b, whereby the exhaust valve 7 is held in a closed state.

Figure 19:
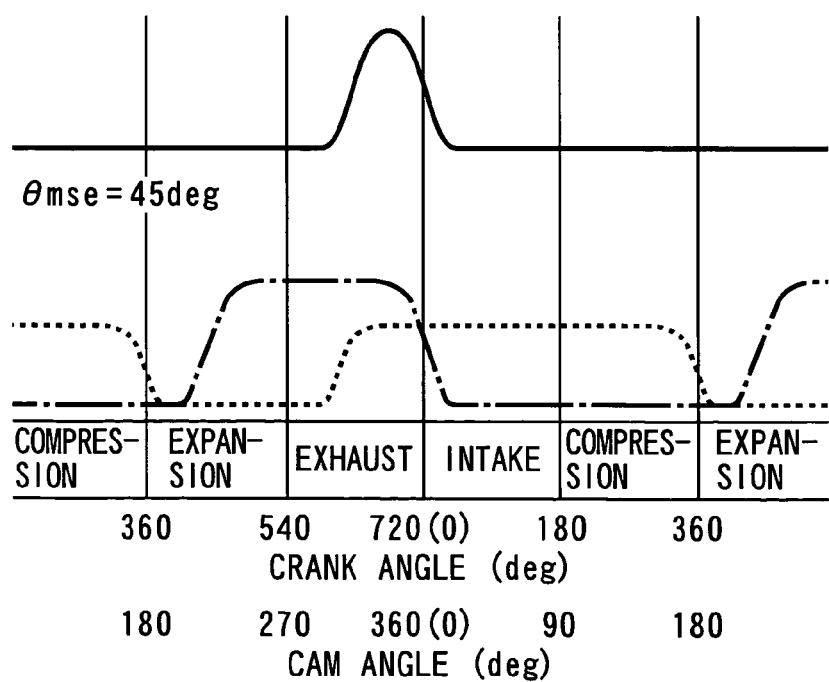
FIG. 19 is a diagram showing a valve lift curve and the like of the exhaust valve, which is useful in explaining operation of the exhaust valve when the auxiliary exhaust cam phase θmse is equal to 45 degrees.
Figure 20:
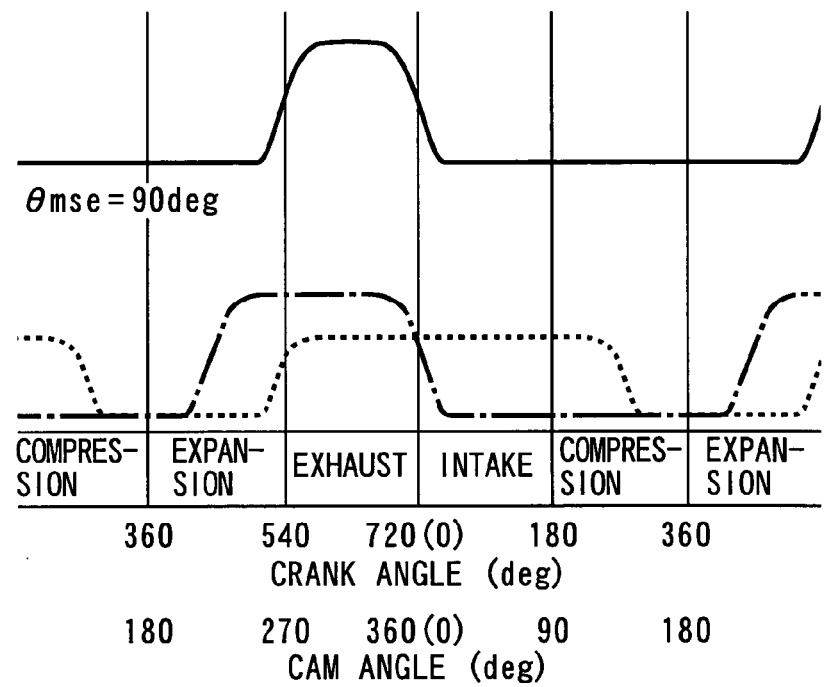
FIG. 20 is a diagram showing a valve lift curve and the like of the exhaust valve, which is useful in explaining operation of the exhaust valve when the auxiliary exhaust cam phase θmse is equal to 90 degrees.
Figure 21:
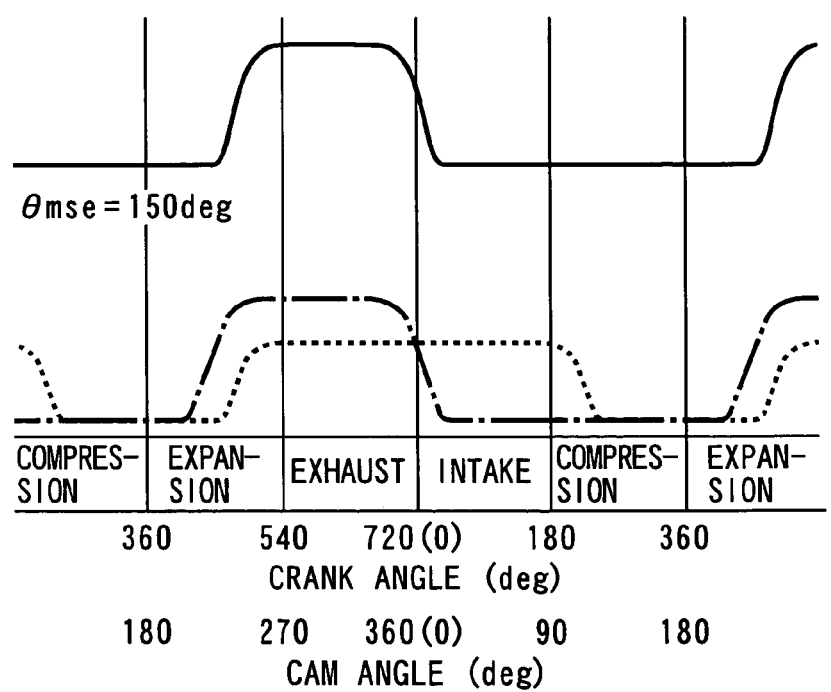
FIG. 21 is a diagram showing the valve lift curve and the like of the exhaust valve, which is useful in explaining operation of the exhaust valve when the auxiliary exhaust cam phase θmse is equal to 150 degrees holding.

FIGS. 19 to 21 show examples of operation of the exhaust valve 7 performed when the auxiliary exhaust cam phase θmse is set to 45 degrees, 90 degrees, and 150 degrees, respectively, by the variable auxiliary exhaust cam phase mechanism 120. In other words, these figures show examples of operation of the variable main exhaust cam phase mechanism 110 performed when the phase of the auxiliary exhaust camshaft 92 is advanced by respective amounts corresponding to cam angles of 45 degrees, 90 degrees, and 150 degrees, with respect to the main exhaust camshaft 91.

With the arrangement of the exhaust valve-actuating mechanisms 100 described above, as the auxiliary exhaust cam phase θmse is increased, in other words, as the phase of the auxiliary exhaust camshaft 92 is advanced with respect to the main exhaust camshaft 91, a time period over which the auxiliary exhaust cam 94 is held in abutment with the first link 103 at a high portion of the cam nose thereof is made longer, during the time period over which the main exhaust cam 93 is in abutment with the exhaust rocker arm 101 at the high portion of the cam nose thereof. As a result, as shown in FIGS. 19 to 21, as the auxiliary exhaust cam phase θmse is increased, the valve-opening timing of the exhaust valve 7 is made earlier.

More specifically, in the FIG. 19 example in which the auxiliary exhaust cam phase θmse is equal to 45 degrees, the exhaust valve 7 is in a state actuated by a retarded-opening cam, in which in comparison with the case of the exhaust valve 7 being actuated by the Otto exhaust cam, the valve-closing timing is the same, and the valve-opening timing is made earlier. Further, in the FIG. 20 example in which the auxiliary exhaust cam phase θmse is set to 90 degrees, the valve timing of the exhaust valve 7 is the same as that of an exhaust valve actuated by the Otto exhaust cam. Further, when the auxiliary exhaust cam phase θmse is larger than 90 degrees, e.g. when the auxiliary exhaust cam phase θmse is equal to 150 degrees, as shown in FIG. 21, the exhaust valve 7 is in a state actuated by an advanced-closing cam, in which in comparison with the case of the exhaust valve 7 being actuated by the Otto exhaust cam, the valve-closing timing is the same, and the valve-opening timing is made earlier. Although not shown, the exhaust valve-actuating mechanisms 100 is configured such that in the range of the auxiliary exhaust cam phase θmse from 0 to 60 degrees, the amount of the valve lift of the exhaust valve 7 is increased as the auxiliary exhaust cam phase θmse is increased.

Now, as shown in FIG. 3, connected to the ECU 2 are an intake pipe temperature sensor 34, an accelerator opening sensor 35 (load detecting means), and an ignition switch (hereinafter referred to as "the IG•SW") 36. The intake pipe temperature sensor 34 detects air temperature TB in the intake pipe 8, and delivers a signal indicative of the sensed air temperature TB to the ECU 2. The accelerator pedal opening sensor 35 detects a stepped-on amount (hereinafter referred to as "the accelerator pedal opening") AP of an accelerator pedal, not shown, of the vehicle and delivers a signal indicative of the sensed accelerator pedal opening AP to the ECU 12. Further, the IG•SW 36 is turned on or off by operation of an ignition key, not shown, and delivers a signal indicative of the ON/OFF state thereof to the ECU 2.

Next, the ECU 2 will be described. The ECU 2 is implemented by a microcomputer including an I/O interface, a CPU, a RAM, and a ROM, none of which are shown. The ECU 2 determines operating conditions of the engine 3, based on the detection signals delivered from the above-mentioned sensors 20 to 35 and the output signal from the IG•SW 36. Further, the ECU 2 executes control processes, which will be described in detail hereinafter, according to control programs read from the ROM, using data stored in the RAM, and the like. It should be noted that in the present embodiment, the ECU 2 forms start load detecting means, valve-closing timing-determining means, control means, target boost pressure-setting means, supercharging control means, target valve-closing timing-setting means, valve timing control means, and fuel injection ratio-setting means.

Figure 22:
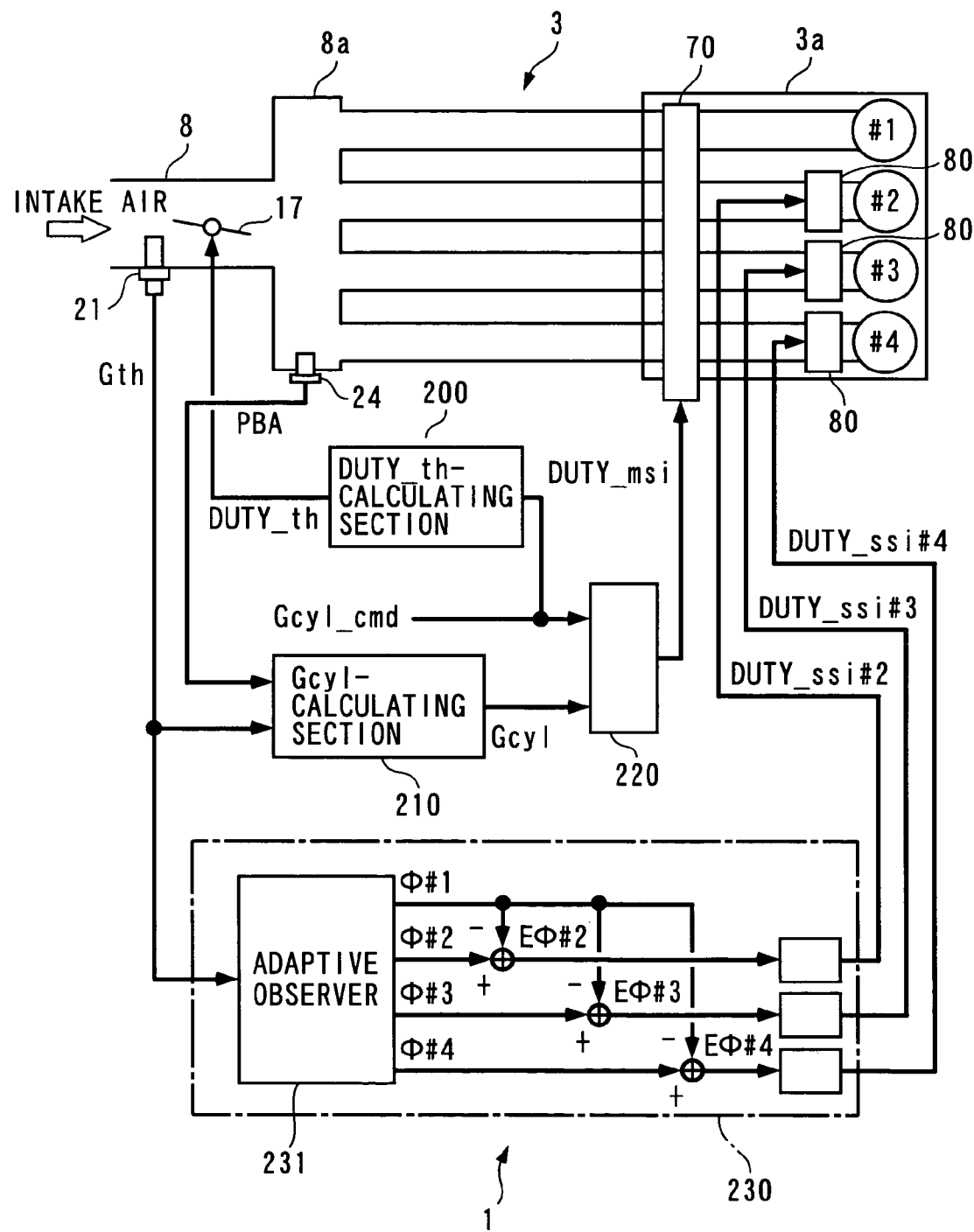
FIG. 22 is a block diagram schematically showing part of the arrangement of the control system, for control of a throttle valve mechanism, the variable auxiliary intake cam phase mechanism, and the variable inter-intake cam phase mechanism.

Referring to FIG. 22, the control system 1 according to the present embodiment includes a DUTY_th-calculating section 200, a Gcyl-calculating section 210, an auxiliary intake cam phase controller 220, and an inter-intake cam phase controller 230, all of which are implemented by the ECU 2. In the DUTY_th-calculating section 200, as described hereinafter, a target opening degree TH_cmd, which is a target value of the throttle valve opening TH, is calculated according to a target intake air amount Gcyl_cmd, and further the control input DUTY_th to the throttle valve mechanism 16 is calculated based on the target opening degree TH_cmd.

The Gcyl-calculating section 210 calculates a cylinder intake air amount Gcyl of intake air estimated to have been drawn into a cylinder, by an equation (1) shown in FIG. 24. In this equation (1), the symbols VB, and R, and TB represent the volume of the inside of the intake pipe 8, a predetermined gas constant, and temperature within the intake pipe 8, respectively. Further, the symbol n represents a discretized time, and indicates that each discrete data (time-series data) with (n), (n−1), or the like is data sampled at a predetermined repetition period (e.g. synchronous with input of the TDC signal, or set to a fixed time period). Further, the data with (n) indicates that it has a current value, and the data with (n−1) indicates that it has an immediately preceding value. This also applies to discrete data referred to hereinafter. Furthermore, in the description throughout the specification, the symbols (n), (n−1), and so forth indicating that data therewith are discrete data will be omitted as appropriate.

The auxiliary intake cam phase controller 220 calculates a control input DUTY_msi to the variable auxiliary intake cam phase mechanism 70, according to the cylinder intake air amount Gcyl calculated by the Gcyl-calculating section 210 and so forth. Details of the auxiliary intake cam phase controller 220 will be described hereinafter.

Further, the inter-intake cam phase controller 230 is for correcting variation in the intake air amount between the cylinders, and detailed description thereof is omitted here, but due to the provision of the adaptive observer 231 and so forth, three target intake cam phases θssi#i_cmd (#i=#2 to #4) are calculated, according to which the control inputs DUTY_ssi#2 to DUTY_ssi#4 are calculated. Then, these control inputs DUTY_ssi#2 to DUTY_ssi#4 are output to the three variable intake cam phase change mechanisms 80, respectively, whereby the inter-intake cam phases θssi#2 to θssi#4 of the second to fourth cylinders #2 to #4 with respect to the first cylinder #1 are controlled.

Figure 23:
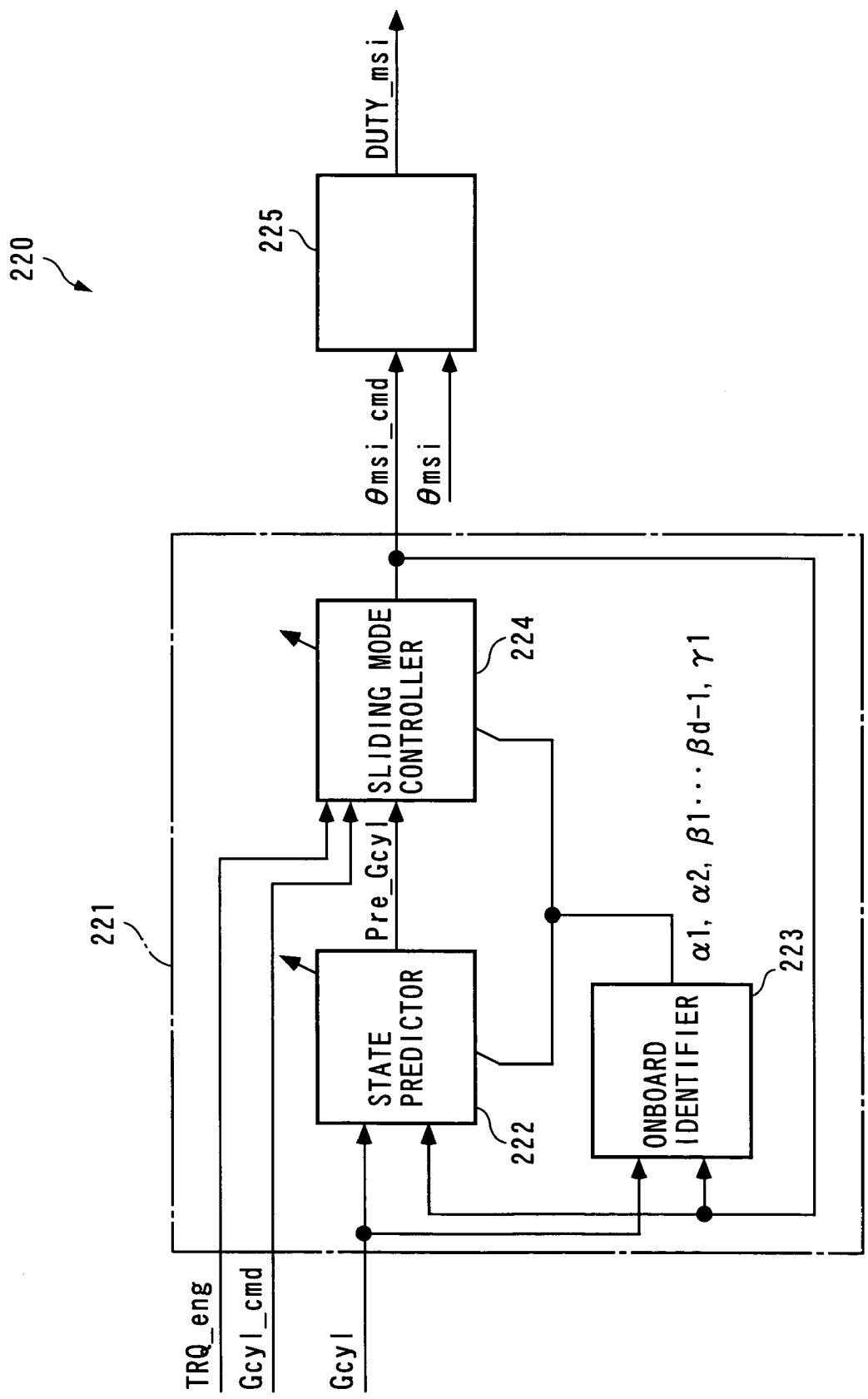
FIG. 23 is a block diagram schematically showing the configuration of an auxiliary intake cam phase controller.

Next, a description will be given of the auxiliary intake cam phase controller 220. As shown in FIG. 23, the auxiliary intake cam phase controller 220 is comprised of a first SPAS controller 221 (valve-closing timing-determining means) that calculates a target auxiliary intake cam phase θmsi_cmd, and a second SPAS controller 225 that calculates the control input DUTY_msi.

The first SPAS controller 221 (valve-closing timing-setting means) calculates the target auxiliary intake cam phase θmsi_cmd with a self-tuning prediction pole assignment control algorithm, referred to hereinafter, such that the cylinder intake air amount Gcyl converges to the target intake air amount Gcyl_cmd and the auxiliary intake cam phase θmsi is constrained to a basic value θmsi_base, referred to hereinafter, based on the cylinder intake air amount Gcyl, the target intake air amount Gcyl_cmd, and a demanded drive torque TRQ_eng. The first SPAS controller 221 is comprised of a state predictor 222, an onboard identifier 223, and a sliding mode controller 224.

First, the state predictor 222 will be described. With a prediction algorithm, described hereinafter, the state predictor 222, predicts (calculates) a predicted intake air amount Pre_Gcyl, which is a predicted value of the cylinder intake air amount Gcyl.

First, when a controlled object to which is inputted the target auxiliary intake cam phase θmsi and from which is outputted the cylinder intake air amount Gcyl is modeled as an ARX model (auto-regressive model with exogenous input) which is a discrete-time system model, an equation (2) shown in FIG. 24 can be obtained. In this equation (2), the symbol d represents dead time determined depending on the characteristics of the controlled object. Further, the symbols a1, a2, and b1 represent model parameters, which are sequentially identified by the onboard identifier 223, as described hereinafter.

Then, when the equation (2) is shifted toward the future side by the amount of discrete time [d−1], an equation (3) in FIG. 24 can be obtained. Further, when matrices A and B are defined by equations (4) and (5) in FIG. 24 using the model parameters a1, a2, and b1, and the equation (3) is changed by repeatedly using a recurrence formula thereof to eliminate future values [Gcyl(n+d−2), Gcyl(n+d−3)) on the left side of the equation (3), an equation (6) shown in FIG. 24 can be obtained.

Although it is possible to calculate the predicted intake air amount Pre_Gcyl using the equation (6), shortage of the order of the model, a nonlinear characteristic of the controlled object, and so forth can cause a steady-state deviation and modeling errors in the predicted intake air amount Pre_Gcyl.

To avoid this problem, the state predictor 222 according to the present embodiment calculates the predicted intake air amount Pre_Gcyl using an equation (7) shown in FIG. 24 in place of the equation (6). This equation (7) can be obtained by adding to the right side of the equation (6), a compensation parameter γ1 for compensating for the steady-state deviation and the modeling errors.

Next, a description will be given of the onboard identifier 223. With a sequential identification algorithm, described hereinbelow, the onboard identifier 223 identifies a vector θs of matrix components α1, α2, and βj of model parameters, and the compensation parameter γ1, in the aforementioned equation (7), such that an identification error ide, which is the difference between the predicted intake air amount Pre_Gcyl and the cylinder intake air amount Gcyl, is minimized (i.e. such that the predicted intake air amount Pre_Gcyl becomes equal to the cylinder intake air amount Gcyl).

More specifically, a vector θs(n) is calculated using equations (8) to (13) shown in FIG. 25. The transposed matrix of the vector θs(n) is defined by an equation (12) shown in FIG. 25. Further, in the equation (8), the symbol KPs(n) represents a vector of a gain coefficient, and the gain coefficient KPs(n) is calculated by the equation (9). In the equation (9), the symbol Ps(n) represents a square matrix of order (d+2) defined by the equation (10), and the symbol ζs(n) represents a vector whose transposed matrix is defined by the equation (13). Further, an identification error ide(n) in the equation (8) is calculated by the equation (11).

In the identification algorithm as described above, by setting the weighting parameters λ1 and λ2 in the equation (10), one of the following identification algorithms is selected:

λ1=1, λ2=0: fixed gain algorithm;
λ1=1, λ2=1: least-squares method algorithm;
λ1=1, λ2=λ: progressively decreasing gain algorithm; and
λ1=λ, λ2=1: weighted least-squares method algorithm,
wherein λ is a predetermined value set such that 0<λ<1 holds.

It should be noted that in the present embodiment, the weighted least-squares method is employed so as to optimally secure both identification accuracy and a convergence rate at which the vector θs converges to an optimal value.

Next, a description will be given of the sliding mode controller (hereinafter referred to as "the SLD controller") 224. The SLD controller 224 calculates the target auxiliary intake cam phase θmsi_cmd based on a sliding mode control algorithm, such that the cylinder intake air amount Gcyl converges to the target intake air amount Gcyl_cmd, and at the same time the auxiliary intake cam phase θmsi is constrained to a basic value θmsi_base. In the following, a description will be given of the sliding mode control algorithm.

First, in the sliding mode control algorithm, an equation (14) shown in FIG. 26 is used as a controlled object model. This equation (14) is obtained by shifting the above-mentioned equation (6) in FIG. 24 toward the future side by the amount of discrete time [1].

When the controlled object model expressed by the equation (14) is used, a switching function as is set as follows: As expressed by an equation (15) in FIG. 26, when a following error Es is defined as the difference between the cylinder intake air amount Gcyl and the target intake air amount Gcyl_cmd, the switching function as is set as a linear function of the time series data (discrete data) of the following error Es, as expressed by an equation (16) in FIG. 26. It should be noted that the symbol Ss used in the equation (16) represents a switching function-setting parameter.

Figure 28:
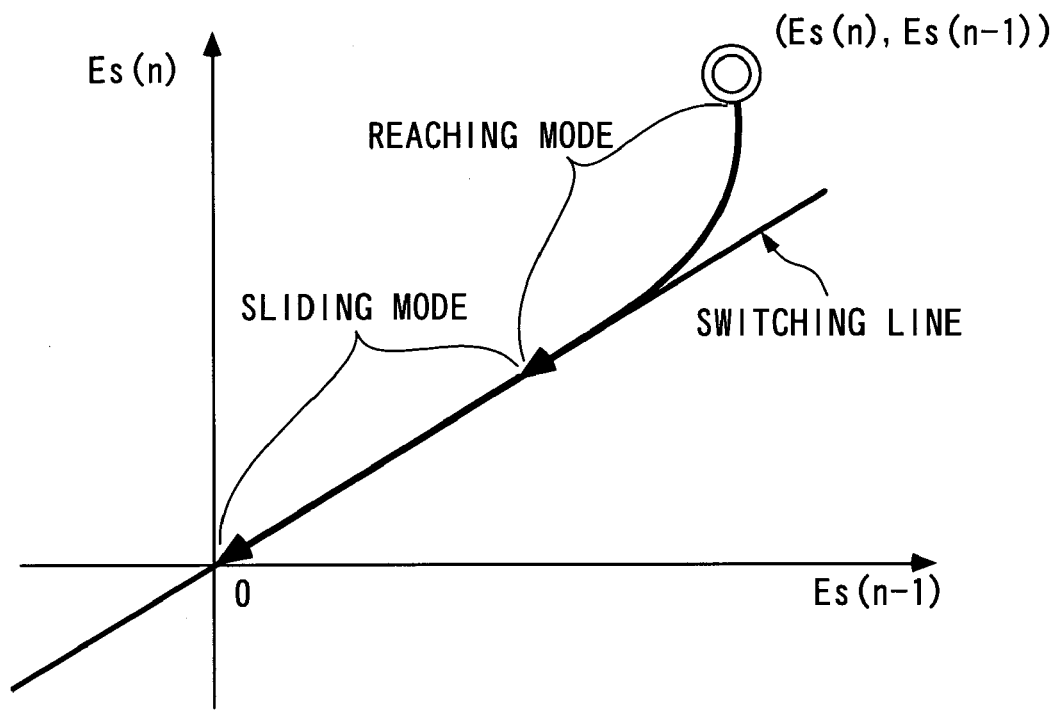
FIG. 28 is a diagram showing a phase plane and a switching line useful for explaining the sliding mode control algorithm.

In the sliding mode control algorithm, when the switching function σs is formed by two state variables [Es(n), Es(n−1)] as in the present embodiment, as shown in FIG. 28, a phase space formed by the two state variables is a two-dimensional phase plane having the longitudinal axis and the horizontal axis respectively defined by the state variables, and on the phase plane, a combination of two values of the state variables satisfying the condition of σs=0 is on a straight line referred to as a switching line, which is expressed by a mathematical expression [Es(n)=−Ss·Es(n−1)].

The above mathematical expression [Es(n)=−Ss·Es(n−1)] expresses a first-order lag system with no input. Therefore, if the switching function-setting parameter Ss is set such that −1<Ss<1 holds, for example, and at the same time the first-order lag system is stabilized, the combination of the two state variables [Es(n), Es(n−1)] converges to an equilibrium point at which the two values each become equal to a value of 0, with the lapse of time. More specifically, by thus causing the following error Es to converge to a value of 0, it is possible to cause the cylinder intake air amount Gcyl to converge (slide) to the target intake air amount Gcyl_cmd. It should be noted that asymptotic approach of the two values of the state variables [Es(n), Es(n−1)] to the switching line is referred to as "the reaching mode", and a sliding behavior of the two values to the equilibrium point is referred to as "the sliding mode".

Figure 29:
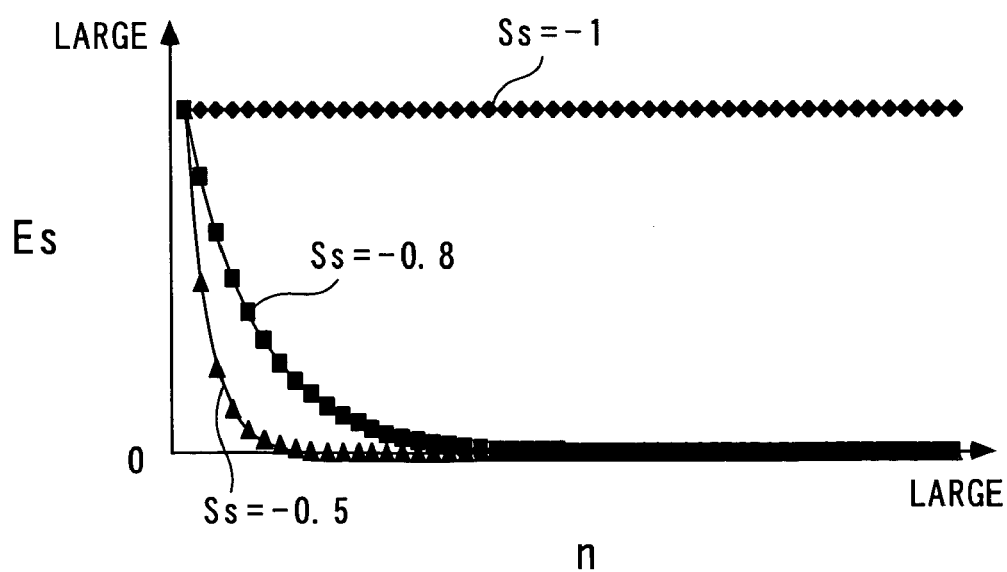
FIG. 29 is a diagram showing an example of a convergence behavior of a following error Es exhibited when a switching function-setting parameter Ss is changed by the sliding mode controller.

In this case, when the switching function-setting parameter Ss is set to a positive value, the first-order lag system expressed by the equation [Es(n)=−Ss•Es(n−1)] becomes an oscillating-stability system, which is not preferable for the converging behavior of the state variables [Es(n), Es(n−1)]. Therefore, in the present embodiment, the switching function-setting parameter Ss is set as expressed by an equation (17) in FIG. 26. When the switching function-setting parameter Ss is set as above, as shown in FIG. 29, as the absolute value of the switching function-setting parameter Ss is smaller, a convergence rate at which the following error Es converges to a value of 0, that is, a convergence rate at which the cylinder intake air amount Gcyl converges to the target intake air amount Gcyl_cmd is higher. As described hereinabove, in the sliding mode control, the switching function-setting parameter Ss makes it possible to specify as desired the converging behavior and convergence rate of the cylinder intake air amount Gcyl which should be caused to converge to the target intake air amount Gcyl_cmd.

Further, as expressed by an equation (18) in FIG. 26, a control input Uspas(n)[=θmsi_cmd(n)] for placing the combination of the state variables [Es(n), Es(n−1)] on the switching line is defined as the sum total of an equivalent control input Ueq(n), a reaching law input Urch(n), and a valve control input Uvt(n).

The equivalent control input Ueq(n) is for constraining the combination of [Es(n), Es(n−1)] on the switching straight line, and specifically, it is defined by an equation (19) shown in FIG. 26. The equation (19) is derived as follows: When an equation (22) shown in FIG. 27 is changed based on the equation (16) described above, an equation (23) shown in FIG. 27 can be obtained. Then, when the equation (23) is changed by repeatedly using a recurrence formula thereof, an equation (24) shown in FIG. 27 can be obtained. Further, when the terms of the auxiliary intake cam phase θmsi in the equation (24) are collectively changed, an equation (25) shown in FIG. 27 can be obtained. Subsequently, in the equation (25), an auxiliary intake cam phase θmsi(n) on the left side thereof is replaced by the equivalent control input Ueq(n), and at the same time a future value Gcyl(n+d−1) and the like of the cylinder intake air amount on the right side thereof are replaced by the predicted value Pre_Gcyl based on the relationship of Pre_Gcyl(n)≈Gcyl(n+d−1) described hereinabove, whereby the equation (19) is derived.

The reaching law input Urch(n) is for causing the combination of [Es(n), Es(n−1)] to converge onto the switching straight line when the combination has deviated from the switching straight line due to disturbance or a modeling error, and specifically, defined by an equation (20) shown in FIG. 26.

Further, the valve control input Uvt(n) is a feedforward input for constraining the auxiliary intake cam phase θmsi to the basic value θmsi_base thereof. More specifically, it is defined as a value equal to the basic value θmsi_base, as expressed by an equation (21) in FIG. 26. It should be noted that basic value θmsi_base is calculated according to the demanded drive torque TRQ_eng, as will be described hereinafter.

As described above, in the first SPAS controller 221, the state predictor 222 calculates the predicted intake air amount Pre_Gcyl with the state prediction algorithm having the compensation parameter γ1 added thereto, and the onboard identifier 223 sequentially identifies the compensation parameter γ1. This make it possible to calculate the predicted intake air amount Pre_Gcyl with accuracy, while compensating for the aforementioned steady-state deviation and the modeling error.

Further, the SLD controller 224 is capable of causing the following error converge Es to converge to a value of 0 by the reaching law input Urch and the equivalent control input Ueq. That is, it is possible to cause the cylinder intake air amount Gcyl to converge to the target intake air amount Gcyl_cmd, and at the same time specify the converging behavior and convergence rate thereof as desired by configuration of the switching function-setting parameter Ss. This makes it possible to set the convergence rate at which the cylinder intake air amount Gcyl converges to the target intake air amount Gcyl_cmd, to an appropriate value dependent on the characteristics of the controlled object (intake system including the variable auxiliary intake cam phase mechanism 70). Thus, the controllability of the present system can be enhanced.

Further, in addition, the valve control input Uvt makes it possible to constrain the auxiliary intake cam phase θmsi to the basic value θmsi_base thereof, and at the same time it is possible to properly converge the cylinder intake air amount Gcyl to the target intake air amount Gcyl_cmd while compensating for influence of the valve control input Uvt, since the compensation parameter γ1 is included in the equivalent control input Ueq.

Figure 30:
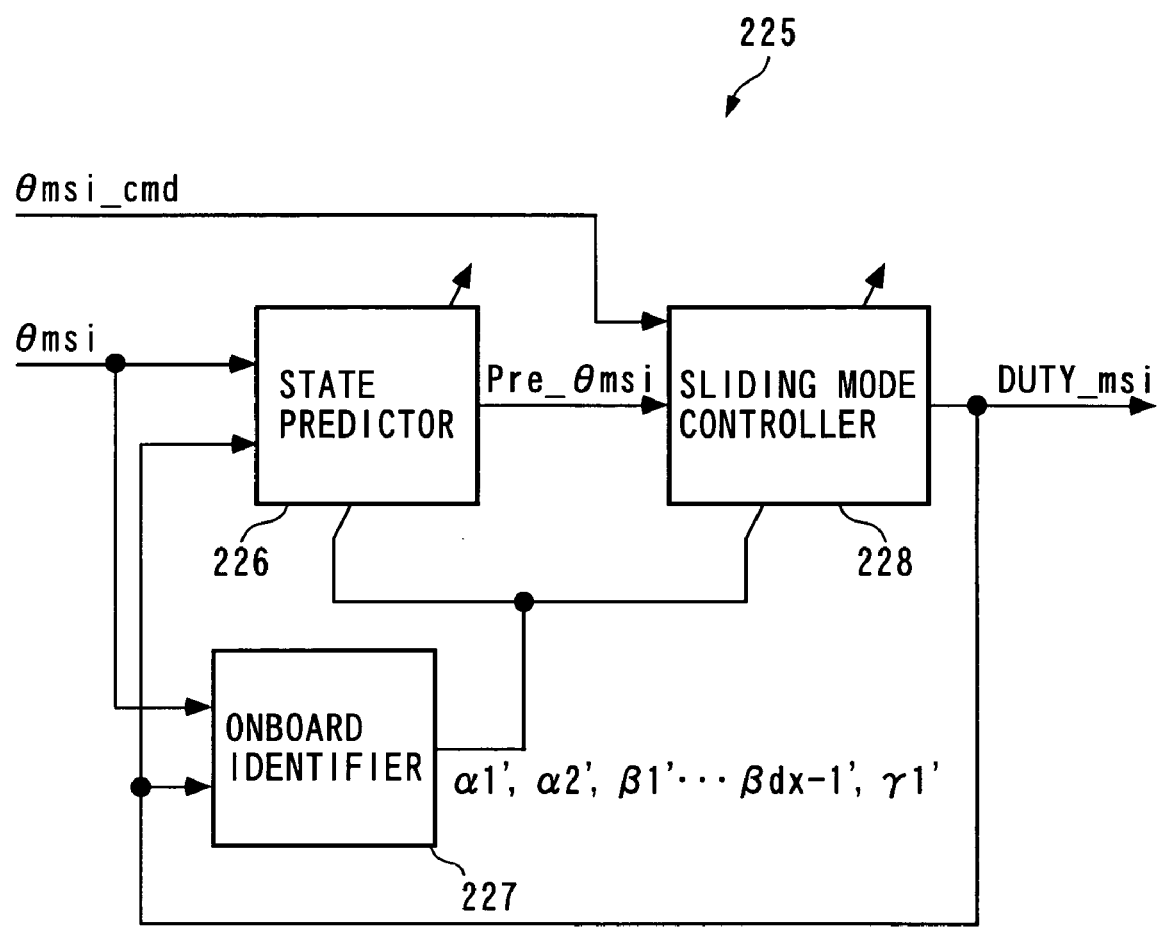
FIG. 30 is a block diagram schematically showing the configuration of a second SPAS controller.

Next, a description will be given of the second SPAS controller 225 mentioned above. The second SPAS controller 225 calculates the control input DUTY_msi according to the auxiliary intake cam phase θmsi and the target auxiliary intake cam phase θmsi_cmd with a control algorithm similar to the control algorithm of the first SPAS controller 221 except for part thereof, and as shown in FIG. 30, the second SPAS controller 225 is comprised of a state predictor 226, an onboard identifier 227, and a sliding mode controller 228.

With the same prediction algorithm as that of the state predictor 222, the state predictor 226 predicts (calculates) a predicted auxiliary intake cam phase Pre_θmsi, which is a predicted value of the auxiliary intake cam phase θmsi.

More specifically, an equation (26) shown in FIG. 31 is used as a controlled object model. In the equation (26), the symbol dx represents dead time determined depending on characteristics of a controlled object, and the symbols a1', a2', and b1' represent model parameters. Further, the symbol m represents a discretized time, and indicates that each discrete data with a symbol (m) or the like is data sampled at a predetermined repetition period shorter than the sampling period for sampling the discrete data with the symbol (n) described hereinbefore. This also applies to discrete data referred to hereinafter. In the description of the present specification, the symbol (m) and like other symbols indicating that data therewith are discrete data will be omitted as appropriate. It should be noted that the reason why the sampling period for sampling each discrete data in the equation (26) is set to a period shorter than the sampling period for sampling each discrete data in the equation (2) described above is as follows: If the convergence rate at which the second SPAS controller 225 causes the auxiliary intake cam phase θmsi to converge to the target auxiliary intake cam phase θmsi_cmd is lower than the convergence rate at which the first SPAS controller 221 causes the cylinder intake air amount Gcyl to converge to the target intake air amount Gcyl_cmd, the controllability of the system is degraded, and hence the sampling period for sampling each discrete data in the equation (26) is made shorter with a view to avoiding the degradation and ensuring excellent controllability of the system.

When matrices A' and B' are defined by equations (27) and (28) shown in FIG. 31 using the model parameters a1', a2', and b1', and the equation (26) is changed similarly to the case of the state predictor 222 described above, an equation (29) shown in FIG. 31 is derived. In the equation (29), the symbol γ' represents a compensation parameter for compensating for a steady-state deviation and a modeling error, similarly to the compensation parameter γ1.

Further, the onboard identifier 227 as well identifies, with a sequential identification algorithm similar to that of the onboard identifier 223, a vector θs' of matrix components α1', α2', and βj' of model parameters, and the compensation parameter γ1', in the above equation (29), such that an identification error ide', which is the difference between the predicted auxiliary intake come phase Pre_θmsi and the auxiliary intake come phase θmsi, is minimized (i.e. such that the predicted auxiliary intake come phase Pre_θmsi becomes equal to the auxiliary intake come phase θmsi).

More specifically, a vector θs'(m) is calculated by equations (30) to (35) shown in FIG. 32. These equations (30) to (35) are configured similarly to the equations (8) to (13) described above, and hence description thereof is omitted.

Next, a description will be given of the sliding mode controller (hereinafter referred to as "the SLD controller") 228. The SLD controller 228 calculates the control input DUTY_msi based on a sliding mode control algorithm, such that the auxiliary intake cam phase θmsi converges to the target auxiliary intake cam phase θmsi_cmd.

More specifically, the control input DUTY_msi is calculated with an algorithm expressed by equations (36) to (41) in FIG. 33. That is, when a following error Es' is defined as the difference between the auxiliary intake cam phase θmsi and the target auxiliary intake cam phase θmsi_cmd, as expressed by the equation (36) in FIG. 33, a switching function σs' and a switching function-setting parameter Ss' are defined by the equations (37) and (38), respectively. Further, as expressed by the equation (39) in FIG. 33, the control input DUTY_msi is defined as the sum total of an equivalent control input Ueq' and a reaching law input Urch'. The equivalent control input Ueq' and the reaching law input Urch' are defined by the equations (40) and (41), respectively. As expressed by the equation (39), the SLD controller 228 is only required to control the auxiliary intake cam phase θmsi such that it converges to the target auxiliary intake cam phase θmsi_cmd, and hence the valve control input Uvt referred to hereinabove is omitted from input components of the control input DUTY_msi.

As described above, in the second SPAS controller 225 as well, the state predictor 226 calculates the predicted auxiliary intake come phase Pre_θmsi with the state prediction algorithm having the compensation parameter γ1' added thereto, and the onboard identifier 227 sequentially identifies the compensation parameter γ1', so that it is possible to accurately calculate the predicted auxiliary intake come phase Pre_θmsi, while compensating for the steady-state deviation and the modeling error.

Further, with the reaching law input Urch' and the equivalent control input Ueq', the SLD controller 227 is capable of causing the auxiliary intake cam phase θmsi to converge to the target auxiliary intake cam phase θmsi_cmd, and at the same time capable of specifying the converging behavior and convergence rate of the auxiliary intake cam phase θmsi as desired by configuration of the switching function-setting parameter Ss'. As a result, the convergence rate at which the auxiliary intake cam phase θmsi converges to the target auxiliary intake cam phase θmsi_cmd can be set to an appropriate value dependent on the characteristics of a controlled object (system including the variable auxiliary intake cam phase mechanism 70), to thereby enhance the controllability of the system.

It should be noted that when the values of the above two switching function-setting parameters Ss and Ss' are set such that they have a relationship of 1<Ss<Ss'<0, the response of the control by the second SPAS controller 225 can be enhanced in comparison with that of control by the first SPAS controller 221, thereby making it possible to improve the controllability of the auxiliary intake cam phase controller 220, i.e. the convergence of the cylinder intake air amount Gcyl to the target intake air amount Gcyl_cmd.

Figure 34:
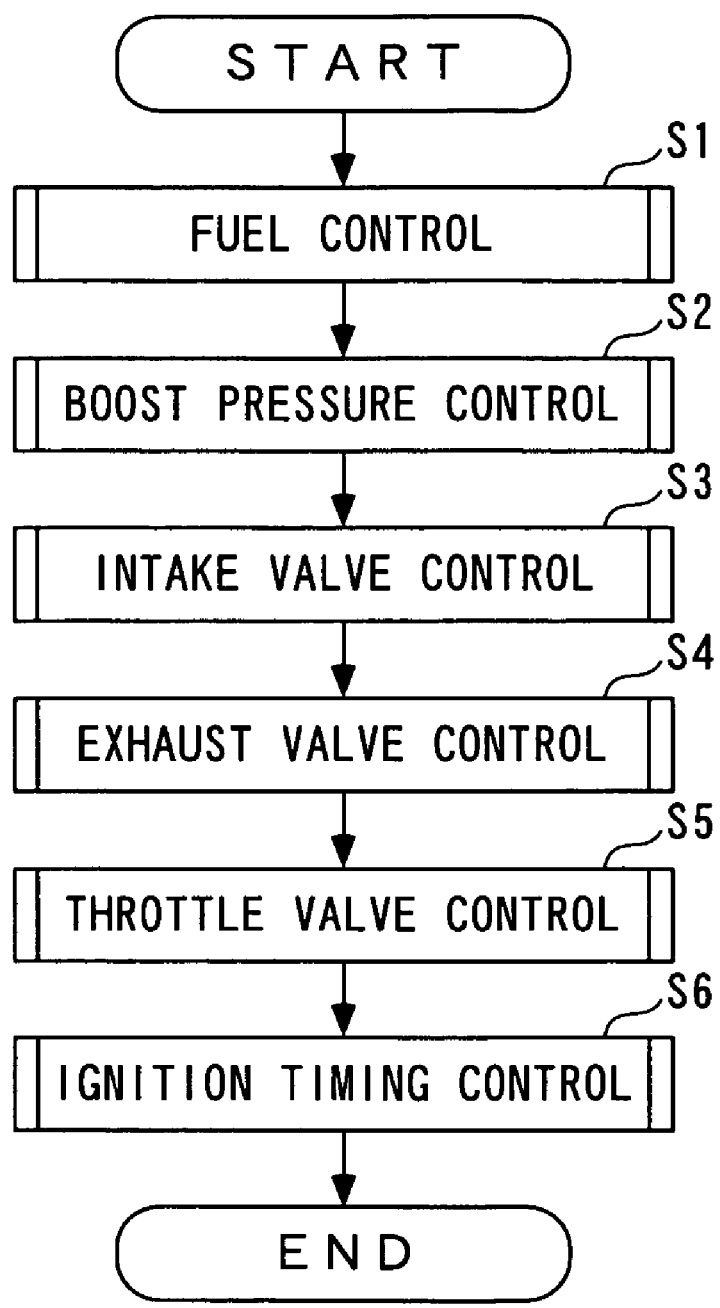
FIG. 34 is a flowchart showing a main routine for carrying out an engine control process.

Hereinafter, an engine control process including a process for controlling valve timing of the intake valves 6, carried out by the ECU 2 will be described with reference to FIG. 34. This figure shows a flowchart of a main routine for carrying out the engine control process. In this program, first, in a step 1 (shown as S1 in abbreviated form in FIG. 34; the following steps are also shown in abbreviated form), a fuel control process is carried out. This process is performed to calculate the demanded drive torque TRQ_eng, the main fuel injection ratio Rt_Pre, the cylinder intake air amount Gcyl, the target intake air amount Gcyl_cmd, and fuel injection amounts TOUT_main and Tout_sub, depending on operating conditions of the engine 3. Details of the process will be described hereinafter.

Then, in a step 2, a boost pressure control process is carried out. This process is for calculating a control input Dut_wg to the wastegate valve 10d depending on the operating conditions of the engine 3, and details thereof will be described hereinafter.

Next, in a step 3, an intake valve control process is carried out. This process is for calculating the aforementioned control inputs DUTY_mi, DUTY_msi, and DUTY_ssi#2 to DUTY_ssi#4 depending on the operating conditions of the engine 3, and details thereof will be described hereinafter.

Next, in a step 4, an exhaust valve control process is carried out. Although detailed description is omitted, this process is for calculating control inputs DUTY_me, DUTY_mse, and DUTY_sse#2 to DUTY_sse#4 to the aforementioned variable main exhaust cam phase mechanism 110, the variable auxiliary exhaust cam phase mechanism 120, and the variable inter-exhaust cam phase mechanisms 130, depending on the operating conditions of the engine 3.

Next, in a step 5, a throttle valve control process is carried out. This process is for calculating the aforementioned control input DUTY_th depending on the operating conditions of the engine 3, and details thereof will be described hereinafter.

Then, in a step 6, an ignition timing control process is carried out, followed by terminating the present program. Although detailed description of the ignition timing control process is omitted, this process is for calculating ignition timing, in which a mixture is ignited by the spark plug 5, depending on the operating conditions of the engine 3.

Figure 35:
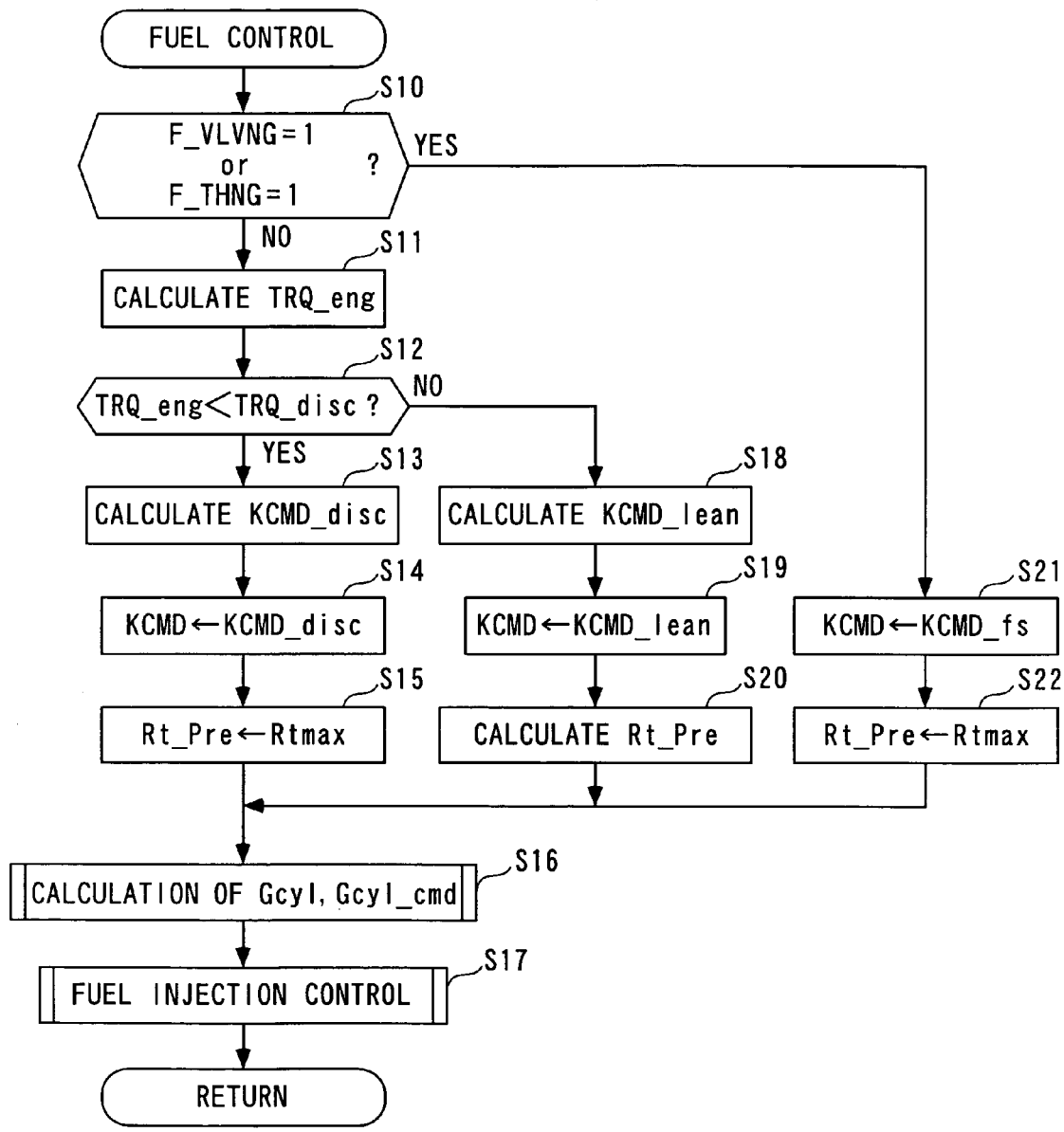
FIG. 35 is a flowchart showing a subroutine for carrying out a fuel control process.

Next, the fuel control process executed in the step 1 will be described with reference to FIG. 35. As shown in FIG. 35, in the present program, first, it is determined in a step 10 whether or not an intake/exhaust valve failure flag F_VLVNG or a throttle valve failure flag F_THNG is equal to 1. The intake/exhaust valve failure flag F_VLVNG is set to 1 when the variable intake valve actuation assembly 40 or the variable exhaust valve actuation assembly 90 is faulty, whereas when both of the units 40 and 90 are normal, it is set to 0. Further, the throttle valve failure flag F_THNG is set to 1 when the throttle valve mechanism 16 is faulty, whereas when the throttle valve mechanism 16 is normal, it is set to 0.

Figure 36:
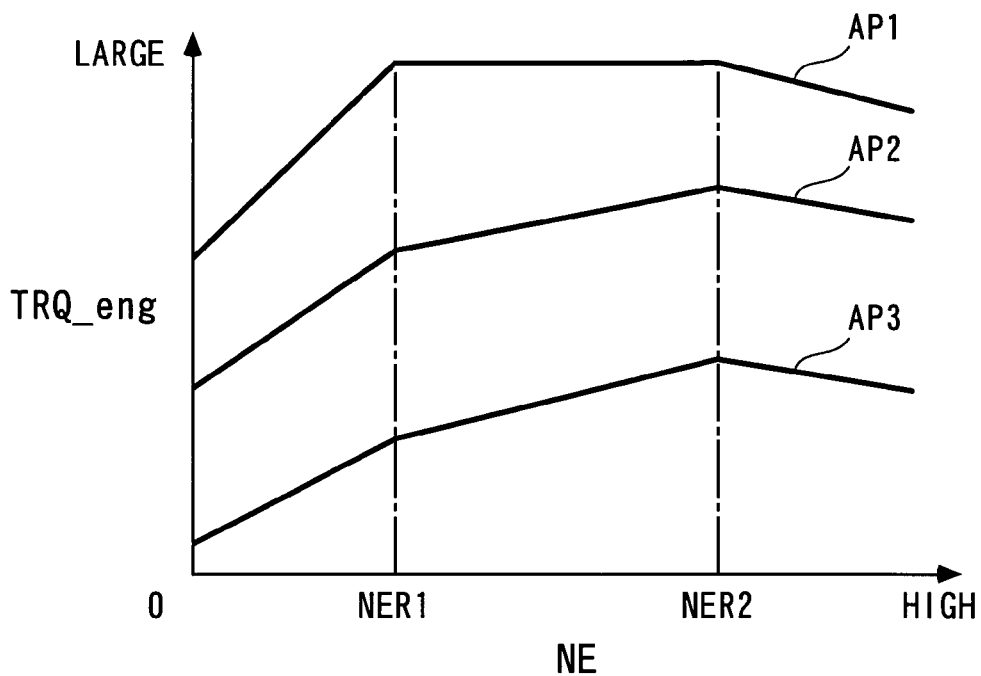
FIG. 36 is a diagram showing an example of a map for use in calculation of a demanded drive torque TRQ_eng.

If the answer to the question of the step 10 is negative (NO), i.e. if the variable intake valve actuation assembly 40, the variable exhaust valve actuation assembly 90, and the throttle valve mechanism 16 are all normal, the program proceeds to a step 11, wherein the demanded drive torque TRQ_eng (parameter indicative of load) is calculated according to the engine speed NE and the accelerator pedal opening AP by searching a map shown in FIG. 36.

The predetermined values AP1 to AP3 of the accelerator pedal opening AP in FIG. 36 are set such that they have a relationship of AP1>AP2>AP3, and the predetermined value AP1 is set to the maximum value of the accelerator pedal opening AP, i.e. the maximum stepped-on amount of the accelerator pedal. As shown in FIG. 36, in the map, the demanded drive torque TRQ_eng is set to a larger value within a range of NE≦NER2 (predetermined value), as the engine speed NE is higher and as the accelerator pedal opening AP is larger. This is because the demanded engine torque is larger as the load on the engine 3 is higher. It should be noted that when AP=AP1 holds, the demanded drive torque TRQ_eng is set to the maximum value within a range of NER1 (predetermined value)<NE≦NER2. Further, within a range of NER2<NE, the demanded drive torque TRQ_eng is set to a larger value, as the accelerator pedal opening AP is larger, and set to a smaller value as the engine speed NE is higher. This is due to the output characteristic of the engine torque with respect to the engine speed NE.

In a step 12 following the step 11, it is determined whether or not the demanded drive torque TRQ_eng calculated in the step 11 is smaller than a predetermined stratified combustion operation threshold value TRQ_disc. It should be noted that the term "stratified combustion operation" is intended to mean operation in which fuel injection into each cylinder from the main fuel injection valve 4 is performed during the compression stroke of the piston to thereby cause stratified combustion of the mixture.

If the answer to the question of the step 12 is affirmative (YES), i.e. if the stratified combustion operation should be effected, the program proceeds to a step 13, wherein a target air-fuel ratio KCMD_disc for the stratified combustion operation is calculated by searching a table, not shown, according to the demanded drive torque TRQ_eng. In this table, the target air-fuel ratio KCMD_disc for the stratified combustion operation is set to a value within a predetermined very lean region (e.g. A/F=30 to 40).

Then, the program proceeds to a step 14, wherein the target air-fuel ratio KCMD is set to the target air-fuel ratio KCMD_disc for the stratified combustion operation. After that, the program proceeds to a step 15, wherein the main fuel injection ratio Rt_Pre as the first fuel injection ratio is set to a predetermined maximum value Rtmax (100%). This causes fuel injection from the auxiliary fuel injection valve 15 to be stopped, as described hereinafter. Then, the program proceeds to a step 16, wherein the cylinder intake air amount Gcyl and the target intake air amount Gcyl_cmd are calculated.

Figure 37:
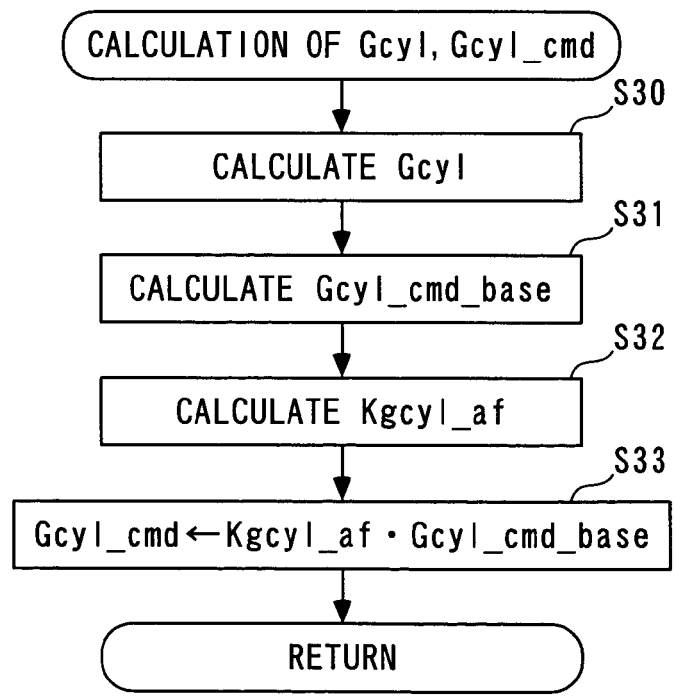
FIG. 37 is a flowchart showing a subroutine for carrying out a process for calculating the cylinder intake air amount Gcyl and a target intake air amount Gcyl_cmd.

The cylinder intake air amount Gcyl and the target intake air amount Gcyl_cmd are calculated specifically by a program shown in FIG. 37. That is, first, in a step 30 in FIG. 37, the cylinder intake air amount Gcyl is calculated by the above-mentioned equation (1).

Figure 38:
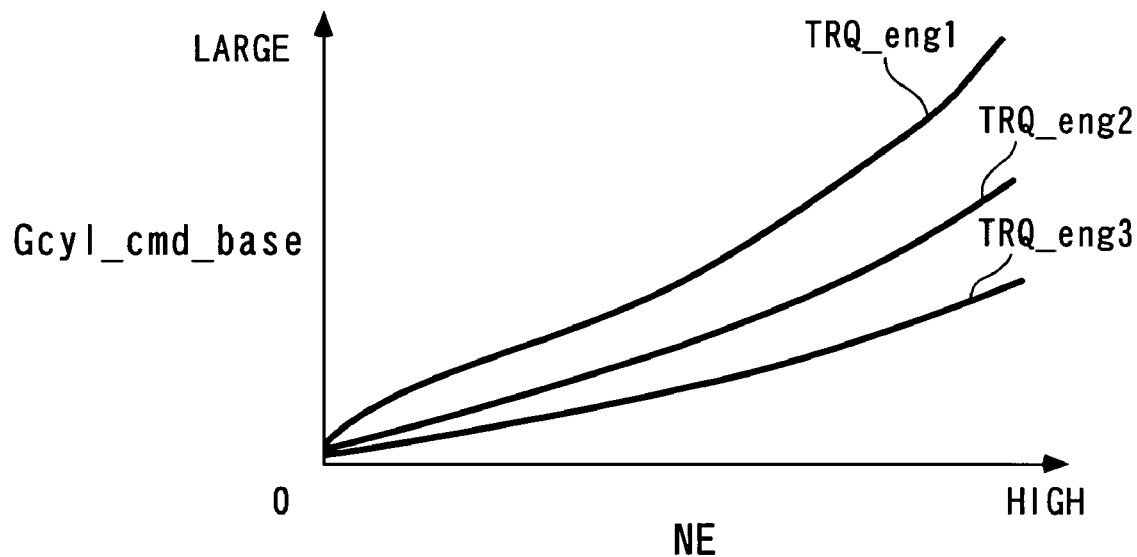
FIG. 38 is a diagram showing an example of a map for use in calculation of a basic value Gcyl_cmd_base of the target intake air amount.

Then, in a step 31, a basic value Gcyl_cmd_base of the target intake air amount is calculated according to the engine speed NE and the demanded drive torque TRQ_eng, by searching a map shown in FIG. 38. It should be noted that predetermined values TRQ_eng 1 to TRQ_eng 3 of the demanded drive torque in this map are set such that they have a relationship of TRQ_eng 1>TRQ_eng 2>TRQ_eng 3. As shown in FIG. 38, the basic value Gcyl_cmd_base of the target intake air amount is set to a larger value, as the engine speed NE is higher, or the demanded drive torque TRQ_eng is larger. This is because as the load on the engine 3 is higher, a larger output of the engine is demanded, which demands a larger intake air amount.

Figure 39:
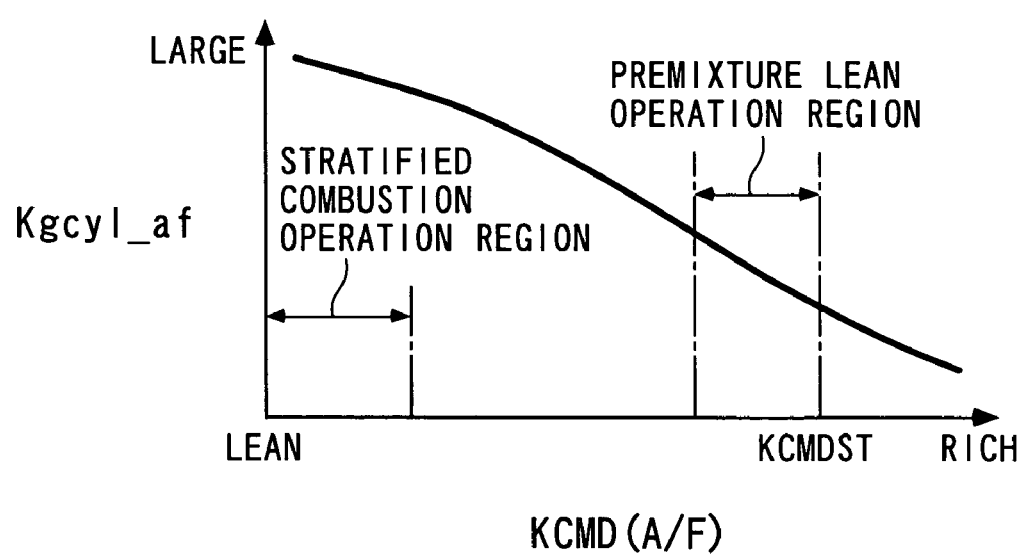
FIG. 39 is a diagram showing an example of a table for use in calculation of an air-fuel ratio correction coefficient Kgcyl_af.

Then, in a step 32, an air-fuel ratio correction coefficient Kgcyl_af is calculated according to the target air-fuel ratio KCMD, by searching a table shown in FIG. 39. In this table, the air-fuel ratio correction coefficient Kgcyl_af is set to a smaller value, as the target air-fuel ratio KCMD is a richer value. This is because the required intake air amount becomes smaller as the air-fuel ratio of the mixture is controlled to be richer. It should be noted that a value KCMDST in FIG. 39 corresponds to a stoichiometric air-fuel ratio.

Next, the program proceeds to a step 33, wherein the product (Kgcyl_af·Gcyl_cmd_base) of the basic value of the target intake air amount and the air-fuel ratio correction coefficient is set to the target intake air amount Gcyl_cmd, followed by terminating the present program.

Referring again to FIG. 35, after execution of the step 16 as described above, the program proceeds to a step 17, wherein a fuel injection control process is carried out. This process is for calculating control inputs to the main and auxiliary fuel injection valves 4 and 15, in the following manner:

First, the main fuel injection amount TOUT_main, which is the fuel injection amount of the main fuel injection valve 4 and the auxiliary fuel injection amount Tout_sub, which is the fuel injection amount of the auxiliary fuel injection valve 15, are calculated. More specifically, a final cylinder-by-cylinder total fuel injection amount TOUT is calculated for each cylinder based on the operating conditions of the engine 3 and the target air-fuel ratio KCMD described above, and then the main and auxiliary fuel injection amounts TOUT_main and Tout_sub are calculated, respectively, by the following equations (42) and (43):

$$TOUT\_main = [TOUT \cdot Rt\_Pre]/100 \quad (42)$$

$$TOUT\_sub = [TOUT \cdot (100 - Rt\_Pre)]/100 \quad (43)$$

Referring to the equation (43), when Rt_Pre=Rtmax(100 (%)) holds, the second fuel injection ratio [(100–Rt_Pre/100) of the amount of fuel to be injected by the auxiliary fuel injection valve 15 is equal to a value of 0, in other words, TOUT_sub=0 holds, from which it is understood that the fuel injection from the auxiliary fuel injection valve 15 is stopped.

Then, the control inputs to the main and auxiliary fuel injection valves 4 and 15 are calculated according to the main and auxiliary fuel injection amounts TOUT_main and Tout_sub, by searching respective tables, not shown. After execution of the step 17 as described above, the present program is terminated.

On the other hand, if the answer to the question of the step 12 is negative (NO), it is judged that the engine 3 should be operated not in a stratified combustion operation mode but in a premixture lean operation mode as one of homogeneous combustion operation modes, and the program proceeds to a step 18, wherein a target air-fuel ratio KCMD_lean for the premixture lean operation is calculated according to the demanded drive torque TRQ_eng by searching a table, not shown. It should be noted that in this table, the target air-fuel ratio KCMD_lean for the premixture lean operation is set to a value within a predetermined lean region (e.g. A/F=18 to 21).

Next, the program proceeds to a step 19, wherein the target air-fuel ratio KCMD is set to the target air-fuel ratio KCMD_lean for the premixture lean operation. Then, in a step 20, the main fuel injection ratio Rt_Pre is calculated according to the demanded drive torque TRQ_eng by searching a table shown in FIG. 40. In the following tables and maps including the map in FIG. 40, predetermined values TRQ_idle, TRQ_disc, TRQott, and TRQ1 to TRQ4, of the demanded drive torque TRQ_eng are set such that they have a relationship of TRQ_idle<TRQ_disc<TRQ1<TRQott<TRQ2<TRQ3<TRQ4. Further, TRQ_idle represents a predetermined value (value defining a first predetermed load region) for idling operation of the engine 3. Further, the predetermined value TRQ2 corresponds to predetermined load mentioned in appended claims.

Figure 40:
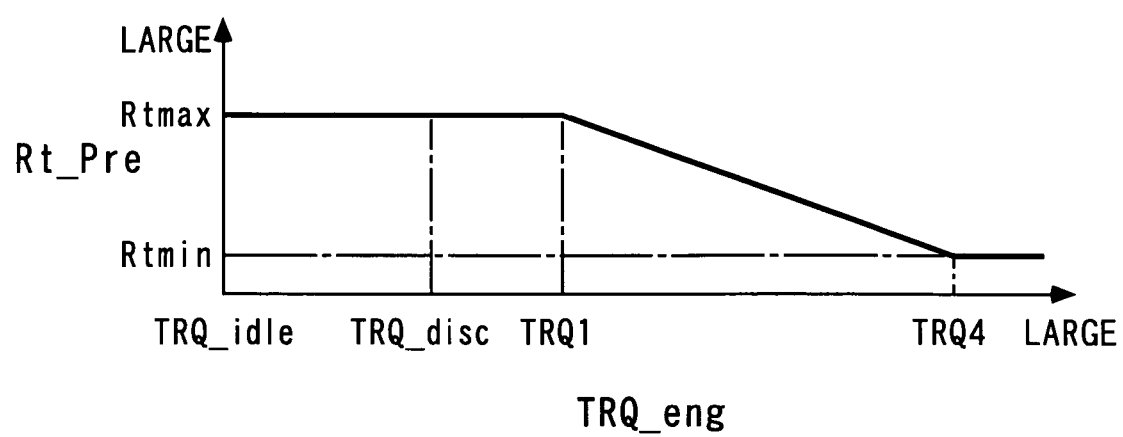
FIG. 40 is a diagram showing an example of a table for use in calculation of a main fuel injection ratio Rt_Pre.

As shown in FIG. 40, in the table, within a range of TRQ1<TRQ_eng<TRQ4, the main fuel injection ratio Rt_Pre is set to a smaller value as the demanded drive torque TRQ_eng is larger. This is for the following reason: As the demanded drive torque TRQ_eng is larger, the boost pressure Pc is controlled to be higher, which causes a rise in the temperature of the intake air, so that knocking in the engine 3 becomes liable to occur. Therefore, to prevent occurrence of such knocking, it is necessary to increase the effect of cooling the intake air by the fuel evaporation cooling device 12 by increasing the fuel injection amount Tout_sub of the auxiliary fuel injection valve 15. Hence, the main fuel injection ratio Rt_Pre is set as above.

Further, in the table, the main fuel injection ratio Rt_Pre is set to a predetermined minimum value Rtmin(10(%)), in a range where the demanded drive torque TRQ_eng is not smaller than the predetermined value TRQ4, and set to the predetermined maximum value Rtmax in a range where the demanded drive torque TRQ_eng is not larger than the predetermined value TRQ1.

After execution of the step 20, the steps 16 and 17 are carried out, followed by terminating the present program.

On the other hand, if the answer to the question of the step 10 is affirmative (YES), i.e. if any of the variable intake valve actuation assembly 40, the variable exhaust valve actuation assembly 90, and the throttle valve mechanism 16 is faulty, the program proceeds to a step 21, wherein the demanded drive torque TRQ_eng is set to a predetermined value TRQ_fs for a failure time. After that, the program proceeds to a step 22, wherein the main fuel injection ratio Rt_Pre is set to the aforementioned maximum value Rtmax. Then, the steps 16 and 17 are carried out as described hereinabove, followed by terminating the present program.

Figure 41:
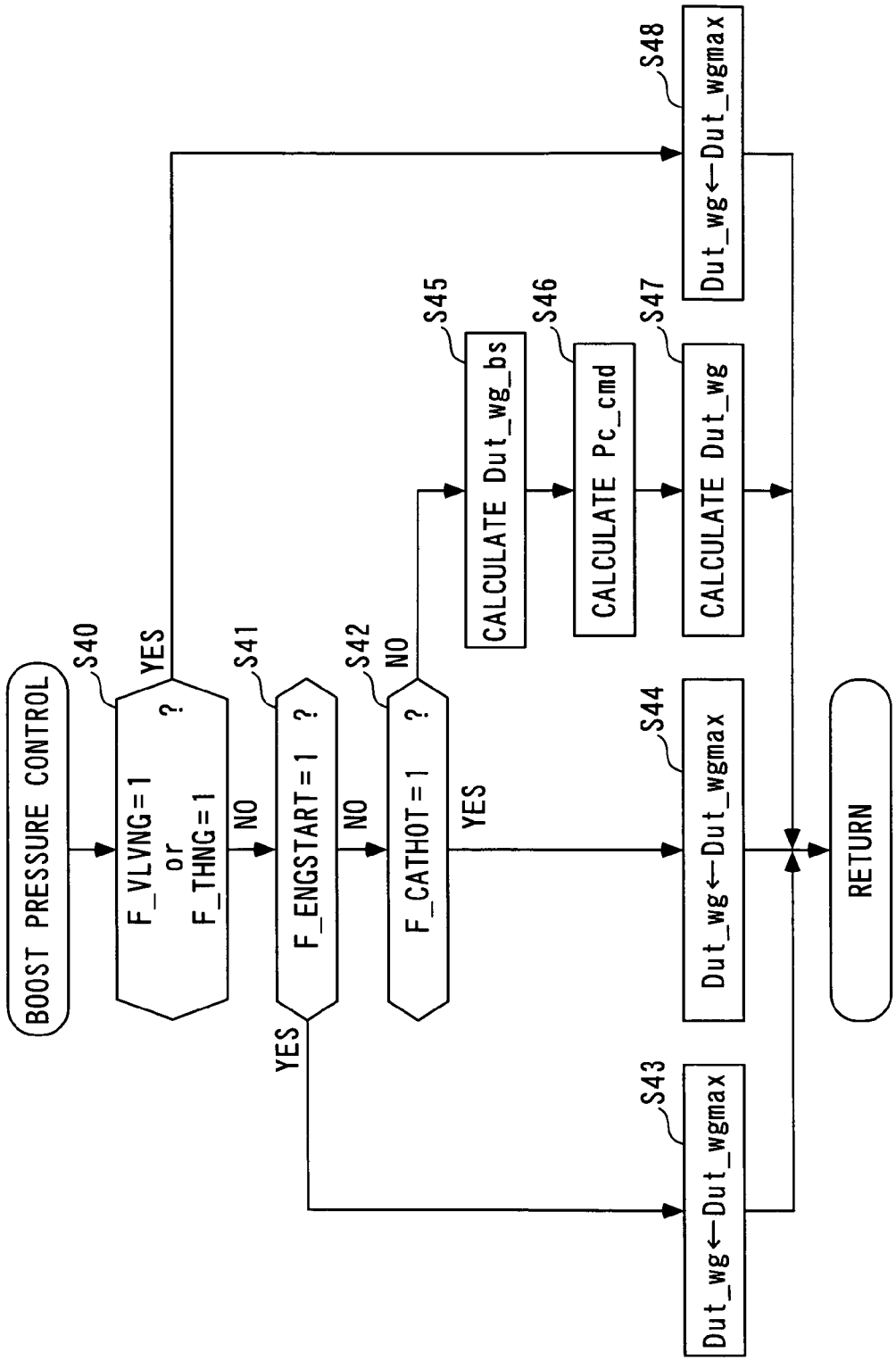
FIG. 41 is a flowchart showing a subroutine for carrying out a boost pressure control process.

Next, the boost pressure control process will be described with reference to FIG. 41. As shown in FIG. 41, in the program for this process, first, it is determined in a step 40 whether or not the intake/exhaust valve failure flag F_VLVNG or the throttle valve failure flag F_THNG is equal to 1.

If the answer to the above question is negative (NO), i.e. if the variable intake valve actuation assembly 40, the variable exhaust valve actuation assembly 90, and the throttle valve mechanism 16 are all normal, the program proceeds to a step 41, wherein it is determined whether or not an engine start flag F_ENGSTART is equal to 1. The engine start flag F_ENGSTART is set by determining in a determination process, not shown, from the engine speed NE and the output of the IG•SW 36 whether or not the engine is in starting operation, i.e. cranking of the engine 3 is being executed. More specifically, when the engine is in starting operation, the engine start flag F_ENGSTART is set to 1, and otherwise set to 0.

If the answer to the question of the step 41 is affirmative (YES), i.e. if the engine is in starting operation, the program proceeds to a step 43, wherein the control input Dut_wg to the wastegate valve 10d is set to a predetermined fully-opening value Dut_wgmax, followed by terminating the present program. As a result, the wastegate valve 10d is controlled to a fully-open state, whereby the supercharging operation by the turbocharger device 10 is substantially stopped.

On the other hand, when the answer to the question of the step 41 is negative (NO), i.e. if the engine is not in starting operation, the program proceeds to a step 42, wherein it is determined whether or not a catalyst warmup flag F_CATHOT is equal to 1. The catalyst warmup flag F_CATHOT is set to 1 when the catalyst warmup control is being executed after the start of the engine, and otherwise to 0. The catalyst warmup control is for rapidly activating the catalyst after the start of the engine, and is started immediately after termination of starting (cranking) of the engine. When an execution time period Tcat for measuring duration of the catalyst warmup control reaches a predetermined value, the catalyst warmup control is terminated and at the same time the catalyst warmup flag F_CATHOT is set to 0.

If the answer to the question of the step 42 is affirmative (YES), i.e. if during the catalyst warmup control, the program proceeds to a step 44, and similarly to the step 43, the control input Dut_wg to the wastegate valve 10d is set to the aforementioned fully-opening value Dut_wgmax, followed by terminating the present program.

Figure 42:
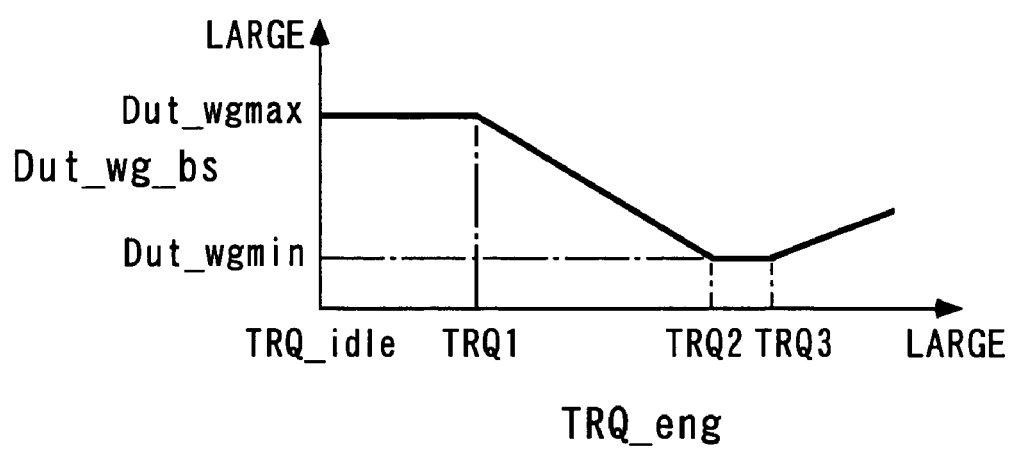
FIG. 42 is a diagram showing an example of a table for use in calculation of a basic value Dut_wg_base of a control input to a wastegate valve.

On the other hand, if the answer to the question of the step 42 is negative (NO), i.e. if neither the engine is in starting operation nor the catalyst warmup control is being executed, the program proceeds to a step 45, wherein a basic value DUT_wg_bs of the control input Dut_wg is calculated according to the demanded drive torque TRQ_eng by searching a table shown in FIG. 42.

As shown in FIG. 42, in this table, within a range of TRQ1<TRQ_eng<TRQ2, the basic value Dut_wg_bs is set to a smaller value, as the demanded drive torque TRQ_eng is larger. This is because to increase the charging efficiency by the supercharging operation, it is required to make the boost pressure Pc higher as the demanded drive torque TRQ_eng is larger. Further, within a range of TRQ2≦TRQ_eng≦TRQ3, the basic value DUT_wg bs is set to a predetermined fully-closing value Dut_wgmin. This is to attain a maximum supercharging effect dependent on engine load in a high-load region. Further, within a range of TRQ3<TRQ_eng, the basic value DUT_wg_bs is set to a smaller value as the demanded drive torque TRQ_eng is larger. This is to prevent occurrence of knocking in the engine 3.

Figure 43:
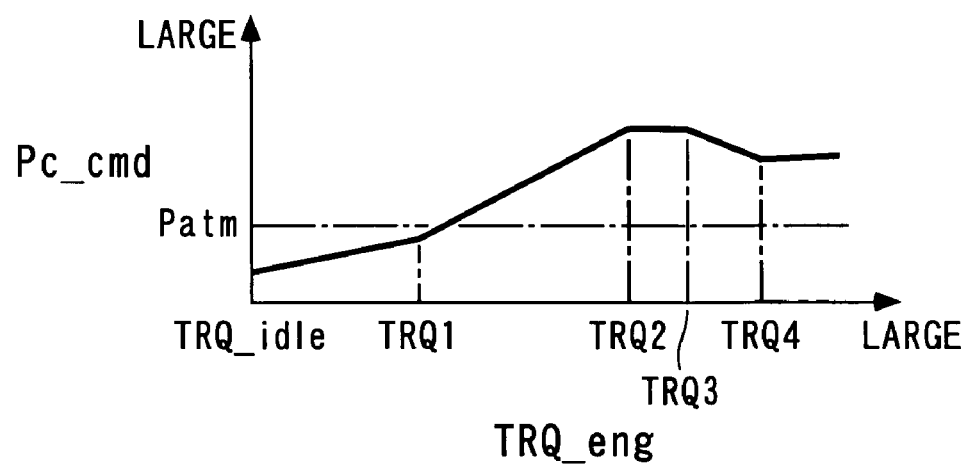
FIG. 43 is a diagram showing an example of a table for use in calculation of a target boost pressure Pc_cmd.

Next, in a step 46, a target boost pressure Pc_cmd is calculated according to the demanded drive torque TRQ_eng, by searching a table shown in FIG. 43. As shown in FIG. 43, in this table, within a range of TRQ_idle<TRQ_eng<TRQ2, the target boost pressure Pc_cmd is set to a larger value as the demanded drive torque TRQ_eng is larger. This is to increase the charging efficiency by the supercharging operation, as described above. Further, within a range of TRQ2≦TRQ_eng≦TRQ3, the target boost pressure Pc_cmd is set to a predetermined value. This is to attain the maximum supercharging effect, as described hereinabove. Furthermore, within a range of TRQ3<TRQ_eng<TRQ4, the target boost pressure Pc_cmd is set to a smaller value as the demanded drive torque TRQ_eng is larger. This is to prevent occurrence of knocking in the engine 3. The symbol Patm in FIG. 43 represents atmospheric pressure. The same applies to FIG. 44 et. seq., referred to hereinafter.

Next, the program proceeds to a step 47, wherein the control input Dut_wg is calculated with an I-P control algorithm expressed by the following equation (44), followed by terminating the present program. Thus, the boost pressure Pc is feedback controlled such that it converges to the target boost pressure Pc_cmd.

$$Dut\_wg = Dut\_wg\_bs + Kpwg \cdot Pc + Kiwg \cdot \Sigma(Pc - Pc\_cmd) \quad (44)$$

wherein, Kpwg represents a P term gain, and Kiwg an I term gain.

On the other hand, if the answer to the question of the step 40 is affirmative (YES), i.e. if any of the variable intake valve actuation assembly 40, the variable exhaust valve actuation assembly 90, and the throttle valve mechanism 16 is faulty, the program proceeds to a step 48, wherein similarly to the steps 43 and 44 described above, the control input Dut_wg to the wastegate valve 10d is set to the fully-opening value Dut_wgmax, followed by terminating the present program.

Next, the aforementioned intake valve control process in the step 3 will be described with reference to FIGS. 44 and 45. As shown in FIG. 44, in the program for this process, first, it is determined in a step 60 whether or not the intake/exhaust valve failure flag F_VLVNG is equal to 1. If the answer to this question is negative (NO), i.e. if the variable intake valve actuation assembly 40 and the variable exhaust valve actuation assembly 90 are both normal, the program proceeds to a step 61, wherein it is determined whether or not the engine start flag F_ENGSTART is equal to 1.

If the answer to this question is affirmative (YES), i.e. if the engine is in starting operation, the program proceeds to a step 62, wherein a target main intake cam phase θmi_cmd, which is a target value of the main intake cam phase θmi, is set to a predetermined idling value θmi_idle for idling of the engine 3.

Then, the program proceeds to a step 63, wherein the target auxiliary intake cam phase θmsi_cmd is set to a predetermined start value θmsi_st for starting of the engine 3. The predetermined start value θmsi_st is set as a predetermined value for the retarded closing of the intake valve 6.

After that, the program proceeds to a step 64, wherein the target inter-intake cam phases θssi#i_cmd (#i=#2 to #4) are all set to 0.

Next, the program proceeds to a step 65 in FIG. 45, wherein the control input DUTY_ml to the variable main intake cam phase mechanism 60 is calculated according to the target main intake cam phase θmi_cmd by searching a table, not shown. Thereafter, in the following step 66, the control input DUTY_msi to the variable auxiliary intake cam phase mechanism 70 is calculated according to the target auxiliary intake cam phase θmsi_cmd by searching a table, not shown. It should be noted that in the step 66, the control input DUTY_msi may be calculated by the same method as employed in a step 74 referred to hereinafter.

Then, in a step 67, the control inputs DUTY_ssi#i to the variable inter-intake cam phase mechanisms 80 are calculated according to the target inter-intake cam phases θssi#i_cmd by searching a table, not shown, followed by terminating the present program.

Referring again to FIG. 44, if the answer to the question of the step 61 is negative (NO), i.e. if engine is not in starting operation, the program proceeds to a step 68, wherein it is determined whether or not the above-mentioned catalyst warmup flag F_CATHOT is equal to 1. If the answer to the question is affirmative (YES), i.e. if the catalyst warmup control is being executed the program proceeds to a step 69, wherein the target main intake cam phase θmi_cmd is set to the predetermined idling value θmi_idle mentioned above.

Figure 46:
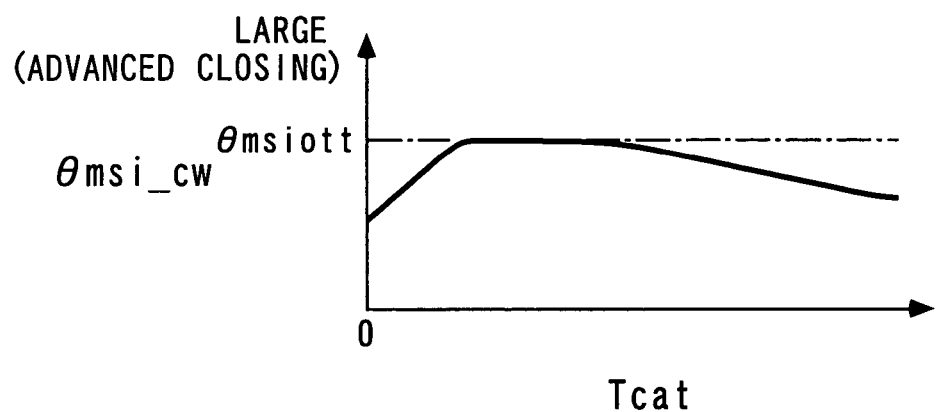
FIG. 46 is a diagram showing an example of a table for use in calculation of a catalyst warmup value θmsi_cw of a target auxiliary intake cam phase.

Then, the program proceeds to a step 70, wherein a catalyst warmup value θmsi_cw of the target auxiliary intake cam phase is calculated according to the execution time period Tcat for the catalyst warmup control by searching a table shown in FIG. 46. In this figure, the symbol θmsiott (value corresponding to predetermined timing) represents an Otto phase value (=a cam angle of 90 degrees) of the auxiliary intake cam phase θmsi, which causes the valve timing of the intake valve 6 to coincide with that of the intake valve driven by the Otto intake cam. The same applies to the following description.

Then, in a step 71, the target auxiliary intake cam phase θmsi_cmd is set to the catalyst warmup value θmsi_cw, whereafter in a step 72, the target inter-intake cam phases θssi#i_cmd (#i=#2 to #4) are all set to 0, similarly to the step 64 described above.

Next, the program proceeds to a step 73 in FIG. 45, wherein the control input DUTY_mi to the variable main intake cam phase mechanism 60 is calculated according to the target main intake cam phase θmi_cmd and the main intake cam phase θmi. This control input DUTY_mi is calculated with the same algorithm as the aforementioned control algorithm of the second SPAS controller 225.

Then, in a step 74, with the control algorithm of the second SPAS controller 225, the control input DUTY_msi to the variable auxiliary intake cam phase mechanism 70 is calculated. More specifically, the control input DUTY_msi is calculated with the prediction algorithm expressed by the equation (29), the identification algorithm expressed by the equations (30) to (35), and the sliding mode control algorithm expressed by the equations (36) to (41).

Next, in a step 75, the control inputs DUTY_ssi#i (#i=#2 to #4) to the variable inter-intake cam phase mechanisms 80 are calculated according to the target inter-intake cam phases θssi#i_cmd calculated in the step 72 and the inter-intake cam phase θssi#i, followed by terminating the present program. The control inputs DUTY_ssi#i are calculated with the same algorithm as used for calculation of the control input DUTY_msi.

Figure 47:
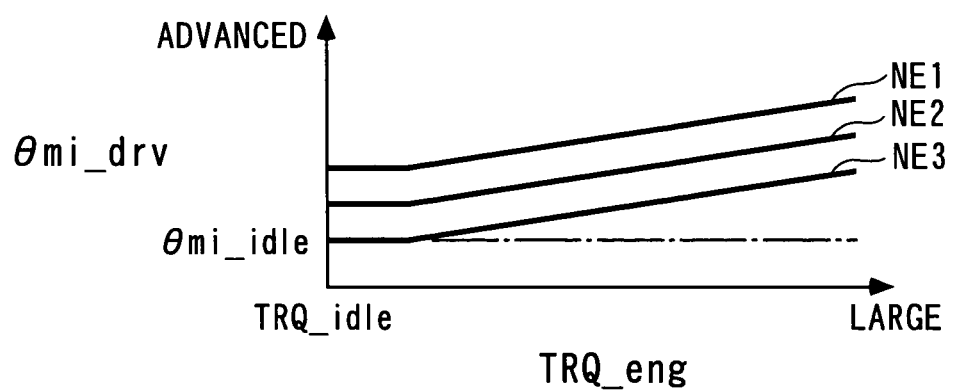
FIG. 47 is a diagram showing an example of a table for use in calculation of a normal operation value θmi_drv of a target main intake cam phase.

Referring again to FIG. 44, if the answer to the question of the step 68 is negative (NO), i.e. if the engine is not in starting operation, and at the same time the catalyst warmup control is not being executed, the program proceeds to a step 76, wherein a normal operation value θmi_drv of the target intake cam phase is calculated according to the demanded drive torque TRQ_eng and the engine speed NE by searching a map shown in FIG. 47.

In FIG. 47, predetermined values NE1 to NE3 of the engine speed NE are set such that they have a relationship of NE1>NE2>NE3. The same applies to the following description. In this map, the normal operation value θmi_drv is set to a more advanced value as the demanded drive torque TRQ_eng is larger or the engine speed NE is higher. This is to properly secure the output of the engine 3, by advancing the main intake cam phase θmi and thereby advancing the opening/closing timing of the intake valve 6 as the load on the engine is higher.

Then, in a step 77, the target main intake cam phase θmi_cmd is set to the normal operation value θmi_drv. After that, the program proceeds to a step 78, wherein the above-described basic value θmsi_base (value corresponding to target valve-closing timing) of the auxiliary intake cam phase θmsi is calculated according to the demanded drive torque TRQ_eng by searching a table shown in FIG. 48.

Figure 48:
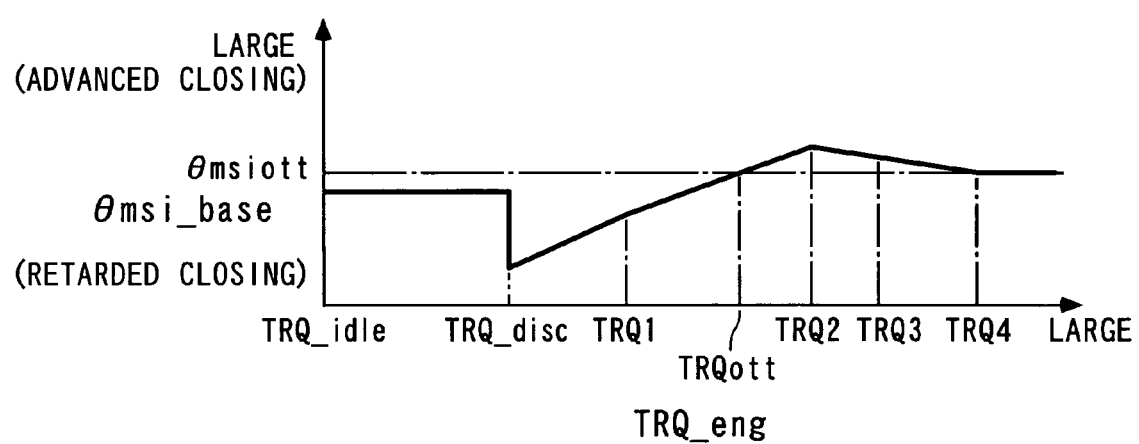
FIG. 48 is a diagram showing an example of a map for use in calculation of a basic value θmsi_base of a target auxiliary intake cam phase.

As shown in FIG. 48, in this table, the basic value θmsi_base is set to a fixed value on the retarded-closing side, within a range of TRQ_eng<TRQ_disc, i.e. in a stratified combustion operating region of the engine 3. This is to stabilize the combustion state in such a low-load region where the stratified combustion operation is carried out. Further, the basic value θmsi_base is set such that within a range of TRQ_disc≦TRQ_eng≦TRQott, the degree of the retarded closing of the intake valve 6 becomes smaller as the demanded drive torque TRQ_eng is larger. This is to avoid an increase in the amount of blowback of fuel into the intake manifold, which is caused according to the degree of retarded closing of the intake valve 6, as the demanded drive torque TRQ_eng is larger. Further, when TRQ_eng=TRQott (threshold value of the first and second predetermined load regions) holds, the basic value θmsi_base is set to the Otto phase value θmsiott (value corresponding to the predetermined timing).

Further, the basic value θmsi_base is set such that within a range of TRQott<TRQ_eng<TRQ2, the degree of advanced closing of the intake valve 6 becomes larger as the demanded drive torque TRQ_eng is larger. This is to increase combustion efficiency by high expansion-ratio cycle operation.

Further, the basic value θmsi_base is set such that within a range of TRQ2≦TRQ_eng<TRQ4, the degree of advanced closing of the intake valve 6 becomes smaller as the demanded drive torque TRQ_eng is larger. This is for the following reason: In such a high-load region as in the range of TRQ2≦TRQ_eng<TRQ4, the supercharging operation is limited so as to prevent occurrence of knocking in the engine 3, as described hereinafter, so that if the degree of advanced closing of the intake valve 6 is controlled to be large in a state of the charging efficiency being reduced by the limitation of the supercharging operation, torque generated by the engine 3 is decreased. Therefore, to compensate for the decrease in the torque generated by the engine 3, the basic value θmsi_base is set such that the degree of advanced closing of the intake valve 6 becomes smaller, as the demanded drive torque TRQ_eng is larger.

In a step 79 following the step 78, the target auxiliary intake cam phase θmsi_cmd is calculated with the aforementioned control algorithm of the first SPAS controller 221. More specifically, the target auxiliary intake cam phase θmsi_cmd is calculated with the prediction algorithm expressed by the equation (7), the identification algorithm expressed by the equations (8) to (13), and the sliding mode control algorithm expressed by the equations (15) to (21).

Then, in a step 80, the target inter-intake cam phases θssi#i_cmd (#i=#2 to #4) are calculated with the control algorithm of the inter-intake cam phase controller 230 described above. Then, the steps 73 to 75 in FIG. 45 are carried out, as described hereinbefore, followed by terminating the present program.

Referring again to FIG. 44, if the answer to the question of the step 60 is affirmative (YES), i.e. if the variable intake valve actuation assembly 40 or the variable exhaust valve actuation assembly 90 is faulty, the program proceeds to a step 81, wherein the target main intake cam phase θmi_cmd is set to the predetermined idling value θmi_idle. Then, the program proceeds to a step 82, wherein the target auxiliary intake cam phase θmsi_cmd is set to a predetermined failsafe value θmsi_fs.

Then, the program proceeds to a step 83, wherein similarly to the steps 64 and 72, the target inter-intake cam phases θssi#i_cmd (#i=#2 to #4) are all set to 0. After that, as described above, the steps 65 to 67 in FIG. 45 are carried out, followed by terminating the present program.

Figure 49:
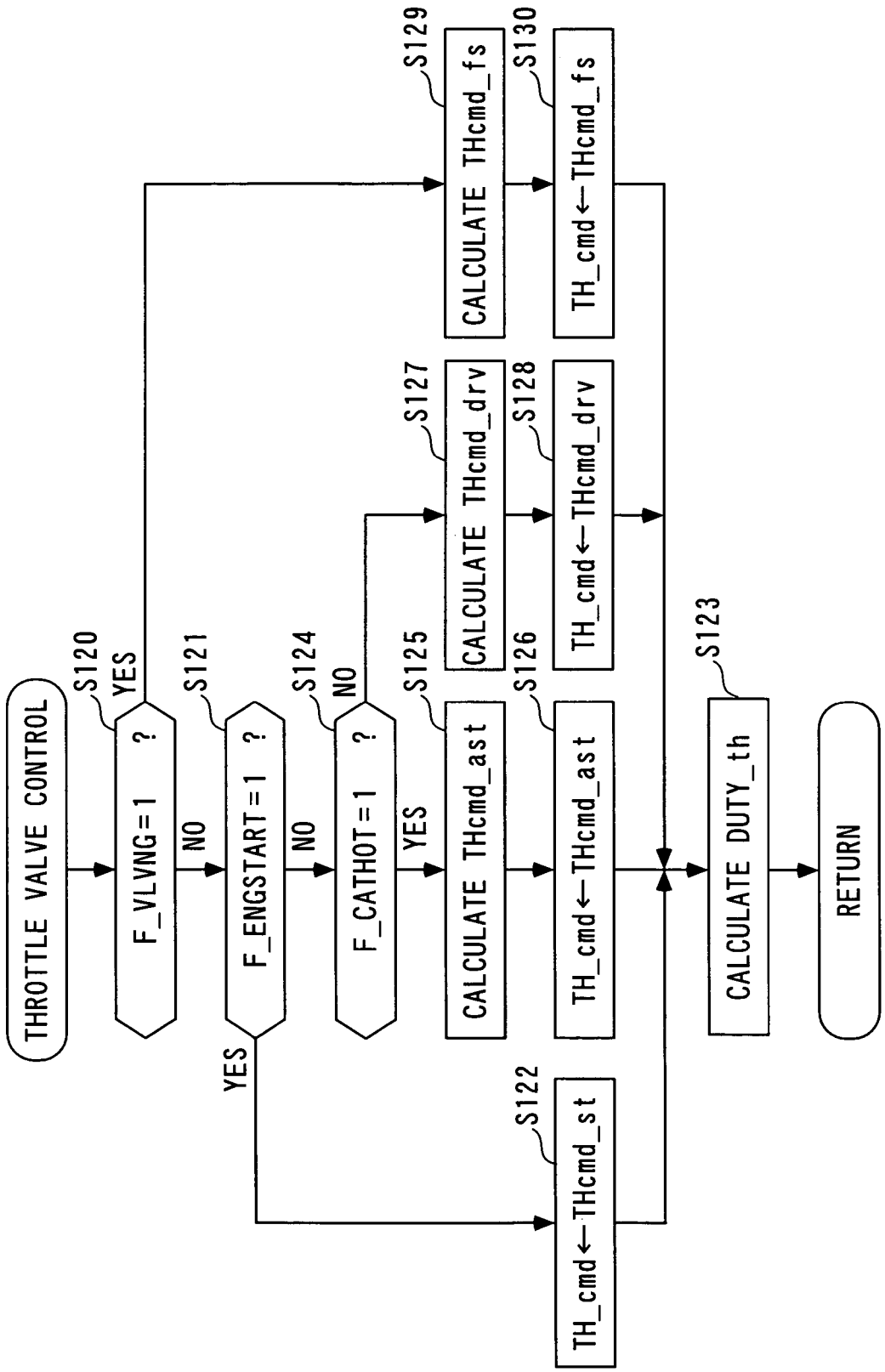
FIG. 49 is a flowchart showing a subroutine for carrying out a throttle valve control process.

Next, the above-mentioned throttle valve control process in the step 5 will be described with reference to FIG. 49. As shown in FIG. 49, in the program of this process, first, it is determined in a step 120 whether or not the intake/exhaust valve failure flag F_VLVNG is equal to 1. If the answer to this question is negative (NO), i.e. if the variable intake valve actuation assembly 40 and the variable exhaust valve actuation assembly 90 are both normal, the program proceeds to a step 121, wherein it is determined whether or not the engine start flag F_ENGSTART is equal to 1.

If the answer to this question is affirmative (YES), i.e. if the engine is in starting operation, the program proceeds to a step 122, wherein the target opening degree TH_cmd is set to a predetermined start value THcmd_st. This predetermined start value THcmd_st is set to a value slightly larger than an idling value THcmd_idle, referred to hereinafter. Then, the program proceeds to a step 123, wherein the control input DUTY_th to the throttle valve mechanism 16 is calculated, followed by terminating the present program. The control input DUTY_th is specifically calculated according to the target opening degree TH_cmd by searching a table, not shown.

On the other hand, if the answer to the question of the step 121 is negative (NO), i.e. if the engine is not in starting operation, the program proceeds to a step 124, wherein it is determined whether or not the above-mentioned catalyst warmup flag F_CATHOT is equal to 1. If the answer to the question is affirmative (YES), i.e. if the catalyst warmup control is being executed, the program proceeds to a step 125, wherein a catalyst warmup value THcmd_ast of the target opening degree is calculated according to the above-mentioned execution time period Tcat for the catalyst warmup control, by searching a table shown in FIG. 50.

Figure 50:
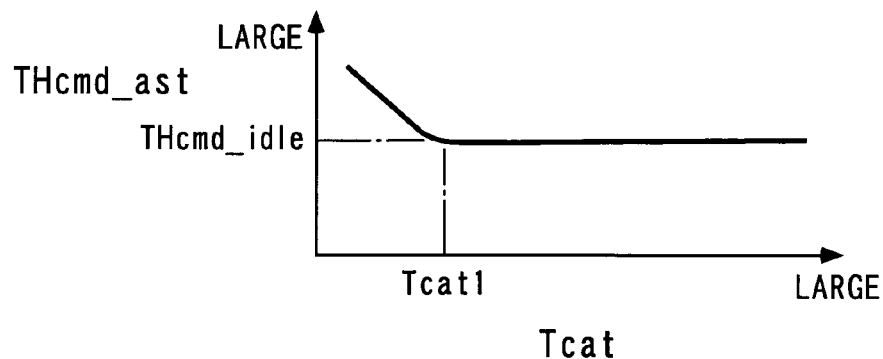
FIG. 50 is a diagram showing an example of a table for use in calculation of a catalyst warmup value THcmd_ast of a target opening degree.

In FIG. 50, the symbol THcmd_idle represents an idling value used for idling of the engine 3. As shown in FIG. 50, in this table, the catalyst warmup value THcmd_ast is set to a larger value as the execution time period Tcat is shorter, before the execution time period Tcat reaches a predetermined value Tcat1, whereas after the execution time period Tcat has reached the predetermined value Tcat1, the catalyst warmup value THcmd_ast is set to the idling value THcmd_idle.

Then, the program proceeds to a step 126, wherein the target opening degree TH_cmd is set to the catalyst warmup value THcmd_ast. Then, the step 123 is carried out, as described above, followed by terminating the present program.

Figure 51:
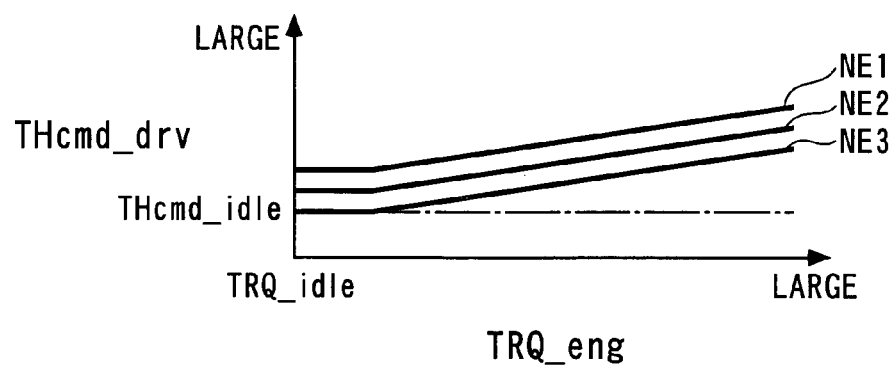
FIG. 51 is a diagram showing an example of a map for use in calculation of a normal operation value THcmd_drv of the target opening degree.

On the other hand, if the answer to the question of the step 124 is negative (NO), i.e. if the engine is not in starting operation, and at the same time if the catalyst warmup control is not being executed, the program proceeds to a step 127, wherein a normal operation value THcmd_drv of the target opening degree is calculated according to the demanded drive torque TRQ_eng and the engine speed NE by searching a map shown in FIG. 51.

As shown in FIG. 51, in this map, the normal operation value THcmd_drv is set to a larger value, as the demanded drive torque TRQ_eng is larger or the engine speed NE is higher. This is because as the load on the engine 3 is higher, a larger amount of intake air is required to secure a larger output of the engine.

Then, in a step 128, the target opening degree TH_cmd is set to the normal operation value THcmd_drv. Thereafter, the step 123 is carried out, as described above, followed by terminating the present program.

Figure 52:
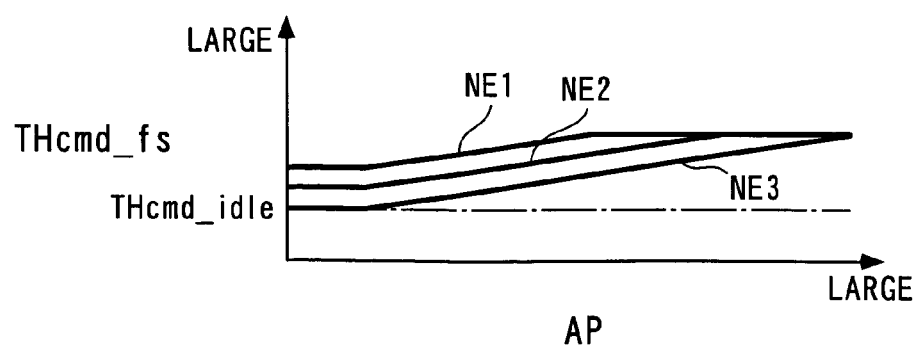
FIG. 52 is a diagram showing an example of a map for use in calculation of a failsafe value THcmd_fs of the target opening degree.

On the other hand, if the answer to the question of the step 120 is affirmative (YES), i.e. if the variable intake valve actuation assembly 40 or the variable exhaust valve actuation assembly 90 is faulty, the program proceeds to a step 129, wherein a failsafe value THcmd_fs of the target opening degree is calculated according to the accelerator pedal opening AP and the engine speed NE by searching a map shown in FIG. 52. As shown in FIG. 52, in this map, the failsafe value THcmd_fs is set to a larger value as the accelerator pedal opening AP is larger or as the engine speed NE is higher. This is for the same reason as described above as to the calculation of the normal operation value THcmd_drv.

Next, the program proceeds to a step 130, wherein the target opening degree TH_cmd is set to the failure-time value THcmd_fs. Then, the step 123 is carried out, as described above, followed by terminating the present program.

It should be noted that by the above control processes, each of the control inputs DUTY_mi, DUTY_msi, DUTY_ssi#i, DUTY_me, DUTY_mse, DUTY_sse#i, and DUTY_th is set to one of a pulse signal, a current signal, and a voltage signal, of which the duty ratio is set according to the result of the calculation.

Figure 53:
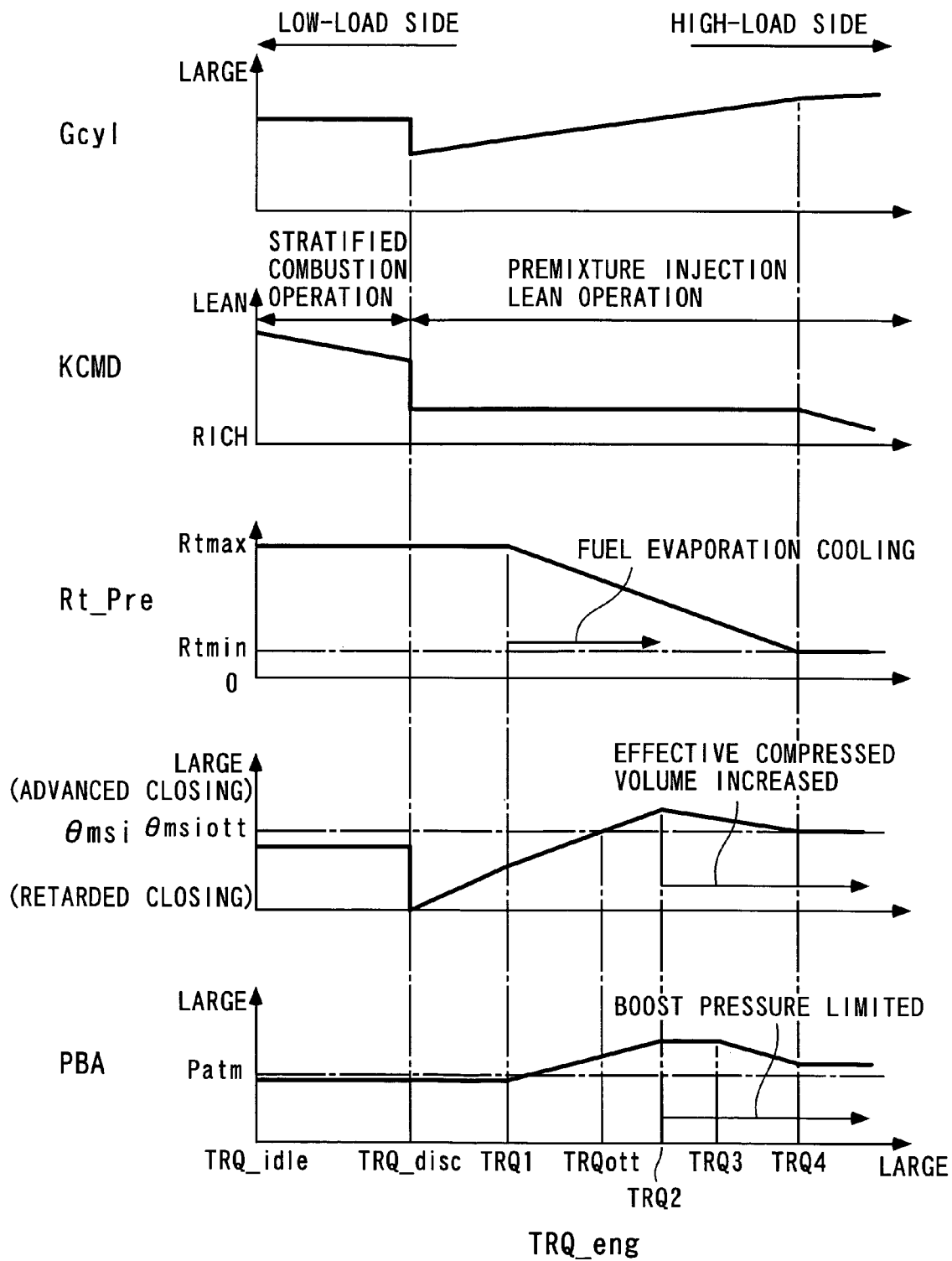
FIG. 53 is a diagram showing an example of operation of the control system executed for control of the engine.

Next, operation of the control system executed for the engine control described above will be described with reference to FIG. 53, for each of the following ranges (L1) to (L6) of the demanded drive torque TRQ_eng.

$$TRQ\_idle \leq TRQ\_eng < TRQ\_disc \quad (L1)$$

In this range, according to the setting of the basic value θmsi_base described above, the auxiliary intake cam phase θmsi is controlled to an approximately fixed value on the retarded-closing side. Further, since the amount of intake air is controlled to a state inhibited from being decreased by the throttle vale 17, the intake pipe absolute pressure PBA is controlled to an approximately fixed value slightly lower then the atmospheric pressure Patm. Further, the cylinder intake air amount Gcyl is controlled to an approximately fixed value. The main fuel injection ratio Rt_Pre is set to the maximum value Rtmax; the target air-fuel ratio KCMD is set to a value within the very lean region mentioned above; and the stratified combustion operation is carried out.

$$TRQ\_disc \leq TRQ\_eng \leq TRQ1 \qquad (L2)$$

In this range, according to the setting of the basic value θmsi_base described above, the auxiliary intake cam phase θmsi is controlled to a value considerably retarded with respect to the value thereof set when the demanded drive torque TRQ_eng is within the above-described range (L1), and at the same time such that the degree of the retarded closing of the intake valve 6 becomes smaller as the demanded drive torque TRQ_eng is larger. Further, the cylinder intake air amount Gcyl is controlled to a value smaller than the value thereof within the range (L1), and at the same time such that it becomes larger as the demanded drive torque TRQ_eng is larger. Furthermore, the target air-fuel ratio KCMD is controlled to hold a value within the lean region mentioned above, which is richer than the values set when the demanded drive torque TRQ_eng is within the range (L1). The intake pipe absolute pressure PBA, and the main fuel injection ratio Rt_Pre are both controlled to hold the values thereof set when the demanded drive torque TRQ_eng is within the range (L1).

$$TRQ1 < TRQ\_eng \leq TRQott \qquad (L3)$$

In this range, according to the setting of the basic value θmsi_base described above, the auxiliary intake cam phase θmsi is controlled such that it has the same tendency as when the demanded drive torque TRQ_eng is within the range (L2). Particularly when TRQ_eng=TRQott holds, the auxiliary intake cam phase θmsi is controlled to the Otto phase value θmsiott, which means that the engine 3 is controlled to Otto cycle operation. Further, the target air-fuel ratio KCMD and the cylinder intake air amount Gcyl as well are controlled such that they have the same tendencies as when the demanded drive torque TRQ_eng is within the range (L2). Furthermore, within this range (L3), the supercharging operation is carried out by the turbocharger device 10, whereby the intake pipe absolute pressure PBA is controlled to a higher value as the demanded drive torque TRQ_eng is larger. Further, the main fuel injection ratio Rt_Pre is controlled to a smaller value as the demanded drive torque TRQ_eng is larger. In other words, as the demanded drive torque TRQ_eng is larger, the fuel injection amount Tout_sub of the auxiliary fuel injection valve 15 is controlled to a larger value. This is to attain the cooling effect by the fuel evaporation cooling device 12.

$$TRQott < TRQ\_eng < TRQ2 \qquad (L4)$$

In this range, the auxiliary intake cam phase θmsi is controlled such that the degree of the advanced closing of the intake valve 6 becomes larger as the demanded drive torque TRQ_eng is larger. This is to increase the combustion efficiency by the high expansion ratio cycle operation, as described hereinbefore. Further, the cylinder intake air amount Gcyl, the target air-fuel ratio KCMD, the main fuel injection ratio Rt_Pre, and the intake pipe absolute pressure PBA are controlled such that they have the same tendencies as when the demanded drive torque TRQ_eng is within the range (L3). Particularly, the intake pipe absolute pressure PBA is controlled, similarly to the above, to a larger value as the demanded drive torque TRQ_eng is larger. This is to increase the charging efficiency through the supercharging operation to increase torque generated by the engine 3, so as to compensate for reduction of the torque which is caused when the auxiliary intake cam phase θmsi is controlled to the advanced-closing side.

$$TRQ2 \leq TRQ\_eng < TRQ4 \qquad (L5)$$

In this range, the auxiliary intake cam phase θmsi is controlled such that the degree of the advanced closing of the intake valve 6 becomes smaller as the demanded drive torque TRQ_eng is larger, which results in an increase in effective compressed volume of intake air. This is to compensate for reduction of torque generated by the engine 3, by controlling the auxiliary intake cam phase θmsi, since as described hereinbefore, the torque generated by the engine 3 is reduced when the degree of the advanced closing of the intake valve 6 is controlled to be large in a state of the charging efficiency being reduced by the restriction of the supercharging operation.

Further, the intake pipe absolute pressure PBA is controlled to hold a fixed value in the range of TRQ2≦TRQ_eng≦TRQ3, and controlled to a smaller value, as the demanded drive torque TRQ_eng is larger in the range of TRQ3<TRQ_eng<TRQ4. Further, the main fuel injection ratio Rt_Pre is controlled to a smaller value, as the demanded drive torque TRQ_eng is larger, similarly to that within the range (L3). As described above, within the range (L5), as the demanded drive torque TRQ_eng is larger, the supercharging operation carried out by the turbocharger device 10 is restricted, and at the same time the cooling effect attained by the fuel evaporation cooling device 12 is controlled to be increased. This makes it possible to prevent knocking from occurring in the engine 3 without performing the retard control for retarding the ignition timing. It should be noted that in the case of the conventional engine provided with a turbocharger device, knocking occurs in the engine within this range (L5) of the demanded drive torque TRQ_eng, unless the retard control for retarding the ignition timing is carried out.

$$TRQ4 \leq TRQ\_eng \qquad (L6)$$

This range corresponds to a very high-load region, so that it is impossible to prevent knocking in the engine 3 from occurring, by the restriction of the supercharging operation by the turbocharger device 10 and the cooling effect by the fuel evaporation cooling device 12. Therefore, the retard control for retarding the ignition timing is carried out. More specifically, the target air-fuel ratio KCMD is controlled to a richer value as the demanded drive torque TRQ_eng is larger. At the same time, the auxiliary intake cam phase θmsi is controlled to the Otto phase value θmsiott; the cylinder intake air amount Gcyl is controlled to an approximately fixed value; the main fuel injection ratio Rt_Pre is controlled to the minimum value Rtmin; and the intake pipe absolute pressure PBA is controlled to hold an approximately fixed value.

As described above, according to the control system 1 of the present embodiment, when the engine is within a range of TRQ_idle≦TRQ_eng<TRQott (first predetermined load region), i.e. in a low-load region, the basic value θmsi_base of the target auxiliary intake cam phase is controlled to a value of the retarded-closing side according to the demanded drive torque TRQ_eng, while when the engine is within a range of TRQott<TRQ_eng<TRQ4 (second predetermined load region), i.e. in a high-load region, the same is controlled to a value of the advanced-closing side. Then, the auxiliary intake cam phase controller 220 controls the auxiliary intake cam phase θmsi such that it becomes equal to the basic value θmsi_base. In short, the valve-closing timing of the intake valves 6 is controlled to the retarded closing side and the advanced-closing side depending on the demanded drive torque TRQ. As a result, the amount of intake air drawn into each cylinder via the associated intake valve 6 is controlled depending on the load on the engine 3, which makes it possible to control the intake air amount in a more accurate and fine-grained manner than the prior art, and thereby prevent the intake air amount from becoming short or excessive. As a result, it is possible to maintain excellent combustion performance and reduced exhaust emissions.

Further, according to the control system 1 of the present embodiment, the auxiliary intake cam phase θmsi is controlled to the basic value θmsi_base of the target intake cam phase, and at the same time the boost pressure PC is controlled to the target boost pressure Pc_cmd. Particularly, within the range of TRQ2<TRQ_eng<TRQ4, which is a high-load region of the engine in which conventional control could not prevent occurrence of knocking without executing retardation of ignition timing, the basic value θmsi_base of the target auxiliary intake cam phase is set such that the degree of advancement of the valve-closing timing is reduced as the demanded drive torque TRQ_eng is larger. That is, the basic value θmsi_base of the target auxiliary intake cam phase is set such that the effective compression volume is larger as the load on the engine is larger. Further, within the range of TRQ2<TRQ_eng≦TRQ3, the target boost pressure PC_cmd is set to a fixed value, while within the range of TRQ3<TRQ_eng<TRQ4, the same is set to a smaller value as the demanded drive torque is larger. In other words, within the range of TRQ2<TRQ_eng≦TRQ4, the boost pressure Pc is controlled such that it does nor rise but is suppressed (maintained or reduced), and at the same time, within the range of TRQ3<TRQ_eng<TRQ4, the same is controlled to a lower value as the demanded drive torque TRQ_eng is larger. As described above, the auxiliary intake cam phase θmsi is controlled such that the effective compression volume is increased as the load on the engine 3 is higher, whereby even in a high-load region of the engine, the boost pressure Pc for securing the demanded engine output can be controlled to the suppressed (maintained or decreased) state without increasing the same, and an increase in intake air temperature can be thereby suppressed. This makes it possible to expand the limit of ignition timing beyond which knocking starts to occur without retarding ignition timing, and improve both combustion efficiency and engine output. As a result, it is possible to increase drivability and marketability.

Further, within the range of TRQott<TRQ_eng<TRQ4, the engine 3 is operated in a high expansion ratio cycle by the advanced valve-closing of the intake valves 6, and therefore, differently from a case where the intake valves 6 are actuated by the Otto intake cams, it is possible to prevent blow-back of fuel into the intake manifold, and prevent increases in the amount of fuel remaining within the intake manifold and the amount of fuel adhering to the inner wall of the intake manifold and the like. This makes it possible to improve the accuracy of the air-fuel ratio control and torque control in a high-load region of the engine. As a result, it is possible to not only reduce exhaust emissions and improve drivability, but also prolong the service lives of the devices used in the intake system, such as the intake valves 6.

Further, within the range of TRQ_idle≦TRQ_eng<TRQott, i.e., when the engine is in a low-load region, the engine 3 is operated in the high expansion ratio cycle by the retarded closing of the intake valves, which makes it unnecessary to reduce the intake air amount using the throttle valve 17. This makes it possible to set the intake air amount to an appropriate value dependent on the low load on the engine while preventing pumping loss, and thereby improve fuel economy. In addition, as distinct from a case where the high expansion ratio cycle operation is realized by the advanced valve-closing of the intake valves 6, it is possible to prevent liquidation of fuel in the cylinders and unstable combustion in a low-load region when intake air temperature or engine temperature is low, thereby ensuring excellent combustion performance of the engine.

Moreover, since the variable intake valve actuation assembly 40 is formed by a hydraulic-driven type, compared, for example, with a type of variable intake valve actuation assembly which actuates the valve element of the intake valve 6 by the electromagnetic force of a solenoid, it is possible to reliably open and close the intake valve 6 in a higher load range of the engine, and reduce power consumption and operating noise of the intake valve.

Further, the variable intake valve actuation assembly 40 is configured to be capable of changing not only the valve-closing timing of the intake valves but also the valve lift thereof as desired, when the auxiliary intake cam phase θmsi is within a range of 120 to 180 degrees. Therefore, by controlling the valve lift to a smaller value, it is possible to increase the speed at which intake air flows into the combustion chamber, to thereby increase the flow of the mixture within the cylinder, and thereby improve combustion efficiency.

Further, through a combination of the intake valve-actuating mechanism 50 including the main and auxiliary intake cams 43 and 44, the main and auxiliary intake camshafts 41 and 42, the link mechanism 52, and the intake rocker arm 51, and the variable auxiliary intake cam phase mechanism 70, it is possible to realize a construction enabling the auxiliary intake cam phase θmsi, i.e. the valve-closing timing and the valve lift amount of the intake valve 6, to be changed as desired.

Further, within the range of TRQ1<TRQ_eng<TRQ4, in the fuel evaporation cooling device 12, fuel is injected from the auxiliary fuel injection valve 15 toward the lipophilic film plates 14 to be supplied to the cylinders. In this case, the fuel is 14 is formed into thin films on the surfaces of the lipophilic film plates 14, and then evaporated by the heat of intake air the temperature of which has been raised by supercharging operation of the turbocharger 10 to form a mixture of air and fuel, and at the same time, the intake air is cooled by being deprived of heat of evaporation used for evaporation of the fuel. Thus, as the mixture is formed, the intake air-cooling effect can be obtained, whereby the limit of ignition timing beyond which knocking starts to occur can be further expanded without retarding ignition timing.

Further, within the range of TRQ1<TRQ_eng<TRQ4, the main fuel injection ratio Rt_Pre which is a ratio of the main fuel injection amount TOUT_main of fuel injected from the main injection valves 4 to the total fuel injection amount TOUT is set to a smaller value as the demanded drive torque TRQ_eng is larger. In other words, as the demanded drive torque TRQ_eng is larger, i.e. the load on the engine is higher to make the degree of rise in the intake air temperature higher due to the supercharging, the ratio [(100−Rt_Pre)/100] of the auxiliary fuel injection amount TOUT_sub of fuel injected from the auxiliary fuel injection valve 15 is set to a larger value, whereby depending on the degree of rise in the intake air temperature, the intake air-cooling effect by the fuel evaporation cooling device 12 can be more appropriately obtained.

Further, although in the embodiment described above, within a range of TRQ_eng<TRQott (third predetermined load region), the intake valves 6 are controlled to the retarded closing side, this is not limitative, but instead, within this range, the intake valves 6 may be controlled to the advanced closing side. In this case, it is only required that the ECU 2 (valve lift amount-determining means) sets the aforementioned auxiliary intake cam phase θmsi to a range of 120 to 180 degrees according to the demanded drive torque TRQ_eng, whereby the valve lift amount is set to a value smaller than the maximum value. More specifically, it is only required that the valve lift amount is controlled to a smaller value as the demanded drive torque TRQ_eng is smaller. When the valve lift amount is thus controlled, the speed at which the intake air flows into the combustion chamber is increased to increase the flow of the mixture within the cylinder, which contributes to increased combustion speed. As a result, even when intake air temperature or engine temperature is low, in a low-load region of the engine, it is possible to prevent liquidation of fuel due to the advanced valve-closing of the intake valves 6, thereby ensuring stable combustion of the engine.

Although the embodiment is an example in which the turbocharger 10 is used as the supercharging device, the supercharging device is not limited to this, but any type may be employed so long as it can perform supercharging operation of intake air. For example, there may be employed a mechanical type, such as a supercharger.

Further, although the embodiment is an example in which the main fuel injection valves 4 are implemented by direct injection valves, this is not limitative, but they may be implemented by port injection type valves arranged in the intake pipe 8.

Furthermore, when the variable auxiliary intake cam phase mechanism 70 is not required to be high in responsiveness (e.g. when it is only required to perform only one of the retarded-closing control and advanced-closing control of the intake valve 6, in the aforementioned intake valve control process), the oil pressure pump 63 and the solenoid valve mechanism 64 may be used in place of the oil pressure piston mechanism 73 and the motor 74, similarly to the variable main intake cam phase mechanism 60. In this case, the control system 1 may be configured as shown in FIG. 54.

Figure 54:
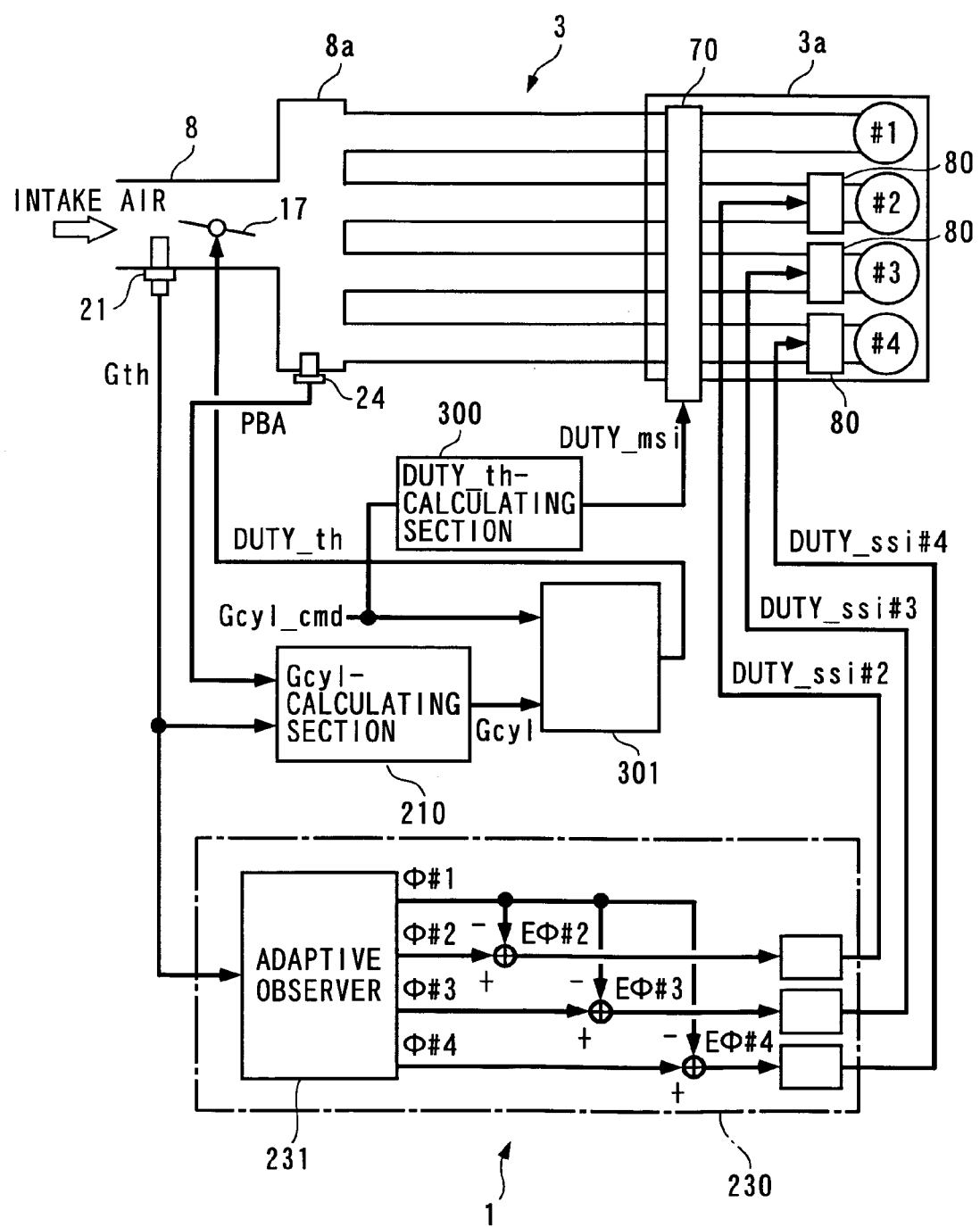
FIG. 54 is a block diagram schematically showing the arrangement of a variation of the control system.

As shown in FIG. 54, this control system 1 is provided with a DUTY_msi-calculating section 300 and a throttle valve opening controller 301, in place of the DUTY_th-calculating section 200 and the auxiliary intake cam phase controller 220. In the DUTY_msi-calculating section 300, the target auxiliary intake cam phase θmsi_cmd is calculated by searching a table according to the demanded drive torque TRQ_eng, and then the control input DUTY_msi is calculated by searching a table according to the calculated target auxiliary intake cam phase θmsi_cmd. Further, in the throttle valve opening controller 301, the target opening degree TH_cmd is calculated with the same control algorithm as that of the first SPAS controller 221 described above according to the cylinder intake air amount Gcyl and the target intake air amount Gcyl_cmd, and then, the control input DUTY_th is calculated with the same control algorithm as that of the second SPAS controller 225 described above according to the calculated target opening degree TH_cmd. When the control system 1 is configured as above, even if the variable auxiliary intake cam phase mechanism 70 is low in responsiveness, it is possible to properly control the auxiliary intake cam phase θmsi, while avoiding adverse influence of the low responsiveness of the variable auxiliary intake cam phase mechanism 70.

Further, the embodiment is an example in which the auxiliary intake air cam phase controller 220 is equipped with both of the first SPAS controller 221 and the second SPAS controller 225, this is not limitative, but it may be equipped with the first SPAS controller 221 alone. In this case, it is only required that the control input DUTY_msi is calculated according to the target auxiliary intake cam phase msi_cmd calculated by the first SPAS controller 221, by looking up a table.

Further, the control system according to the present invention is applicable not only to the internal combustion engine for an automotive vehicle, according to the above embodiment, but to internal combustion engines, such as those installed on boats.

It is further understood by those skilled in the art that the foregoing is a preferred embodiment of the present invention, and that various changes and modifications may be made without departing from the spirit and scope thereof.

What is claimed is:

1. A valve timing control system for an internal combustion engine comprising:
    a variable valve timing device that continuously variably controls valve closing timing of an intake valve relative to valve opening timing thereof;
    load detecting means for detecting load on the engine;
    valve-closing timing-determining means for determining the valve-closing timing of the intake valve according to the detected load on the engine; and
    control means for controlling the variable valve timing device according to the determined valve-closing timing of the intake valve, wherein said valve-closing timing-determining means determines the valve-closing timing of the intake valve such that the valve-closing timing of the intake valve is retarded with respect to the predetermined timing in which an expansion ratio becomes equal to a compression ratio in a combustion cycle of the engine, when the load on the engine is in a first predetermined load region, and determines the valve-closing timing of the intake valve such that the valve-closing timing of the intake valve is advanced with respect to the predetermined timing, when the load on the engine is in a second predetermined load region higher than the first predetermined load region.

2. A valve timing control system as claimed in claim 1, wherein the variable valve timing device is formed by a hydraulically-driven variable valve timing device which is driven by supply of oil pressure, and
    wherein said control means controls the oil pressure supplied to the hydraulically-driven variable valve timing device.

3. A valve timing control system as claimed in claim 1, wherein the variable valve timing device is configured to be capable of changing an amount of valve lift of the intake valve as desired.

4. A valve timing control system as claimed in claim 3, wherein the variable intake valve timing device comprises:
    an intake rocker arm for actuating the intake valve by pivotal motion thereof to open and close the intake valve;
    a movable pivot for pivotally supporting said intake rocker arm;
    a first intake camshaft and a second intake camshaft that rotate at a same rotational speed;
    a variable intake cam phase mechanism for varying a relative phase between said first intake camshaft and said second intake camshaft;
    a first intake cam provided on said first intake camshaft, for rotation along with rotation of said first intake camshaft, thereby causing said intake rocker arm to pivotally move about said pivot; and
    a second intake cam provided on said second intake camshaft, for rotation along with rotation of said second intake camshaft, thereby moving said pivot around which said intake rocker arm is pivotally moved.

5. A valve timing control system for an internal combustion engine comprising:

a variable valve timing device that continuously variably controls valve closing timing of an intake valve relative to valve opening timing thereof;

load detecting means for detecting load on the engine;

valve-closing timing-determining means for determining the valve-closing timing of the intake valve according to the detected load on the engine; and control means for controlling the variable valve timing device according to the determined valve-closing timing of the intake valve, wherein the variable valve timing device is configured to be capable of changing an amount of valve lift of the intake valve as desired, and the valve timing control system further comprising valve lift amount-determining means for determining the amount of valve lift of the intake valve such that the amount of valve lift of the intake valve is smaller when the load on the engine is in a third predetermined range lower than a predetermined load than when the load on the engine is not lower than the predetermined load, and wherein said valve-closing timing-determining means determines the valve-closing timing of the intake valve such that the valve-closing timing of the intake valve is advanced with respect to predetermined timing in which an expansion ratio becomes equal to a compression ratio in a combustion cycle of the engine, when the load on the engine is within the third predetermined load region, and wherein said control means controls the variable valve timing device according to the determined valve-closing timing and the determined amount of valve lift of the intake valve.

6. A valve timing control system as claimed in claim 5, wherein the variable intake valve timing device comprises:

an intake rocker arm for actuating the intake valve by pivotal motion thereof to open and close the intake valve;

a movable pivot for pivotally supporting said intake rocker arm;

a first intake camshaft and a second intake camshaft that rotate at a same rotational speed;

a variable intake cam phase mechanism for varying a relative phase between said first intake camshaft and said second intake camshaft;

a first intake cam provided on said first intake camshaft, for rotation along with rotation of said first intake camshaft, thereby causing said intake rocker arm to pivotally move about said pivot; and a second intake cam provided on said second intake camshaft, for rotation along with rotation of said second intake camshaft, thereby moving said pivot around which said intake rocker arm is pivotally moved.

7. A control system for an internal combustion engine, for controlling boost pressure of intake air via a supercharging device provided in an intake passage, and variably controlling valve-closing timing of an intake valve with respect to valve-opening timing of the intake valve via a variable valve timing device, the control system comprising:

load-detecting means for detecting load on the engine;

target boost pressure-setting means for setting a target boost pressure as a target of boost pressure control, according to the detected load on the engine;

supercharging control means for controlling the supercharging device according to the set target boost pressure;

target valve-closing timing-setting means for setting target valve-closing timing as a target of valve-closing timing control of the intake valve, such that when the detected load on the engine is in a predetermined high-load region higher than a predetermined load, the target valve-closing timing is set to such timing as makes the expansion ratio closer to the compression ratio in the combustion cycle, when the expansion ratio is higher than the compression ratio and as the detected load on the engine is higher; and valve timing control means for controlling the variable valve timing device according to the set target valve-closing timing.

8. A control system as claimed in claim 7, wherein said target valve-closing timing-setting means sets the valve-closing timing of the intake valve to advanced timing with respect to predetermined timing in which an expansion ratio becomes equal to a compression ratio in a combustion cycle of the engine, when the load on the engine is within the predetermined high-load region.

9. A control system as claimed in claim 7, wherein said target valve-closing timing-setting means sets the valve-closing timing of the intake valve to timing in which an expansion ratio is larger than a compression ratio in a combustion cycle of the engine, when the load on the engine is a predetermined low-load region lower than the predetermined high-load region.

10. A control system as claimed in claim 9, wherein said target valve-closing timing-setting means sets the valve-closing timing of the intake valve to retarded timing with respect to predetermined timing in which the expansion ratio becomes equal to the compression ratio in the combustion cycle of the engine.

11. A control system as claimed in claim 7, wherein said target boost pressure-setting means sets the target boost pressure to a smaller value as the load on the engine is higher, when the load on the engine is within the predetermined high-load region.

12. A control system as claimed in claim 7, wherein the variable valve timing device is formed by a hydraulically-driven variable valve timing device which is driven by supply of oil pressure, and wherein said valve timing control means controls the oil pressure supplied to the hydraulically-driven variable valve timing device.

13. A control system as claimed in claim 7, wherein the variable valve timing device is configured to be capable of changing an amount of valve lift of the intake valve as desired.

14. A control system as claimed in claim 13, wherein the variable intake valve timing device comprises:

an intake rocker arm for actuating the intake valve by pivotal motion thereof to open and close the intake valve;

a movable pivot for pivotally supporting said intake rocker arm;

a first intake camshaft and a second intake camshaft that rotate at a same rotational speed;

a variable intake cam phase mechanism for varying a relative phase between said first intake camshaft and said second intake camshaft;

a first intake cam provided on said first intake camshaft, for rotation along with rotation of said first intake camshaft, thereby causing said intake rocker arm to pivotally move about said pivot; and a second intake cam provided on said second intake camshaft, for rotation along with rotation of said second intake camshaft, thereby moving said pivot around which said intake rocker arm is pivotally moved.

15. A control system as claimed in claim 7, wherein the engine includes:
a first fuel injection valve for injecting fuel to supply the fuel into a cylinder; and
an intake air cooling device disposed in the intake passage at a location downstream of the supercharging device, for cooling intake air from the supercharging device, and
wherein the intake air cooling device includes:
lipophilic film plates having formed on surfaces thereof lipophilic films having affinity to fuel; and
a second fuel injection valve for injecting fuel toward the lipophilic film plates to thereby supply the fuel to the cylinder.

16. A control system as claimed in claim 15, further comprising fuel injection ratio-setting means for setting a first fuel injection ratio of an amount of fuel to be injected by the first fuel injection valve to an amount of fuel to be supplied to the cylinder and a second fuel injection ratio of an amount of fuel to be injected by the second fuel injection valve to the amount of fuel to be supplied to the cylinder, according to the load on the engine, such that the second fuel injection ratio is larger as the load on the engine is higher.

* * * * *